(12) United States Patent
Kang et al.

(10) Patent No.: US 10,594,924 B2
(45) Date of Patent: Mar. 17, 2020

(54) ELECTRONIC DEVICE AND COMPUTER-READABLE RECORDING MEDIUM FOR DISPLAYING IMAGES

(71) Applicant: Samsung Electronics Co., Ltd., Suwon-si, Gyeonggi-do (KR)

(72) Inventors: Dong-Goo Kang, Seoul (KR); Chang-Won Kim, Suwon-si (KR); Sang-Ah Lee, Suwon-si (KR); Joo-Yeon Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/788,417

(22) Filed: Oct. 19, 2017

(65) Prior Publication Data
US 2018/0109724 A1 Apr. 19, 2018

(30) Foreign Application Priority Data
Oct. 19, 2016 (KR) .................. 10-2016-0135988

(51) Int. Cl.
*G06F 3/0484* (2013.01)
*G06F 3/0481* (2013.01)
(Continued)

(52) U.S. Cl.
CPC ....... *H04N 5/23216* (2013.01); *G06F 3/0485* (2013.01); *G06F 3/04815* (2013.01);
(Continued)

(58) Field of Classification Search
None
See application file for complete search history.

(56) References Cited

U.S. PATENT DOCUMENTS

2003/0156124 A1 8/2003 Good et al.
2006/0224993 A1* 10/2006 Wong ................ G06F 17/30274
715/800

(Continued)

FOREIGN PATENT DOCUMENTS

| WO | 2013/074991 A1 | 5/2013 |
| WO | 2015/005184 A1 | 1/2015 |
| WO | 2016-027977 A1 | 2/2016 |

OTHER PUBLICATIONS

European Search Report dated May 22, 2019, issued in European Patent Application No. 17861760.1.

(Continued)

*Primary Examiner* — Yanna Wu
(74) *Attorney, Agent, or Firm* — Jefferson IP Law, LLP

(57) ABSTRACT

An electronic device for displaying images is provided. The electronic device includes a display displaying a first partial image of an image, a memory, and a processor. The processor is configured to designate a first object included in the first partial image if a first input for designating the first object is received, store first information associated with the first object in the memory, display, on the display, a first graphical object associated with the first object if the image displayed on the display is switched from the first partial image to a second partial image of the image, and switch the image displayed on the display from the second partial image to a third partial image of the image including the first object using the first information if a second input for selecting the first graphical object is received.

20 Claims, 62 Drawing Sheets

(51) Int. Cl.
    *H04N 5/232*      (2006.01)
    *G06F 3/0488*     (2013.01)
    *G06F 3/0485*     (2013.01)
    *H04N 21/472*     (2011.01)
    *H04N 21/4788*    (2011.01)

(52) U.S. Cl.
    CPC ...... *G06F 3/04842* (2013.01); *G06F 3/04845* (2013.01); *G06F 3/04855* (2013.01); *G06F 3/04883* (2013.01); *H04N 5/23238* (2013.01); *H04N 5/23293* (2013.01); *H04N 21/47205* (2013.01); *G06F 2203/04805* (2013.01); *H04N 21/4788* (2013.01)

(56) References Cited

U.S. PATENT DOCUMENTS

| | | | |
|---|---|---|---|
| 2008/0059578 A1 | 3/2008 | Albertson et al. | |
| 2011/0181609 A1 | 7/2011 | Tsai | |
| 2012/0057794 A1* | 3/2012 | Tsurumi | G06T 11/60 382/195 |
| 2012/0093418 A1 | 4/2012 | Kim et al. | |
| 2012/0257025 A1* | 10/2012 | Kim | G06F 1/1694 348/51 |
| 2013/0113715 A1* | 5/2013 | Grant | G06F 3/0488 345/173 |
| 2013/0335341 A1 | 12/2013 | Ishibashi | |
| 2016/0132991 A1* | 5/2016 | Fukushi | A63F 13/5255 345/667 |
| 2016/0178387 A1 | 6/2016 | Yamasaki et al. | |
| 2016/0191793 A1 | 6/2016 | Yang et al. | |
| 2017/0013179 A1* | 1/2017 | Kang | G06F 3/04883 |
| 2017/0272785 A1 | 9/2017 | Jeong | |
| 2018/0048823 A1* | 2/2018 | Kang | G06F 3/167 |
| 2018/0095650 A1* | 4/2018 | Park | G06F 3/0412 |

OTHER PUBLICATIONS

Shunichi Kasahara et al., "JackIn: Integrating First-Person View with Out-of-Body Vision Generation for Human-Human Augmentation", 0140307; 1077952576-1077952576, Mar. 7, 2014 (Mar. 7, 2014), pp. 1-8, P058047978, OI: 10.1145/2582051.2582097 SBN: 978-1-4503-2761-9 * abstract; figure 7 * * p. 5, col. I, line 20-line 35 * p. 5, col. 2, line 8-line 9 *.

Matthias Berning et al: 11 PARnorama: 360 degree interactive video for augmented reality prototyping 11, Proceedings of the 2013 ACM Conference on Pervasive and Ubiquitous Computing Adjunct Publication, UBICOMP '13, Zurich, Switzerland, Jan. 1, 2013 (Jan. 1, 2013), pp. 1471-1474, XP055626590, New York, New York, USA, DOI: 10.1145/2494091.2499570 ISBN: 978-1-4503-2215-7, * p. 4, col. 2, line 11-line 21.

European Search Report dated Oct. 14, 2019, issued in European Patent Application No. 17861760.1.

* cited by examiner

ELECTRONIC DEVICE AND COMPUTER-READABLE RECORDING MEDIUM FOR DISPLAYING IMAGES

CROSS-REFERENCE TO RELATED APPLICATION(S)

This application claims the benefit under 35 U.S.C. § 119(a) of a Korean patent application filed on Oct. 19, 2016 in the Korean Intellectual Property Office and assigned Serial number 10-2016-0135988, the entire disclosure of which is hereby incorporated by reference.

TECHNICAL FIELD

The present disclosure relates to electronic devices for displaying images.

BACKGROUND

Recent electronic devices are advancing to be able to comprehensively perform various functions. For example, an electronic device can conduct multiple functions, e.g., taking pictures or video, playing music, video, or game, or receiving and playing broadcast in real-time.

The electronic device may also display images captured in various directions, not alone ones captured in a single direction. Images captured in several directions provide a wider field of view around the user than an image captured in a single direction, providing a more lifelike image to the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device may provide its user with a 360-degree omni-directional image as a more life-like one. Such image may be created through at least one image captured in several directions and represent the whole space at 360 degrees in all directions. The user may view the image using the electronic device while freely moving in his desired direction. Meanwhile, the user sometimes views part of the image, rather than the whole image. Accordingly, the user is unable to easily recognize an event that may occur from the rest of the image other than the part which the user is currently viewing. To view the part of the image where an event occurs, the user himself or herself needs to search for the part, which is burdensome.

According to various embodiments of the present disclosure, there may be provided electronic devices for displaying images to address the foregoing or other issues.

In accordance with an embodiment of the present disclosure, an electronic device is provided. The electronic device includes a display, a memory, and at least one processor configured to control the display to display a first partial image of an image, designate a first object included in the first partial image if a first input for designating the first object is received, store first information associated with the first object in the memory, display, on the display, a first graphical object associated with the first object if the image displayed on the display is switched from the first partial image to a second partial image of the image, and switch the image displayed on the display from the second partial image to a third partial image of the image including the first object using the first information if a second input for selecting the first graphical object is received.

In accordance with an embodiment of the present disclosure, an electronic device is provided. The electronic device includes a display, a memory, and at least one processor configured to control the display to display a first partial image of an image, designate the first partial image if a first input for designating the first partial image is received, store first information associated with the first partial image in the memory, display, on the display, a first graphical object associated with the first partial image if the image displayed on the display is switched from the first partial image to a second partial image of the image, and switch the image displayed on the display from the second partial image to the first partial image according to the first information if a second input for selecting the first graphical object is received.

In accordance with an embodiment of the present disclosure, a non-transitory computer-readable recording medium is provided. The non-transitory computer-readable recording medium includes retaining a program executed on a computer, wherein the program comprises executable commands that, when executed by at least one processor, enable the at least one processor to display a first partial image of an image, designate a first object included in the first partial image if a first input for designating the first object is received, store first information associated with the first object, display a first graphical object associated with the first object if the image displayed on the display is switched from the first partial image to a second partial image of the image, and switch the image displayed on the display from the second partial image to a third partial image of the image including the first object using the first information if a second input for selecting the first graphical object is received.

In accordance with an embodiment of the present disclosure, an electronic device is provided. The electronic device includes a display, a memory, a communication circuit, and at least one processor configured to control the display to display a user interface for controlling an external electronic device, designate a first object included in a first partial image of an image displayed on the external electronic device if a first input for designating the first object is received, store first information associated with the first object in the memory, display a first graphical object corresponding to the first object on the user interface based on the first information, and transmit, through the communication circuit to the external electronic device, a first control signal for switching the image displayed on the external electronic device to a second partial image of the image including the first object according to the first information if a second input for selecting the first graphical object is received.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
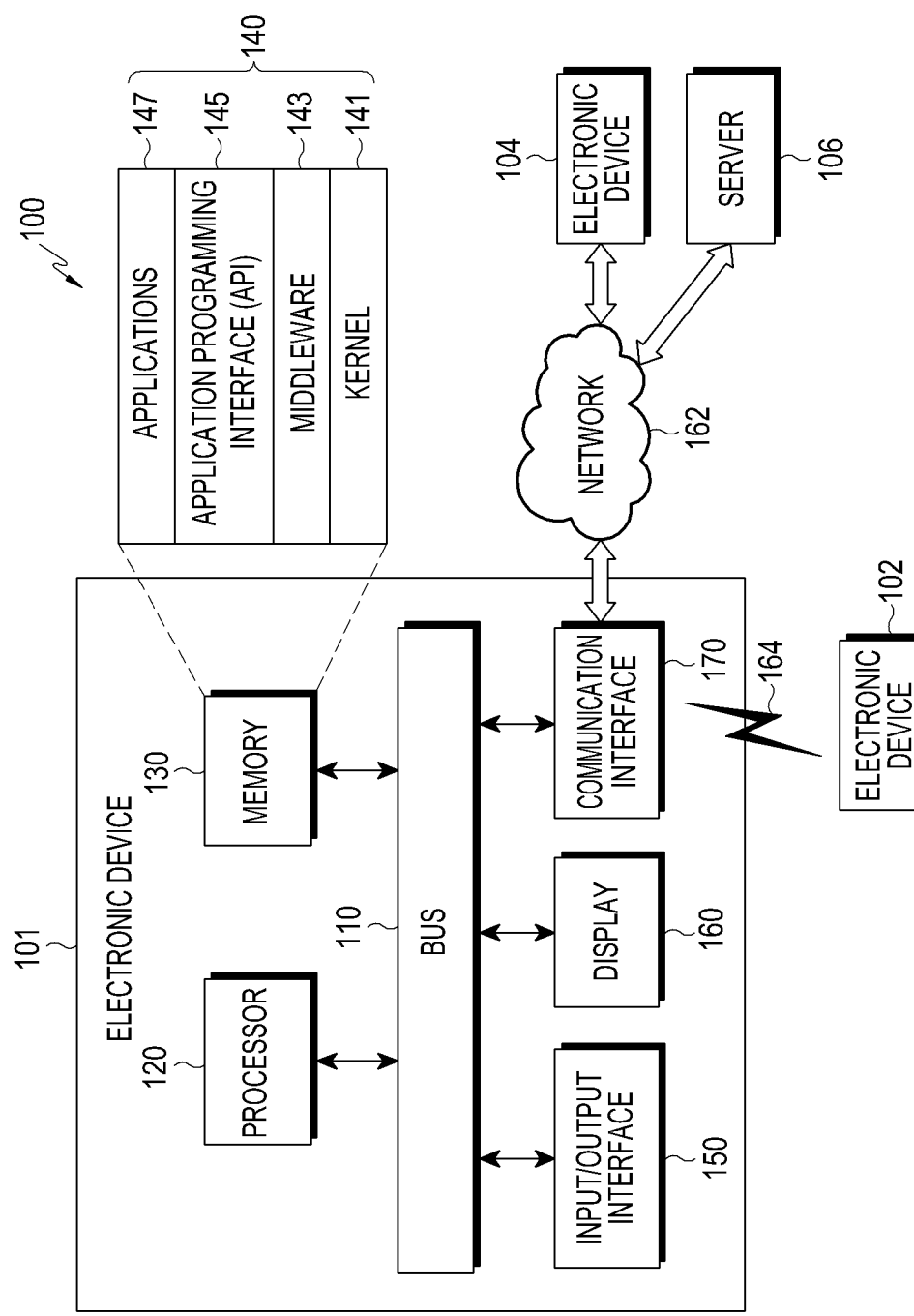
FIG. 1 is a view illustrating a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

For example, examples of the electronic device according to various embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital versatile disc (DVD) player, an audio player, a refrigerator, an air conditioner, a cleaner, an oven, a microwave oven, a washer, a drier, an air cleaner, a set-top box, a home automation control panel, a security control panel, a television (TV) box (e.g., Samsung HomeSync™, Apple TV™, or Google TV'), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to various embodiments of the present disclosure, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

FIG. 1 is a view illustrating a network environment including an electronic device according to an embodiment of the present disclosure.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processor 120 may include one or more of a CPU, an AP, or a communication processor (CP). The processor 120 may perform control on at least one of the other components of the electronic device 101, and/or perform an operation or data processing relating to communication.

The memory 130 may include a volatile and/or nonvolatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic LED (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106). For example, the communication interface 170 may be connected with a wired or wireless connection 164 and may communicate with an external device (e.g., the first external electronic device 102).

The wireless communication may include cellular communication which uses at least one of, e.g., long term evolution (LTE), LTE-advanced (LTE-A), code division multiple access (CDMA), wideband CDMA (WCDMA), universal mobile telecommunication system (UNITS), wireless broadband (WiBro), or global system for mobile communication (GSM). According to an embodiment of the present disclosure, the wireless communication may include at least one of, e.g., wireless fidelity (Wi-Fi), bluetooth (BT), BT low power (BLE), zigbee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

According to an embodiment of the present disclosure, the display 160 may display a 360-degree, omni-directional image. The image may be generated using at least one image that is obtained through a camera module capable of 360-degree, all-directional image capture. The camera module may include at least one camera to capture an image in all 360-degree directions.

The electronic device 101 may receive the image from an external server and store the image in the memory 130, and the processor 120 may display a partial image of the image, which is stored in the memory 130, through the display 160. The processor 120 may display, through the display 160 in real-time, a partial image of an image that is received in real-time from the external server. Since the image represents all 360-degree directions, the electronic device 101 may display, through the display 160, the partial image of the image, but rather than the whole image.

The image may include an image for left eye and an image for right eye to provide the user with three-dimensional (3D) effects. The display 160 may provide a 3D effect to the user by displaying the image for left eye and the image for right eye to a left-hand and right-hand portion, respectively, of the display 160.

According to an embodiment of the present disclosure, the processor 120 may display, on the display 160, a first partial image of the image corresponding to a first side surface of the electronic device 101 sensed through the sensor. The processor 120 may display the first partial image of the image on the display 160 according to a user input or setting. The processor 120 may switch images displayed on the display 160 according to a move of the electronic device 101 sensed by the sensor of the electronic device 101 or a user input received. For example, the processor 120 may switch the first partial image to a second partial image of the image to correspond to the direction of the move of the electronic device 101 or the received user input while the first partial image of the image is currently being displayed on the display 160 and display the second partial image. The second partial image may be an image with at least a portion different from the first partial image.

The processor 120 may amplify first voice information associated with the first partial image and attenuate voice information associated with the rest of the image except for the first partial image. Thus, the processor 120 may provide a lifelike voice effect to the user.

According to an embodiment of the present disclosure, the processor 120 may receive a first input for designating a first object included in the first partial image displayed on the display 160. The processor 120 may designate the first object according to the first input. For example, the first object may be an object recognizable in the first partial image, such as a figure, building, or vehicle included in the first partial image. Although an example of designating one object in one partial image is primarily described below for ease of description, various embodiments of the present disclosure are not limited thereto, and a plurality of objects may be designated in one partial image.

For example, the processor 120 may recognize and designate the first object in the first partial image according to the first input. The processor 120 may recognize the first object corresponding to the first input in the first partial image and designate the recognized first object. The processor 120 may display a result of recognition of the first object on the display 160. For example, the processor 120 may a message indicating that the first object is recognized or information about the recognized first object on the display 160. The electronic device 101 may search the memory 130 or external server for the information about the recognized first object and display a result of the search on the display 160.

According to an embodiment of the present disclosure, the processor 120 may store first information associated with the designated first object in the memory 130. The first information associated with the first object may include various pieces of information available to specify or identify the first object. For example, the first information may include at least one of color information, shape information, or coordinate information corresponding to the first object. The processor 120, upon determining that the first object moves, may update in real-time the coordinate information corresponding to the first object according to the move of the first object. The pieces of information included in the first information are merely an example and are not limited thereto. Various pieces of information available to specify or identify the first object may be included in the first information.

According to an embodiment of the present disclosure, when the image displayed on the display 160 is switched from the first partial image to the second partial image of the image, the processor 120 may display a first graphical object associated with the first object on the display 160. The processor 120 may switch the image displayed on the display 160 from the first partial image to the second partial image according to a move of the electronic device 101 sensed by the sensor or a user input.

Although no switch is made from the first partial image to the second partial image, when the first object disappears from the first partial image, the processor 120 may display the first graphical object on the display 160. Although an example of displaying the first graphical object when the first partial image switches to the second partial image is primarily described below for ease of description, various embodiments of the present disclosure are not limited thereto. Although the partial image displayed on the display 160 is not switched, when the designated first object is not displayed on the display 160, the first graphical object may be displayed on the display 160.

The first graphical object may include at least one of an icon or a thumbnail image associated with the designated first object. For example, the first graphical object may include an icon for indicating the first object or a thumbnail image for indicating the first object.

The processor 120 may determine at least one of the position of display or size of the first graphical object based on at least one of the first information or information associated with the second partial image. The information associated with the second partial image may include at least one of coordinate information corresponding to the second partial image or information available to specify or identify at least one object included in the second partial image. A specific method for determining at least one of the position of display or size of the first graphical object by the processor 120 is described below.

According to an embodiment of the present disclosure, upon receipt of a second input to select the first graphical object, the processor 120 may switch the image displayed on the display 160 from the second partial image to a third partial image of the image including the designated first object using the first information. According to a user input for switching the image displayed on the display 160 or a move of the electronic device 101 sensed by the sensor, the processor 120 may immediately switch the image displayed on the display 160 from the second partial image to the third partial image including the first object according to the second input, but rather than sequentially switching the image displayed on the display 160.

The third partial image may be the same as the first partial image or at least a portion thereof may be different from the first partial image. For example, where the first object does not move while the second partial image is being displayed on the display 160, the third partial image may be the same as the first partial image. In contrast, where the first object does moves while the second partial image is being displayed on the display 160, the third partial image may, at least partially, be different from the first partial image.

According to an embodiment of the present disclosure, the processor 120 may determine whether a first event related to the first object occurs after the first graphical object is displayed on the display 160. For example, when the designated first object moves or a message or emoticon associated with the designated first object is searched from the memory 130 or external server, the processor 120 may determine that the first event occurs. A specific method for determining the occurrence of the first event is described below in detail.

Upon determining that the first event occurs, the processor 120 may change at least one of the position of display, size, color, or shape of the first graphical object and display on the display 160. Upon determining that the first event occurs, the processor 120 may output at least one of a vibration or sound to notify the user of the occurrence of the first event. Thus, the user may recognize the occurrence of the event associated with the first object even without viewing the partial image including the first object through the display 160.

According to an embodiment of the present disclosure, the processor 120 may receive a third input for designating a second object included in the second partial image displayed on the display 160. The processor 120 may designate the second object according to the third input. A specific method for designating the second object is the same as the method for designating the first object as described above, and thus, no further description thereof is given below.

The processor 120 may store second information associated with the designated second object in the memory 130. Like the first information described above, the second information may include various pieces of information available to specify or identify the second object.

When the image displayed on the display 160 is switched from the second partial image to a fourth partial image of the image, the processor 120 may display the first graphical object associated with the first object and a second graphical object associated with the second object on the display 160.

The processor 120 may determine at least one of the position of display or size of each of the first graphical object and the second graphical object based on at least one of the first information, the second information, or information associated with the fourth partial image. The information associated with the fourth partial image may include at least one of coordinate information corresponding to the fourth partial image or information available to specify or identify at least one object included in the fourth partial image. A specific method for determining at least one of the position of display or size of each of the first graphical object and the second graphical object by the processor 120 is described below.

According to an embodiment of the present disclosure, the processor 120 may receive a fourth input to release the designation of the first object. The processor 120 may release the designation of the first object according to the fourth input. Accordingly, although the image displayed on the display 160 is switched to a partial image that does not include the first object, the processor 120 may abstain from displaying the first graphical object associated with the first object. When the designation of the first object is released while the partial image not including the first object is being displayed on the display 160, the processor 120 may control the display 160 not to display the first graphical object.

According to an embodiment of the present disclosure, the processor 120 may determine whether the first object is recognized from the 360-degree omni-directional image using the first information associated with the first object after the first graphical object is displayed. Although the partial image including the first object is not displayed on the display 160, the processor 120 may store the whole image in the memory 130 or receive it from the external server, and thus, the processor 120 may determine whether the first object is recognized from the whole image.

The processor 120 may change the degree of transparency of the first graphical object unless the first object is recognized from the image. Here, the degree of transparency is an index indicating how transparent a graphical object displayed on the display 160 is. The first graphical object may be more transparent as the degree of transparency increases and more opaque as the degree of transparency decreases.

For example, the processor 120 may increase the degree of transparency of the first graphical object when the first object keeps on being not recognized from the image. The processor 120 may gradually increase the degree of transparency of the first graphical object in proportion to the period of time when the failure to recognize the first object lasts. Accordingly, the user may intuitively grasp the failure to recognize the first object from the image.

When the failure to recognize the first object from the image lasts for a preset time, the processor 120 may control the display 160 not to display the first graphical object. Thus, the user may intuitively recognize that the first object the user designated on his/her own has disappeared from the whole image.

When the first object is recognized again from the image, the processor 120 may turn the degree of transparency of the first graphical object back to the original degree of transparency.

According to an embodiment of the present disclosure, the processor 120 may designate a partial image itself, but not only an object included in the partial image, according to a user input. For example, the processor 120 may receive, from the user, an input for designating the first partial image of the image being displayed on the display 160, but rather than a particular object. The electronic device 101 may designate the first partial image itself being currently displayed on the display 160 according to the input for designating the first partial image.

The processor 120 may store the first information associated with the designated first partial image in the memory 130. The first information associated with the first partial image may include various pieces of information available to specify or identify the first partial image. For example, the first information associated with the first partial image may include at least one of coordinate information corresponding to the first partial image or information available to specify or identify at least one object included in the first partial image. The coordinate information corresponding to the first partial image may include coordinate information indicating the center of the first partial image or coordinate information indicating a particular point of the first partial image. The pieces of information included in the first information associated with the first partial image are merely an example and are not limited thereto. Various pieces of information available to specify or identify the first partial image may be included in the first information associated with the first partial image.

According to an embodiment of the present disclosure, when the image displayed on the display 160 is switched from the first partial image to the second partial image of the image, the processor 120 may display the first graphical object associated with the first partial image on the display 160.

The first graphical object may include at least one of an icon or a thumbnail image associated with the first partial image. For example, the first graphical object may include a thumbnail image or icon indicating the first partial image or at least one object included in the first partial image.

According to an embodiment of the present disclosure, upon receipt of a second input to select the first graphical object, the processor 120 may switch the image displayed on the display 160 from the second partial image to the first partial image according to the first information. According to a user input for switching the image displayed on the display 160 or a move of the electronic device 101 sensed by the sensor, the processor 120 may immediately switch the image displayed on the display 160 from the second partial image to the first partial image according to the second input, but rather than sequentially switching the image displayed on the display 160. Thus, the user may view the partial image, which he/she has designated, at his desired time.

According to an embodiment of the present disclosure, the processor 120 may determine whether a first event related to the designated first partial image occurs after the first graphical object is displayed on the display 160. For example, when at least one object included in the first partial image moves or a message or emoticon associated with the first partial image or at least one object included in the first partial image is searched from the memory 130 or the external server, the processor 120 may determine that the first event occurs. A specific method for determining the occurrence of the first event is described below in detail.

Upon determining that the first event occurs, the processor 120 may change at least one of the position of display, size, color, or shape of the first graphical object and display on the display 160. Upon determining that the first event occurs, the processor 120 may output at least one of a vibration or sound to notify the user of the occurrence of the first event. Thus, the user may recognize the occurrence of the event associated with the first partial image even without viewing the first partial image through the display 160.

According to an embodiment of the present disclosure, the processor 120 may designate the second partial image upon receipt of a third input for designating the second partial image after the image displayed on the display 160 is switched from the first partial image to the second partial image. The processor 120 may designate a plurality of partial images as well as one partial image, according to, e.g., a user input. A method for designating the second partial image is the same as the method for designating the first partial image described above, and no further description thereof is presented below.

When the image displayed on the display 160 is switched to a third partial image of the image, the processor 120 may display the first graphical object associated with the designated first partial image and the second graphical object associated with the designated second partial image on the display 160. The third partial image may be a partial image that is, at least partially, different from the first partial image and the second partial image.

According to an embodiment of the present disclosure, the processor 120 may release the designation of the partial image according to an input for releasing the designation of the partial image. For example, the processor 120 may receive a fourth input for releasing the designation of the designated first partial image and release the designation of the first partial image according to the fourth input.

According to an embodiment of the present disclosure, the processor 120 may store information associated with the first object when recognizing the first object in the first partial image. The information associated with the first object may include various pieces of information for identifying or specifying the first object. Although the first partial image is not displayed on the display 160, the processor 120 may store the whole image in the memory 130 or receive it from the external server, and thus, the processor 120 may determine whether the first object is recognized in the first partial image.

The processor 120 may change the degree of transparency of the first graphical object unless the first object is recognized in the first partial image. For example, the processor 120 may increase the degree of transparency of the first graphical object when the first object keeps on being not recognized from the first partial image. The processor 120 may gradually increase the degree of transparency of the first graphical object in proportion to the period of time when the failure to recognize the first object lasts. Accordingly, the user may intuitively grasp the failure to recognize the first object in the first partial image that he/she has designated.

When the failure to recognize the first object from the first partial image lasts for a preset time, the processor 120 may control the display 160 not to display the first graphical object. Accordingly, the user may intuitively recognize that the first object has disappeared from the first partial image.

According to an embodiment of the present disclosure, the electronic device 101 may display a 360-degree omnidirectional image through the display 160 or may alternatively control an external electronic device to display the image. The display 160 may display a user interface for controlling the external electronic device.

For example, the processor 120 may receive an input for switching the image displayed on the display of the external electronic device from the user. The processor 120 may transmit a control signal for switching the image displayed on the external electronic device through the communication interface 170 to the external electronic device based on the input. The external electronic device may switch the displayed image according to the control signal. As such, the user may control the external electronic device through the user interface displayed on the display 160.

According to an embodiment of the present disclosure, the processor 120 may designate a first object included in a first partial image displayed on the external electronic device when receiving a first input for designating the first object. For example, the processor 120 may receive information about the first partial image from the external electronic device and recognize and designate the first object from the first partial image. The processor 120 may store first information associated with the designated first object in the memory 130.

The processor 120 may also transmit at least one signal indicating that the first object has been designated or the first information through the communication interface 170 to the external electronic device. The external electronic device may recognize the designation of the first object through the signal indicating that the first object has been designated or the first information and output a message indicating the designation of the first object.

The processor 120 may display a first graphical object corresponding to the first object on the user interface based on the first information. The first graphical object may be one for indicating that the first object has been designated and may include various graphical objects or messages.

Upon receiving a second input for selecting the first graphical object, the processor 120 may transmit a first control signal for switching the image displayed on the external electronic device to a second partial image of the image including the first object according to the first information to the external electronic device through the communication interface 170. The external electronic device may receive the first control signal and switch the displayed image from the first object to the second partial image including the first object according to the first control signal. For example, where the first control signal includes information for specifying or identifying the second partial image, the external electronic device may display the second partial image according to the information.

Unless the first control signal includes the information, the external electronic device may identify the second partial image including the first object from the whole image according to the first control signal and display the identified second partial image.

According to an embodiment of the present disclosure, when the image displayed on the external electronic device is switched to a third partial image of the image, the processor 120 may transmit a second control signal for displaying the second graphical object associated with the first object through the communication interface 170 to the external electronic device. The external electronic device may display the second graphical object on the display according to the second control signal. The second graphical object may include at least one of an icon or a thumbnail image associated with the first object.

The processor 120 may determine whether a first event associated with the first object occurs after the second graphical object is displayed on the external electronic device. Upon determining that the first event occurs, the processor 120 may transmit a third control signal for changing at least one of a position, size, color, or shape of the second graphical object displayed on the external electronic device through the communication interface 170 to the external electronic device. The external electronic device may change at least one of the position, size, color, or shape of the second graphical object according to the third control signal.

According to an embodiment of the present disclosure, the processor 120 may receive a fourth input for releasing the designation of the first object and release the designation of the first object according to the fourth input. The processor 120 may also perform control to prevent the first graphical object from being displayed on the user interface. When the second graphical object is being displayed through the external electronic device, the processor 120 may transmit a fourth control signal for removing the second graphical object from the display through the communication interface 170 to the external electronic device. The external electronic device may remove the second graphical object from the display according to the fourth control signal.

Figure 2:
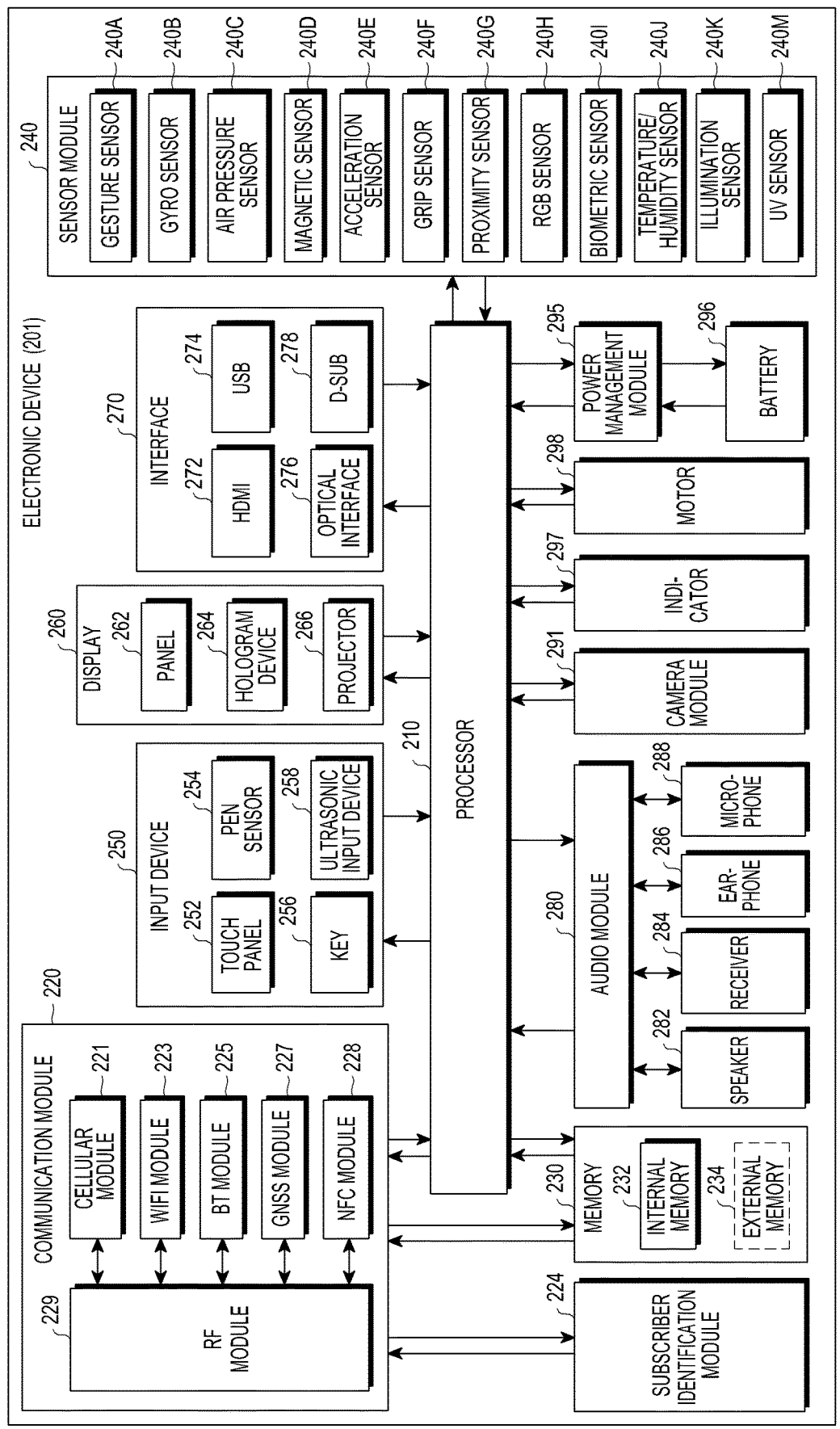
FIG. 2 is a block diagram illustrating a program module according to an embodiment of the present disclosure.

FIG. 2 is a block diagram illustrating an electronic device 201 according to an embodiment of the present disclosure. The electronic device 201 may include the whole or part of the configuration of, e.g., the electronic device 101 shown in FIG. 1. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an OS or application programs, and the processor 210 may process and compute various data. The processor 210 may be implemented in, e.g., a system on chip (SoC). According to an embodiment of the present disclosure, the processor 210 may further include a graphic processing unit (GPU) and/or an (ISP). The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., a cellular module 221, a Wi-Fi module 223, a BT module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a SIM 224 (e.g., the SIM card). According to an embodiment of the present disclosure, the cellular module 221 may perform at least some of the functions providable by the processor 210. According to an embodiment of the present disclosure, the cellular module 221 may include a CP. According to an embodiment of the present disclosure, at least some (e.g., two or more) of the cellular module 221, the Wi-Fi module 223, the BT module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the BT module 225, the GNSS module 227, or the NFC module 228 may communicate RF signals through a separate RF module. The subscription identification module 224 may include, e.g., a card including a SIM, or an embedded SIM, and may contain unique identification information (e.g., an IC card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random-access memory (DRAM), a static RAM (SRAM), a synchronous DRAM (SDRAM), etc.) or a non-volatile memory (e.g., a one-time programmable ROM (OTPROM), a programmable ROM (PROM), an erasable and PROM (EPROM), an electrically erasable and PROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory Stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio (or biometric) sensor 240I, a temperature/humidity sensor 240J, an illumination sensor 240K, or an ultra violet (UV) sensor 240M. Additionally or alternatively, the sensor module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensor module. According to an embodiment of the present disclosure, the electronic device 201 may further include a processor configured to control the sensor module 240 as part of the processor 210 or separately from the processor 210, and the electronic device 1801 may control the sensor module 240 while the processor 1801 is in a sleep mode.

The input device 250 may include, e.g., a touch panel 252, a (digital) pen sensor 254, a key 256, or an ultrasonic input device 258. The touch panel 252 may use at least one of capacitive, resistive, IR, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three-dimensional (3D) images (holograms) in the air by using light interference. The projector 266 may display an image by projecting light onto a screen. The screen may be, for example, located inside or outside of the electronic device 201. The interface 270 may include e.g., a HDMI 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a SD card/multimedia card (MMC) interface, or IR data association (IrDA) standard interface.

The audio module 280 may converting, e.g., a sound signal into an electrical signal and vice versa. At least a part of the audio module 280 may be included in e.g., the input/output interface 150 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an ISP, or a flash such as an LED or xenon lamp. The power management module 295 may manage power of the electronic device 201, for example. According to an embodiment of the present disclosure, the power management module 295 may include a power management IC (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo' standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
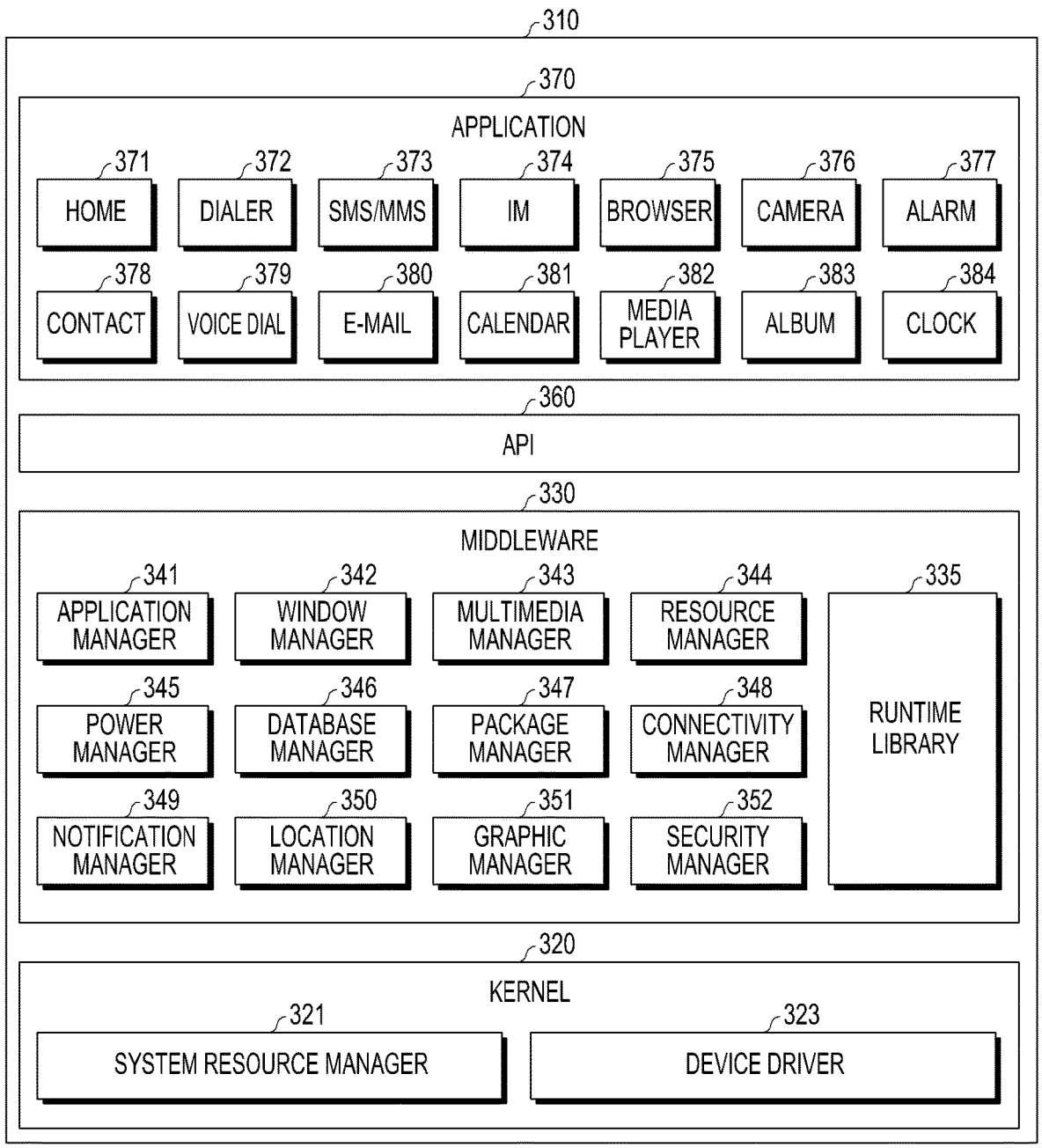
FIG. 3 is a block diagram illustrating an electronic device according to an embodiment of the present disclosure.

FIG. 3 is a block diagram illustrating a program module according to an embodiment of the present disclosure; According to an embodiment of the present disclosure, the program module 310 (e.g., the program 140) may include an OS controlling resources related to the electronic device (e.g., the electronic device 101) and/or various applications (e.g., the application program 147) driven on the OS. The OS may include, e.g., Android™, iOS™, Windows™, Symbian™, Tizen™, or Bada™.

Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a BT driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the applications 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the OS. The middleware 330 may dynamically omit some existing components or add new components. The API 360 may be a set of, e.g., API programming functions and may have different configurations depending on the OS. For example, in the case of Android or iOS, one API set may be provided per platform, and in the case of Tizen, two or more API sets may be offered per platform.

The application 370 may include an application that may provide, e.g., a home 371, a dialer 372, an short message service (SMS)/multimedia messaging service (MIMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information). According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device.

According to an embodiment of the present disclosure, the application 370 may include an application (e.g., a health-care application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

Figure 4A:
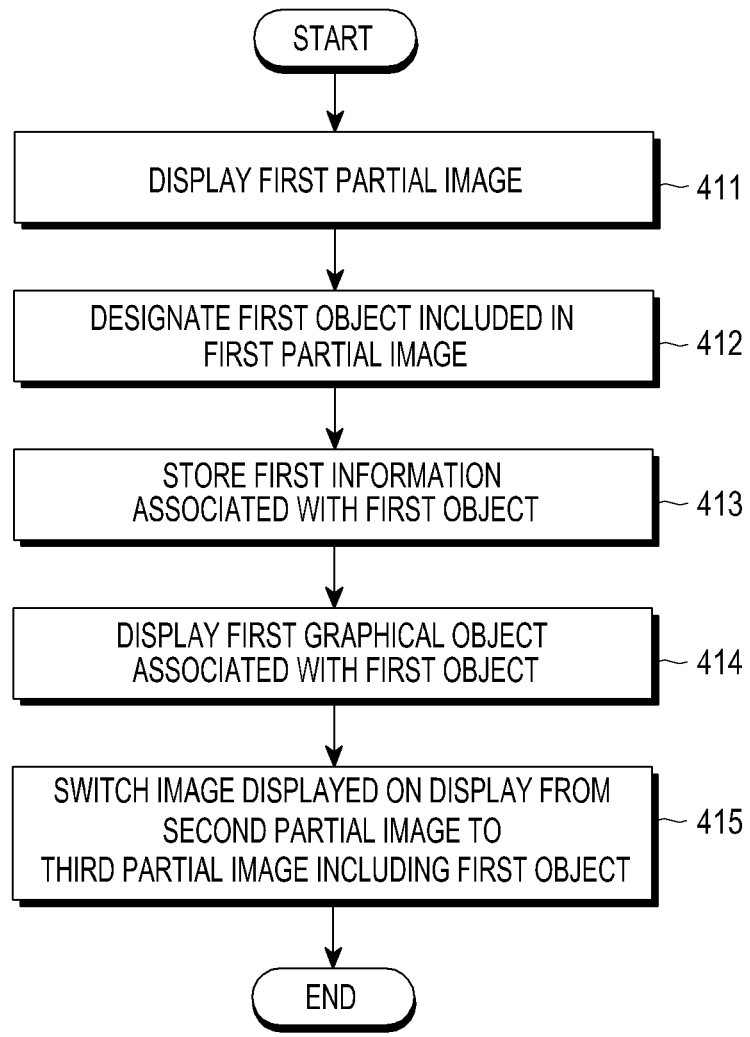
FIGS. 4A and 4B are flowcharts illustrating methods for switching images that are displayed by an electronic device according to various embodiments of the present disclosure.
Figure 4B:
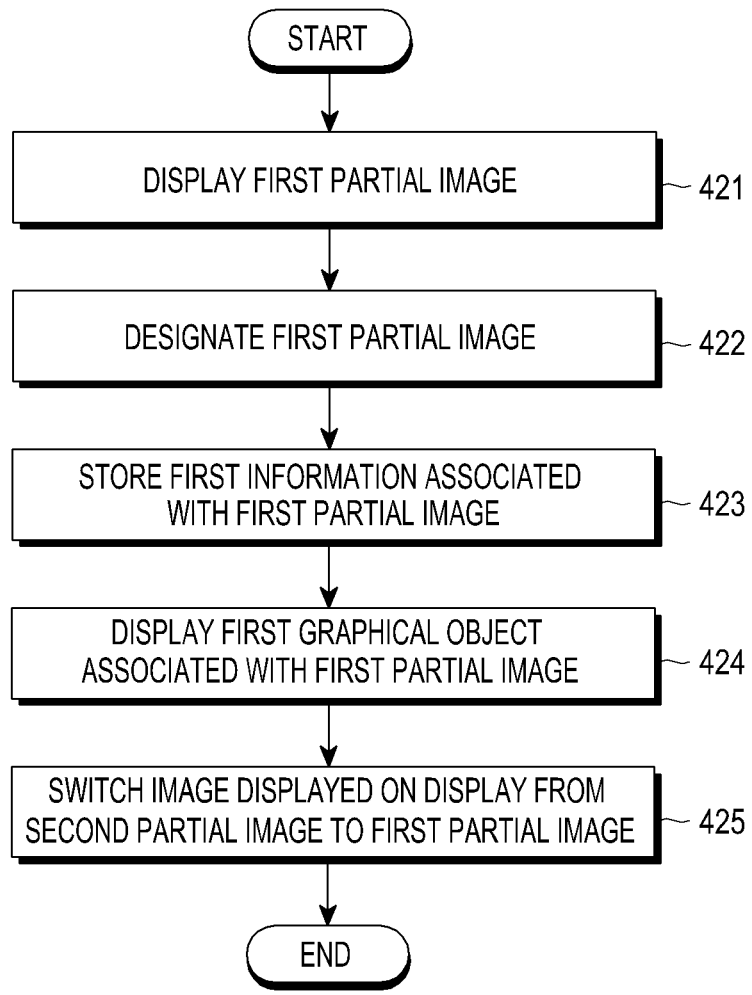

FIGS. 4A and 4B are flowcharts illustrating methods for switching images by an electronic device according to various embodiments of the present disclosure.

FIG. 4A is a flowchart illustrating a method for switching images by the electronic device 101 when an object is designated according to an embodiment of the present disclosure.

In operation 411, the electronic device 101 may display a first partial image of a 360-degree omni-directional image. The electronic device 101 may display the first partial image of the image according to a user input or setting.

In operation 412, the electronic device 101 may designate a first object upon receipt of a first input for designating the first object included in the first partial image displayed. The electronic device 101 may recognize the first object corresponding to the first input in the first partial image and designate the recognized first object.

In operation 413, the electronic device 101 may store first information associated with the designated first object. The first information associated with the first object may include various pieces of information available to specify or identify the first object.

In operation 414, when the displayed image is switched from the first partial image to a second partial image of the image, the electronic device 101 may display a first graphical object associated with the first object. The first graphical object may include at least one of an icon or a thumbnail image associated with the first object.

In operation 415, upon receipt of a second input to select the first graphical object, the electronic device 101 may switch the image displayed on the electronic device 101 from the second partial image to a third partial image of the image including the first object using the first information. The electronic device 101 may switch the image displayed on the electronic device 101 to the third partial image immediately according to the second input, rather than sequentially.

FIG. 4B is a flowchart illustrating a method for switching images by the electronic device 101 when a partial image is designated according to an embodiment of the present disclosure.

In operation 421, the electronic device 101 may display a first partial image of an image.

In operation 422, the electronic device 101 may designate the first partial image upon receipt of a first input for designating the first partial image.

In operation 423, the electronic device 101 may store first information associated with the first partial image. The first information associated with the first partial image may include various pieces of information available to specify or identify the first partial image in the image.

In operation 424, when the displayed image is switched from the first partial image to a second partial image of the image, the electronic device 101 may display a first graphical object associated with the first partial image. The first graphical object may include at least one of an icon or a thumbnail image associated with the first partial image.

In operation 425, upon receipt of a second input to select the first graphical object, the electronic device 101 may switch the displayed image from the second partial image to the first partial image according to the first information. The electronic device 101 may switch the displayed image from the second partial image to the first partial image immediately according to the second input, rather than sequentially.

Figure 5A:
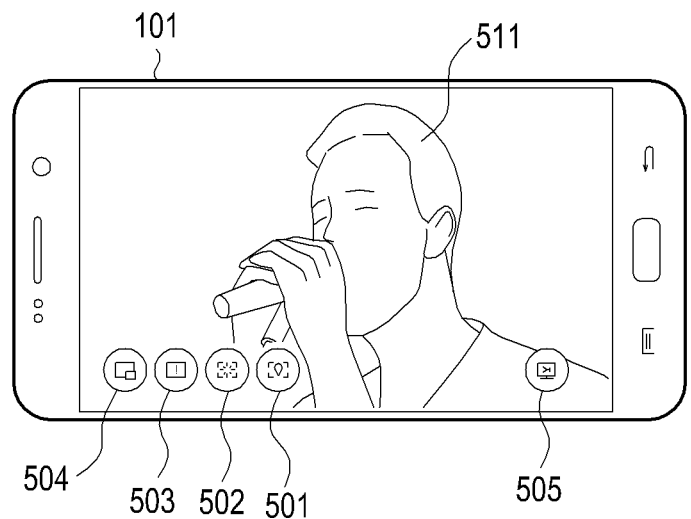
FIGS. 5A and 5B are views illustrating screens displayed by an electronic device according to various embodiments of the present disclosure.
Figure 5B:
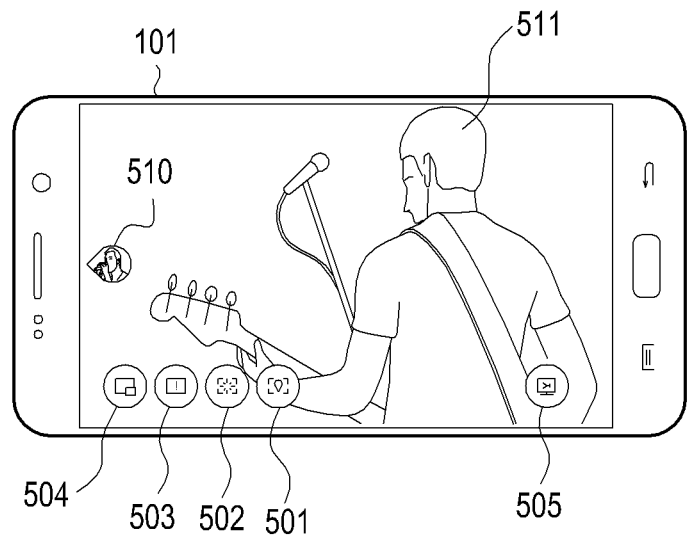

FIGS. 5A and 5B are views illustrating screens displayed by an electronic device according to various embodiments of the present disclosure.

Referring to FIG. 5A, the electronic device 101 may display a first partial image of a 360-degree omni-directional image. The electronic device 101 may display icons for performing various functions, along with the first partial image. For example, the electronic device 101 may display a first icon 501 for executing the function of designating an object or image, a second icon 502 for executing the function of capturing an image, a third icon 503 for executing the function of displaying information about an image, a fourth icon 504 for executing the function of displaying channel information related to an image, and a fifth icon 505 for executing a mirroring function.

Upon receipt of a first input for selecting the first icon 501, the electronic device 101 may designate the first partial image or a first object included in the first partial image and store first information associated with the first object or the first partial image. The first information may include various pieces of information available to specify or identify the first partial image or the first object 511.

Referring to FIG. 5B, after designating the first object 511 or the first partial image according to the first input, the electronic device 101 may switch the image displayed on the display to a second partial image of the image according to a user input or a move of the electronic device sensed by a sensor. The second partial image displayed on the electronic device 101 may include the same first object 511 as the first object 511 included in the first partial image as shown in FIG. 5B. However, the first object 511 in the second partial image may be displayed at a different angle from that of the first partial image of FIG. 5A.

The electronic device 101 may display a first graphical object 510 related to the designated first partial image or the designated first object 511 as shown in FIG. 5B. The first graphical object 510 may be displayed as an icon indicating the designated first object 511 or first partial image. Where the first partial image is designated, the first graphical object 510 may be displayed as an icon related to the whole first partial image. As such, the first graphical object 510 may be displayed in various ways for indicating the designated first object 511 or the designated first partial image.

Upon receipt of a second input for selecting the first graphical object 510 from the user, the electronic device 101 may switch the image displayed on the display to a third partial image including the first object when the first object 511 is designated or to the first partial image of FIG. 5A when the first partial image is designated.

For example, where two or more of a plurality of partial images included in the image include the designated first object 511, the electronic device 101 may determine that any one of the two or more partial images including the first object 511 is the third partial image. The electronic device 101 may determine the third partial image from among the plurality of partial images based on first information related to the first object 511.

For example, the electronic device 101 may compare each of the pieces of information related to the first object 511, which are included in their respective partial images, with the first information related to the designated first object 511 and determine that the partial image including the information related to the first object 511 corresponding to the first information among the plurality of partial images is the third partial image according to a result of the comparison.

Even when the pieces of information related to the first object 511 included in their respective partial images fail to exactly match the first information, the electronic device 101 may determine that, among the pieces of information related to the first object 511 included in their partial images, the piece of information related to the first object 511, which most closely matches the first information, corresponds to the first information. Accordingly, the electronic device 101 may determine that the partial image including the information related to the first object 511, which mostly closely matches the first information, among the plurality of partial images, is the third partial image.

For example, since although the first partial image of FIG. 5A and the second partial image of FIG. 5B both include the first object 511, the information related to the first object 511 included in the first partial image more closely matches the first information than the information related to the first object 511 included in the second partial image, the electronic device 101 may determine that the first partial image is the third partial image.

As such, the electronic device 101 may enable the display of a partial image including an object designated by the user or a partial image designated by the user simply by the selection of the first graphical object 510, allowing the user to switch and view his/her desired images in an easier manner.

Figure 6A:
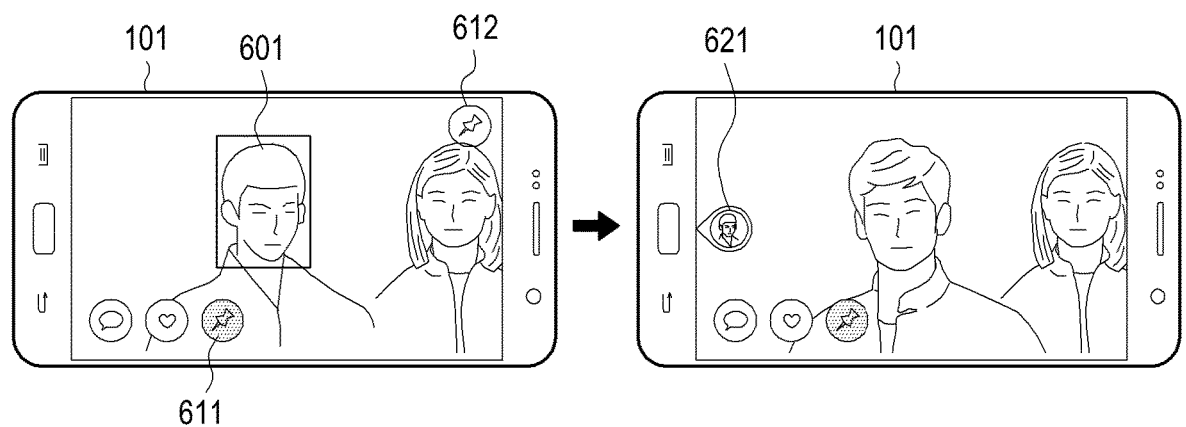
FIGS. 6A and 6B are views illustrating methods for designating a partial image or an object included in a partial image by an electronic device according to various embodiments of the present disclosure.
Figure 6B:
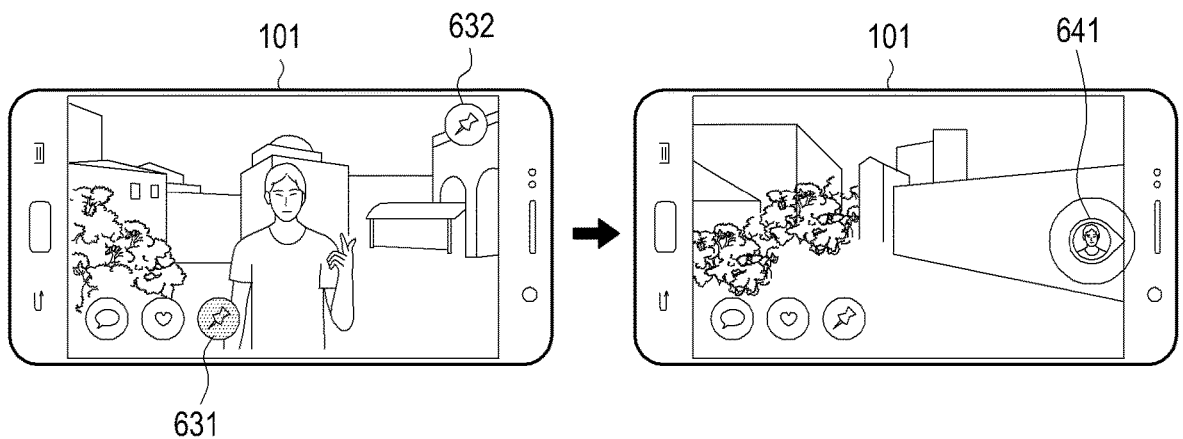

FIGS. 6A and 6B are views illustrating methods for designating a partial image or an object included in a partial image by an electronic device according to various embodiments of the present disclosure.

Referring to FIG. 6A, the electronic device 101 may store a first object 601 included in a first partial image displayed through the display according to an input for designating the first object 601 and store information associated with the first object 601.

The electronic device 101 may display an icon for executing the function of designating an object included in the display partial image, and upon receipt of a first input for selecting the icon 611, the electronic device 101 may designate the first object 601 included in the first partial image displayed on the electronic device 101. The electronic device 101 may recognize the first object 601 in the first partial image and designate the first object 601. The electronic device 101, after designating the first object 601, may display a graphical object 612 indicating that the first object 601 has been designated in a corner of the screen.

When the image displayed on the electronic device 101 is switched from the first partial image including the first object 601 to a second partial image of the image which does not include the first object 601 according to a move of the electronic device 101 or a user input, the electronic device 101 may display a first graphical object 621 associated with the designated first object 601.

The electronic device 101 may also designate the displayed first partial image as shown in FIG. 6B. For example, the electronic device 101 may display an icon 631 for executing the function of designating the displayed first partial image, and upon receipt of a first input for selecting the icon 631, the electronic device 101 may designate the displayed first partial image. The electronic device 101, after designating the first partial image, may display a graphical object 632 indicating that the first partial image has been designated in a corner of the screen.

The electronic device 101 may designate the displayed first partial image and store first information associated with the first partial image. The first information associated with the first partial image may include various pieces of information available to specify or identify the first partial image from the whole image.

When the image displayed on the electronic device 101 is switched from the first partial image to the second partial image according to a move of the electronic device 101 or a user input, the electronic device 101 may display a first graphical object 641 associated with the first partial image.

Figure 7:
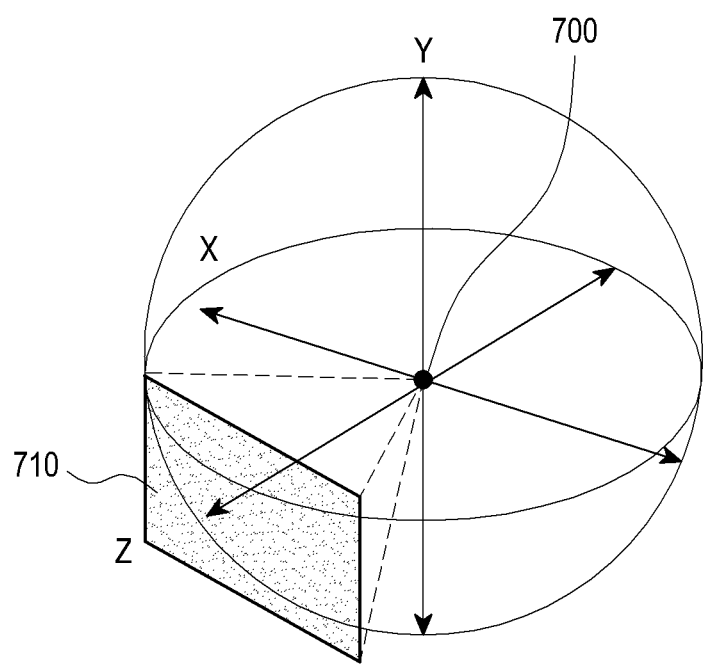
FIG. 7 is a view illustrating coordinate information corresponding to a partial image according to an embodiment of the present disclosure.

FIG. 7 is a view illustrating coordinate information corresponding to a partial image according to an embodiment of the present disclosure.

According to an embodiment of the present disclosure, coordinate information corresponding to a partial image of a 360-degree omni-directional image may be set to be able to specify or identify a relative position of the partial image in the image to specify or identify the partial image.

For example, since the image may be generated to represent all 360-degree directions, the image may be represented as a sphere as shown in FIG. 7.

The coordinate information corresponding to a first partial image 710 displayed on the electronic device 101 may be set with respect to a central point 700 of the sphere. The coordinate information set in the first partial image 710 may be stored as first information associated with the first partial image 710. Accordingly, the electronic device 101 may specify or identify the first partial image 710 in the image using the first information associated with the first partial image 710.

Figure 8C:
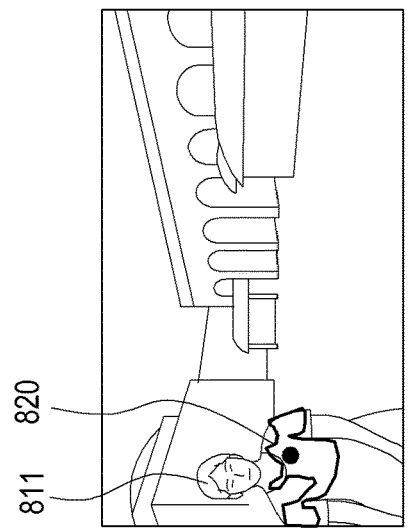
FIGS. 8A, 8B, and 8C are a view illustrating information associated with an object included in a partial image according to various embodiments of the present disclosure.
Figure 8B:
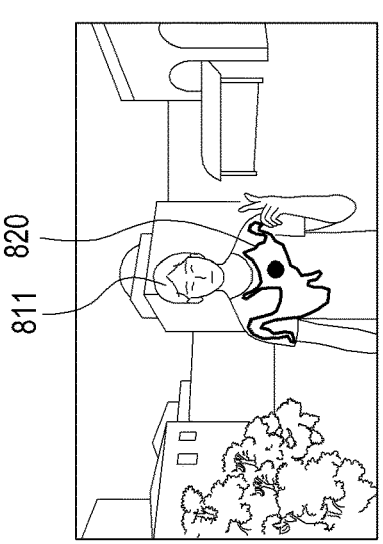
Figure 8A:
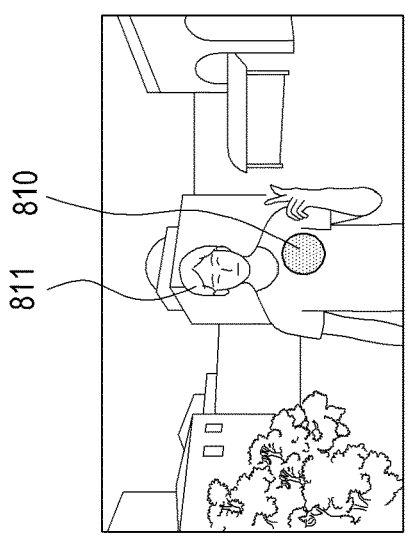

FIGS. 8A, 8B, and 8C are a view illustrating information associated with an object included in a partial image according to various embodiments of the present disclosure.

According to an embodiment of the present disclosure, the electronic device 101 may designate a first object included in a first partial image and store first information associated with the first object.

For example, the first information associated with the first object may include various pieces of information to specify or identify the first object. For example, the first information associated with the first object may include at least one of color information, shape information, or coordinate information corresponding to the first object. The electronic device 101, upon determining that the first object moves, may update in real-time the coordinate information corresponding to the first object according to the move of the first object.

For example, the electronic device 101 may designate the first object 811 according to an input 810 for designating the first object 811 included in the first partial image as shown in FIG. 8A. The electronic device 101 may recognize the first object 811 included in the first partial image according to the input 810 and store first information associated with the first object 811. For example, the electronic device 101 may store information about a shape 820 shown on the shirt worn by the first object 811 or the color of the shape 820 as shown in FIG. 8B, as the information associated with the first object 811. The electronic device 101 may store the coordinate information about the first object 811 and update the coordinate information about the first object 811 according to a move of the first object 811.

Although the image displayed on the electronic device 101 is switched to the partial image as shown in FIG. 8C, the electronic device 101 may specify, identify, and recognize the first object 811 from the switched partial image based on the information corresponding to the first object 811. Although not shown, various pieces of information for specifying or identifying the first object 811 may be stored as the first information corresponding to the first object 811. The electronic device 101 may specify, identify, and recognize the first object 811 by tracking the overall 360-degree omni-directional image using the first information corresponding to the first object 811. Accordingly, even when the image displayed through the display is switched to a partial image not including the first object 811, the electronic device 101 may recognize the first object 811 from the overall image and identify the partial image including the first object 811.

Figure 9A:
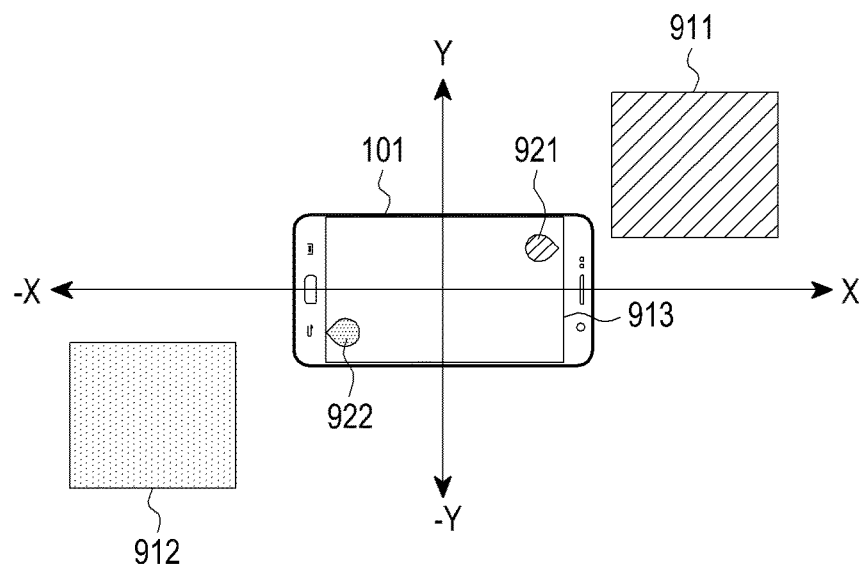
FIGS. 9A and 9B are views illustrating methods for displaying a graphical object associated with an object or a partial image designated by an electronic device according to various embodiments of the present disclosure.
Figure 9B:
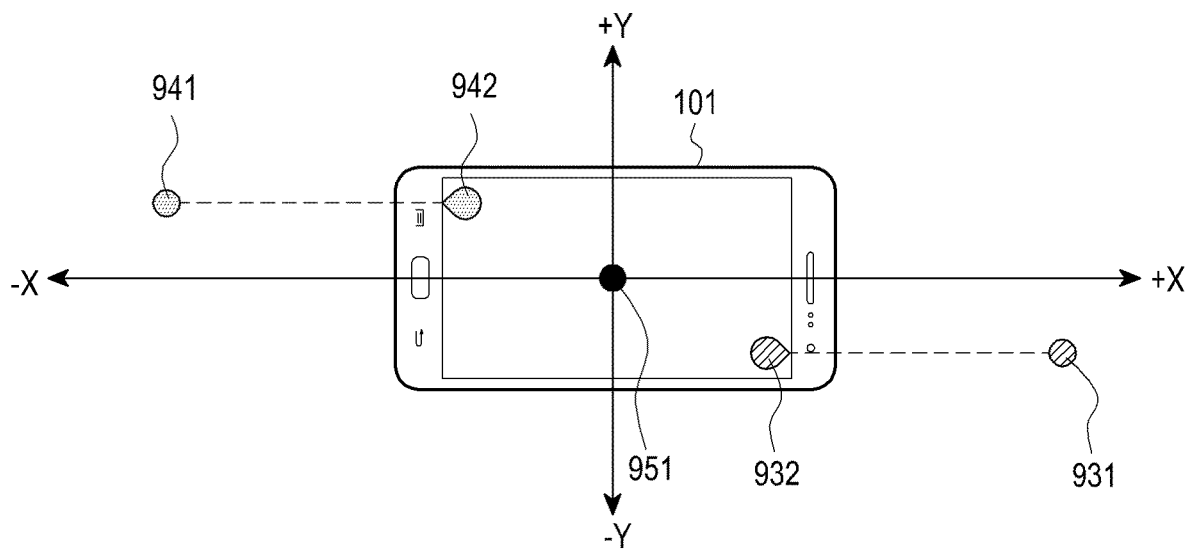

FIGS. 9A and 9B are views illustrating methods for displaying a graphical object associated with an object or a partial image designated by an electronic device according to various embodiments of the present disclosure.

Referring to FIG. 9A, the electronic device 101 may determine the position of display of a graphical object associated with a designated partial image according to the position of the designated partial image.

Referring to FIG. 9A, the electronic device 101 may designate a first partial image 911 and a second partial image 912 and display a third partial image 913 that, at least partially, differs from the first partial image 911 and the second partial image 912.

The electronic device 101 may display a first graphical object 921 and a second graphical object 922 associated with the designated first partial image 911 and second partial image 912, respectively, while displaying the third partial image 913.

The position of display of the first graphical object 921 and the second graphical object 922 may be determined according to relative positions of the first partial image 911 and the second partial image 912 with respect to the third partial image 913.

For example, as shown in FIG. 9A, the first partial image 911 is positioned in the first quadrant (+x direction, +y direction) with respect to virtual axes of the third partial image 913, and the second partial image 912 is positioned in the third quadrant (−x direction, −y direction) with respect to the virtual axes of the third partial image 913.

In this case, the first graphical object 921 associated with the first partial image 911 may be displayed on an upper and right portion of the display, and the second graphical object 922 may be displayed on a lower and left portion of the display. As such, the electronic device 101 may display graphical objects associated with their respective designated partial images depending on the respective relative positions of the designated partial images with respect to the partial image being currently displayed. Thus, the user may intuitively recognize where each designated partial image is positioned relative to the partial image being currently displayed.

Referring to FIG. 9B, the electronic device 101 may determine the position of display of a graphical object associated with a designated object according to the position of the designated object.

Referring to FIG. 9B, the electronic device 101 may designate a first object 931 and a second object 941 and display a partial image not including the first object 931 and the second object 941.

The electronic device 101 may display a first graphical object 932 and a second graphical object 942 associated with the first object 931 and the second object 941, respectively.

The position of display of the first graphical object 932 and the second graphical object 942 may be determined according to relative positions of the first object 931 and the second object 941 with respect to the central point 951 of the partial image displayed on the electronic device 101.

For example, referring to FIG. 9B, the first object 931 is positioned in the fourth quadrant (+x direction, −y direction) with respect to the central point 951, and the second object 941 is positioned in the second quadrant (−x direction, +y direction) with respect to the central point 951.

In this case, the first graphical object 932 may be displayed on a lower and right portion of the display, and the second graphical object 942 may be displayed on an upper and left portion of the display. As such, the electronic device 101 may display graphical objects associated with their respective designated objects depending on the respective relative positions of the designated objects with respect to the central point of the partial image being currently displayed.

Figure 10A:
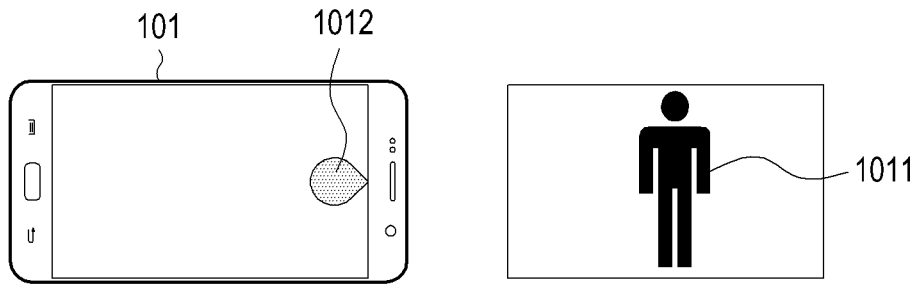
FIGS. 10A and 10B are views illustrating methods for determining the size of a graphical object as per the size of an object designated by an electronic device according to various embodiments of the present disclosure.
Figure 10B:
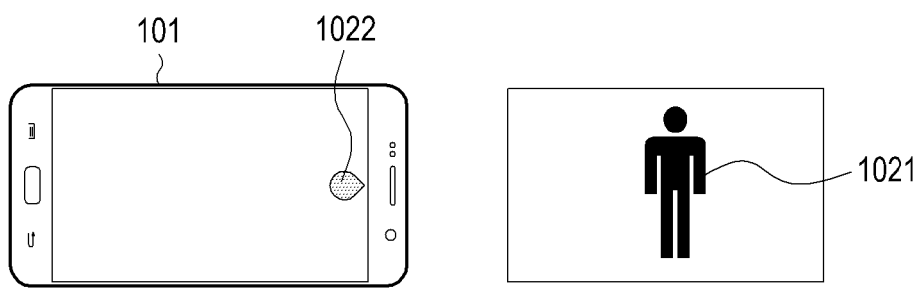

FIGS. 10A and 10B are views illustrating methods for determining the size of a graphical object as per the size of an object designated by an electronic device according to an embodiment of the present disclosure.

According to an embodiment of the present disclosure, the electronic device 101 may determine the size of a graphical object associated with a designated object depending on the size of the designated operation. Referring to FIGS. 10A and 10B, the electronic device 101 may display a partial image not including a first object 1011 and a second object 1021, with the first object 1011 and the second object 1021 designated. The electronic device 101 may display a first graphical object 1012 associated with the first object 1011 and a second graphical object 1022 associated with the second object 1021.

Referring to FIG. 10A, the electronic device 101 may determine the size of the first graphical object 1012 depending on the size of the first object 1011. Likewise, the electronic device 101 may determine the size of the second graphical object 1022 depending on the size of the second object 1021 as shown in FIG. 10B. For example, the electronic device 101 may determine the size of the graphical object depending on mapping information between the size of the graphical object and the size of the object stored in the memory.

For example, where the size of the first object 1011 is larger than the size of the second object 1021 as shown in FIGS. 10A and 10B, the electronic device 101 may display the first graphical object 1012 in a larger size than the second graphical object 1022. Generally, the size of an object included in an image taken of a target by a camera may be varied depending on the distance between the camera and the target. For example, when the distance between the camera and the target decreases, the object in the image may be displayed bigger, and when the distance between the camera and the target increases, the object may be displayed smaller. In order to allow the user to intuitively recognize the size of the object given such nature, the electronic device 101 may determine the size of the graphical object depending on the size of the object in the image.

When the object is resized in the image as the object moves in the partial image, the electronic device 101 may resize and display the graphical object according to the resized object.

Figure 11A:
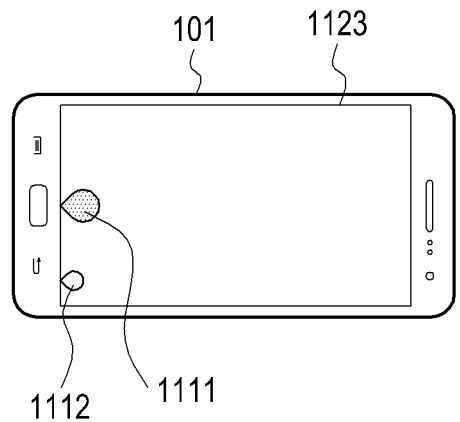
FIGS. 11A, 11B, and 11C are views illustrating methods for determining the size of a graphical object as per the distance between a designated partial image and a partial image being displayed by an electronic device according to various embodiments of the present disclosure.
Figure 11B:
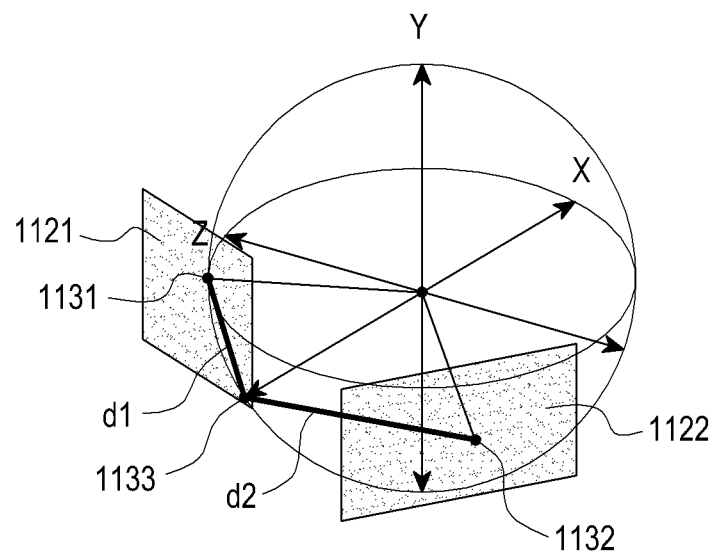
Figure 11C:
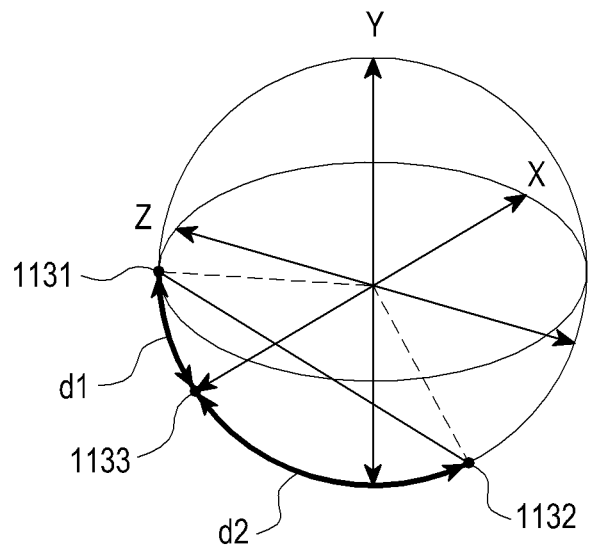

FIGS. 11A, 11B, and 11C are views illustrating methods for determining the size of a graphical object as per the distance between a designated partial image and a partial image being displayed by an electronic device according to various embodiments of the present disclosure.

Referring to FIG. 11A, the electronic device 101 may display a third partial image 1123 that, at least partially, differs from a first partial image 1121 and a second partial image 1122, with the first partial image 1121 and the second partial image 1122 designated.

The electronic device 101 may display a first graphical object 1111 associated with the first partial image 1121 and a second graphical object 1112 associated with the second partial image 1122 in different sizes. The electronic device 101 may display the first graphical object 1111 and the second graphical object 1112 in different sizes depending on relative distances between the third partial image 1123 and the first partial image 1121 and between the third partial image 1123 and the second partial image 1122.

The distance between the third partial image 1123 and the first partial image 1121, hereinafter a "first distance," is assumed to be shorter than the distance between the third partial image 1123 and the second partial image 1122, hereinafter a "second distance," as shown in FIGS. 11A, 11B, and 11C.

In this case, as the first distance is shorter than the second distance, the electronic device 101 may display the first graphical object 1111 bigger than the second graphical object 1112. Thus, the user may intuitively recognize the distance between the partial image being currently displayed and each partial image designated.

According to an embodiment of the present disclosure, the electronic device 101 may calculate the first distance and the second distance using coordinate information corresponding to each of the first partial image 1121, the second partial image 1122, and the third partial image 1123. For example, the electronic device 101 may identify coordinate information corresponding to each of the central point 1131 of the first partial image 1121, the central point 1132 of the second partial image 1122, and the central point 1133 of the third partial image 1123 and calculate the first distance d1 and the second distance d2 according to the identified coordinate information as shown in FIG. 11B.

The electronic device 101 may also calculate the length of the arc from the central point 1131 of the first partial image 1121 and the central point 1133 of the third partial image 1123 as the first distance d1 and the length of the arc from the central point 1132 of the second partial image 1122 to the central point 1133 of the third partial image 1123 as the second distance d2, as shown in FIG. 11C.

As such, the electronic device 101 may determine the size of displayed graphical objects depending on the distance between a partial image being currently displayed and each designated partial image. The method for calculating the distance described above is merely an example and should not be limited thereto, and other various methods may rather be adopted to calculate the distance.

In the same manner as the methods for determining the size of a graphical object as described above in connection with FIGS. 11A to 11C, the size of a graphical object may be determined depending on the distance between the partial image being displayed on the electronic device 101 and each designated object. For example, the distance between the partial image being currently displayed and each designated object may be calculated, and the size of the graphical objects corresponding to their respective designated objects may be determined.

Figure 12A:
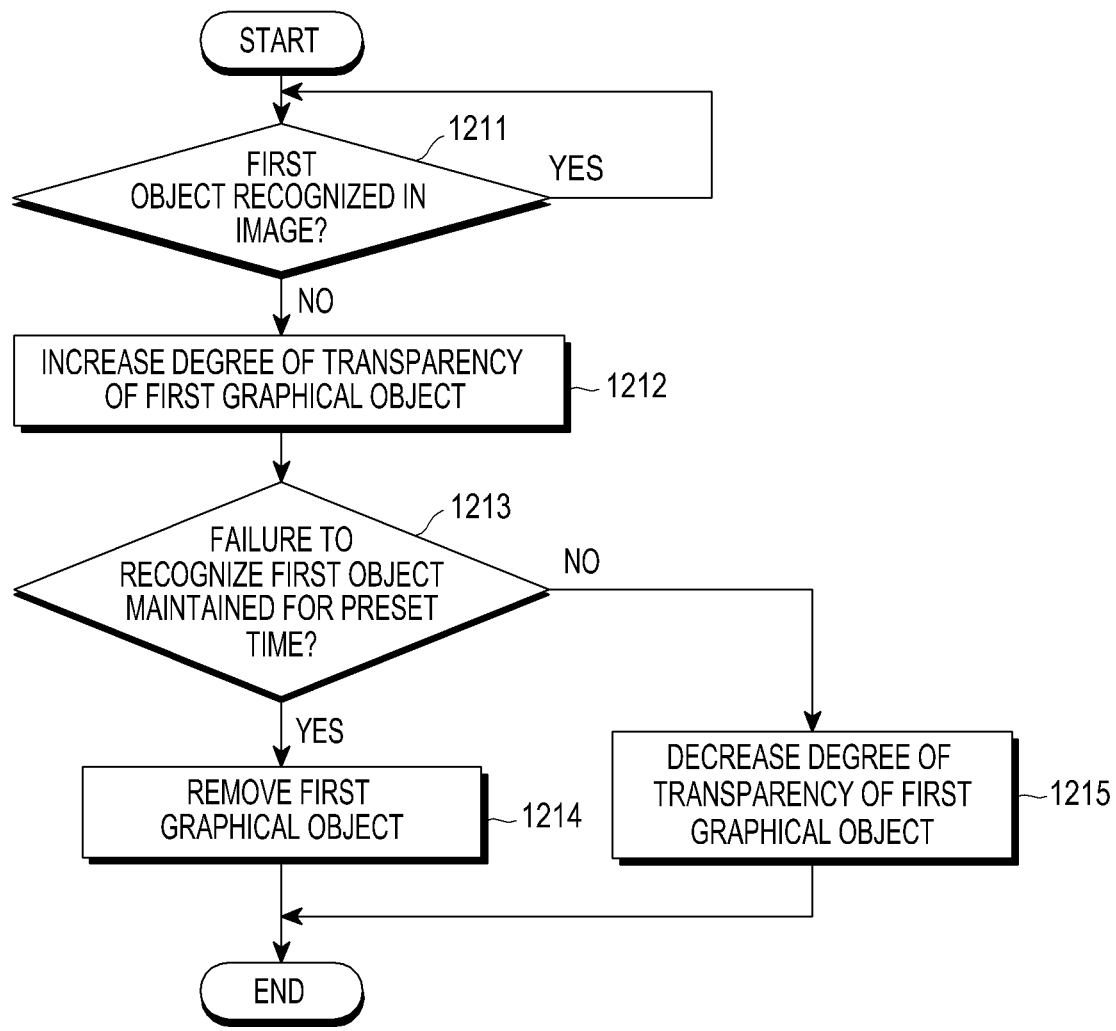
FIGS. 12A and 12B are flowcharts illustrating methods for changing the degree of transparency of a graphical object as per whether an object is recognized by an electronic device according to various embodiments of the present disclosure.
Figure 12B:
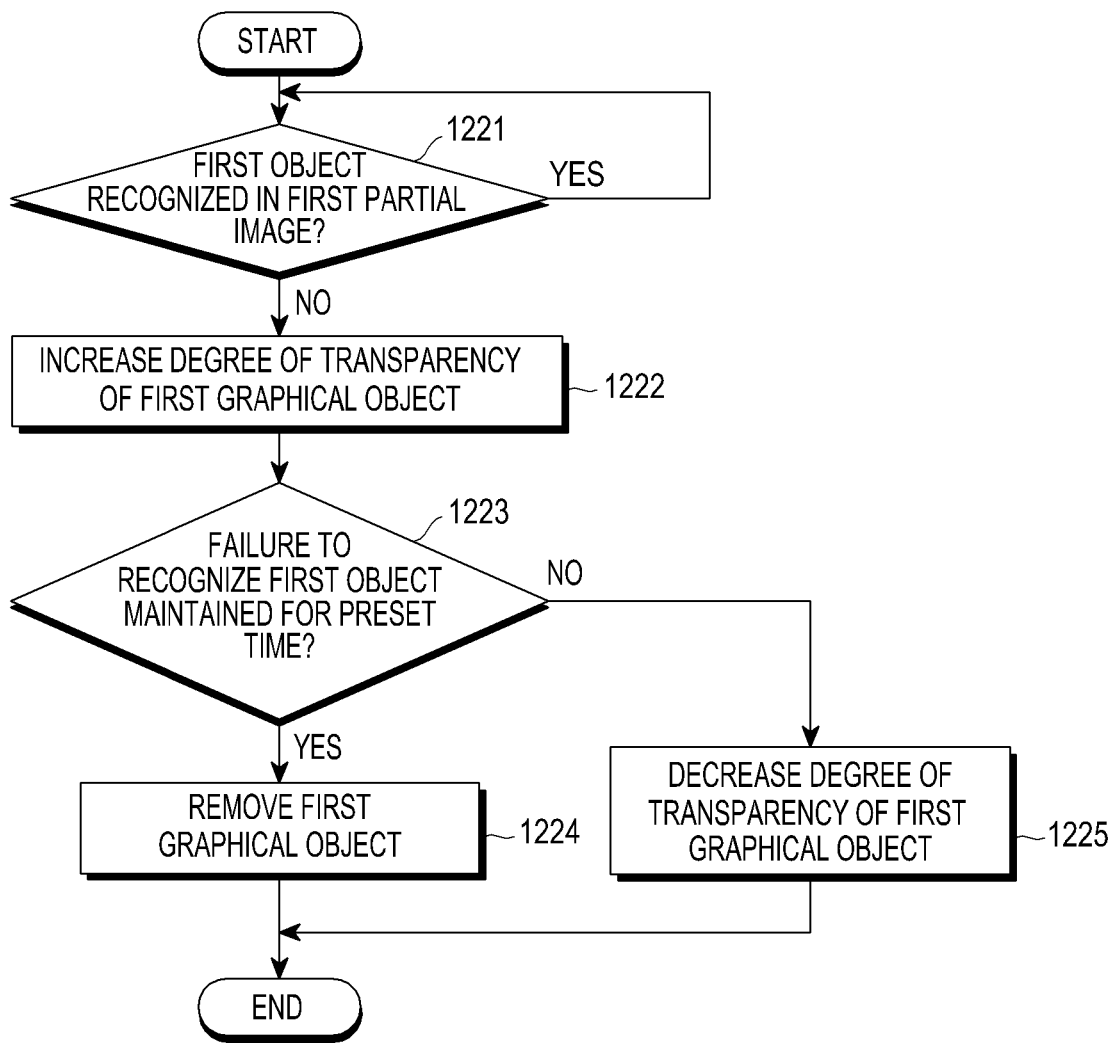

FIGS. 12A and 12B are flowcharts illustrating methods for changing the degree of transparency of a graphical object as per whether an object is recognized by an electronic device according to various embodiments of the present disclosure.

FIG. 12A is a flowchart illustrating a method for changing the degree of transparency of a graphical object by the electronic device 101 when an object is designated according to an embodiment of the present disclosure.

In operation 1211, the electronic device 101 may determine whether a first object designated is recognized from the whole image after a first graphical object associated with the first object is displayed.

For example, the electronic device 101 may determine whether the first object is recognized from the whole image according to preset cycles. Upon determining that the first object is recognized from the image, the electronic device 101 may repeatedly determine whether the first object is recognized from the image according to preset cycles.

In operation 1212, upon failure to recognize the first object from the image, the electronic device 101 may increase the degree of transparency of the first graphical object. For example, the electronic device 101 may increase the degree of transparency of the first graphical object when the first object keeps on being not recognized from the image.

In operation 1213, the electronic device 101 may determine whether the failure to recognize the first object from the image lasts for a preset time.

In operation 1214, when the failure to recognize the first object from the image is determined to last for the preset time, the electronic device 101 may remove the first graphical object from the display.

In operation 1215, upon recognizing again the first object from the image within a preset time, the electronic device 101 may decrease the degree of transparency of the first graphical object. For example, the electronic device 101 may decrease the degree of transparency of the first graphical object when the first object keeps on being recognized from the image.

FIG. 12B is a flowchart illustrating a method for changing the degree of transparency of a graphical object by the electronic device 101 when a partial image is designated according to an embodiment of the present disclosure.

In operation 1221, the electronic device 101 may determine whether a first object is recognized from a designated first partial image after a first graphical object associated with the first partial image is displayed. Here, the first object may include an object recognized form the first partial image upon designating the first partial image.

For example, the electronic device 101 may determine whether the first object is recognized from the first partial image according to preset cycles. Upon determining that the first object is recognized from the first partial image, the electronic device 101 may repeatedly determine whether the first object is recognized from the first partial image according to preset cycles.

In operation 1222, upon failure to recognize the first object from the first partial image, the electronic device 101 may increase the degree of transparency of the first graphical object. For example, the electronic device 101 may increase the degree of transparency of the first graphical object when the first object keeps on being not recognized from the first partial image.

In operation 1223, the electronic device 101 may determine whether the failure to recognize the first object from the first partial image lasts for a preset time.

In operation 1224, when the failure to recognize the first object from the first partial image is determined to last for the preset time, the electronic device 101 may remove the first graphical object from the display.

In operation 1225, upon recognizing again the first object from the first partial image within a preset time, the electronic device 101 may decrease the degree of transparency of the first graphical object. For example, the electronic device 101 may decrease the degree of transparency of the first graphical object when the first object keeps on being recognized from the first partial image.

Figure 13A:
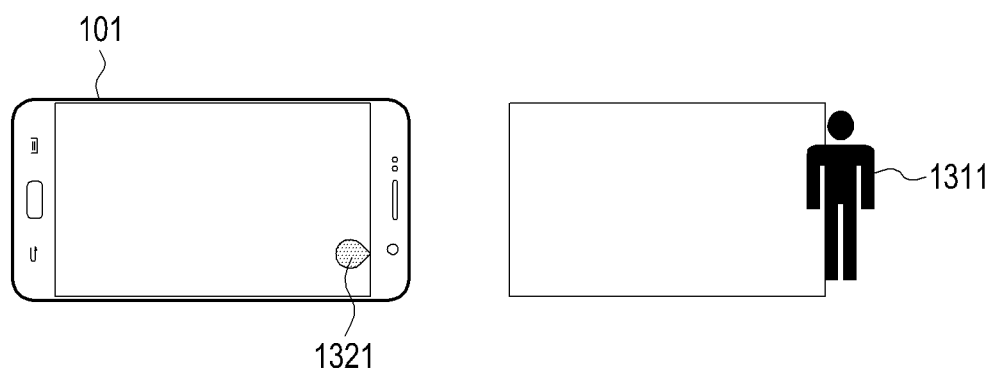
FIGS. 13A and 13B are views illustrating methods for changing the degree of transparency of a graphical object as per whether an object is recognized in an image by an electronic device according to various embodiments of the present disclosure.
Figure 13B:
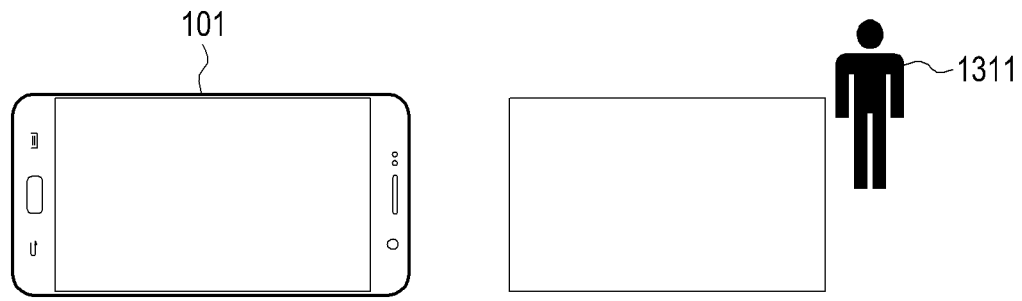

FIGS. 13A and 13B are views illustrating methods for changing the degree of transparency of a graphical object as per whether an object is recognized in an image by an electronic device according to various embodiments of the present disclosure.

The electronic device 101 may designate a first object 1311 and store information associated with the first object 1311. The electronic device 101 may display a partial image not including the first object 1311 and display a first graphical object 1321 associated with the designated first object 1311.

After displaying the first graphical object 1321, the electronic device 101 may determine whether the first object 1311 is recognized from the whole image. Upon failure to recognize the first object 1311 from the overall image, the electronic device 101 may increase the degree of transparency of the first graphical object 1321 as shown in FIG. 13A. The electronic device 101 may increase the degree of proximity of the first graphical object 1321 upon failure to recognize at least part of the first object 1311, but not only the whole thereof.

The electronic device 101 may remove the first graphical object 1321 when the failure to recognize the first object 1311 from the image goes on for a preset time as shown in FIG. 13B. Therefore, the user may intuitively recognize the failure to recognize the first object 1311 from the whole image.

Figure 14A:
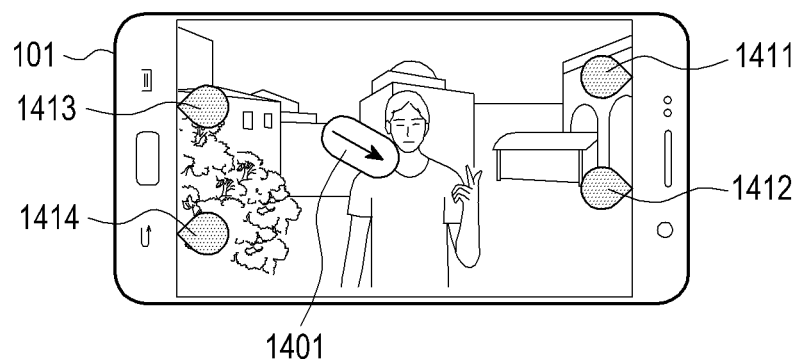
FIGS. 14A and 14B are views illustrating methods for displaying a plurality of graphical objects by an electronic device according to various embodiments of the present disclosure.
Figure 14B:
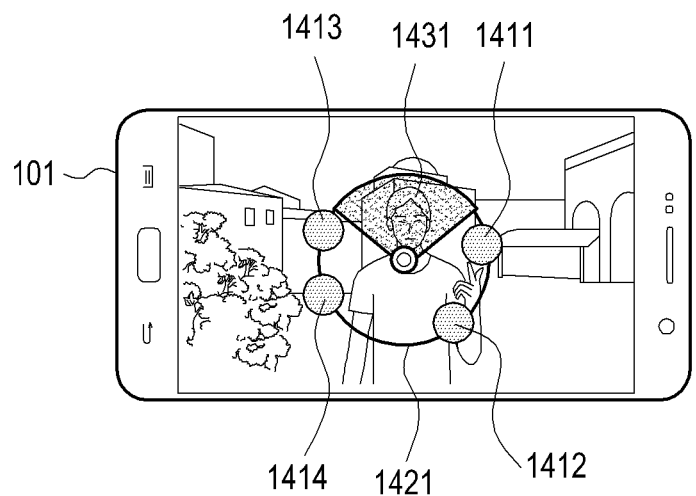

FIGS. 14A and 14B are views illustrating methods for displaying a plurality of graphical objects by an electronic device according to various embodiments of the present disclosure.

Referring to FIG. 14A, the electronic device 101 may display a plurality of graphical objects 1411, 1412, 1413, and 1414 associated with their respective objects or partial images.

Upon receipt of an input 1401 to center and view the plurality of graphical objects 1411, 1412, 1413, and 1414, the electronic device 101 may center, on the display, the plurality of graphical objects 1411, 1412, 1413, and 1414 which used to be displayed at the edges of the display.

The electronic device 101 may also display a graphical object 1421 to allow the user to recognize relative positions of the plurality of designated objects or designated partial images with respect to the partial image that the user is currently viewing. Since the image represents all 360-degree directions, the graphical object 1421 may be shown in a circle as shown in FIG. 14B. The electronic device 101 may also display a graphical object 1431 to indicate which portion the partial image being currently viewed by the user corresponds to. The plurality of graphical objects 1411, 1412, 1413, and 141 may be arrayed on the graphical object 1421 according to the information associated with their respective corresponding partial images designated.

Thus, the user may intuitively recognize the relative positions of the plurality of designated partial images with respect to the partial image that the user is now viewing.

Figure 15A:
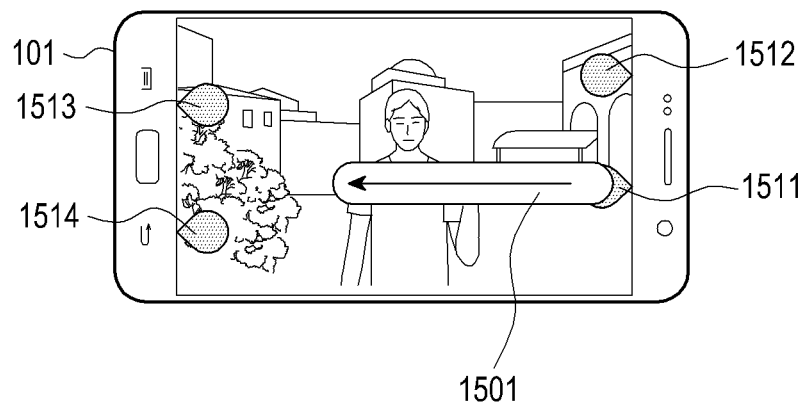
FIGS. 15A and 15B are views illustrating methods for releasing the designation of an object or a partial image by various electronics device according to an embodiment of the present disclosure.
Figure 15B:
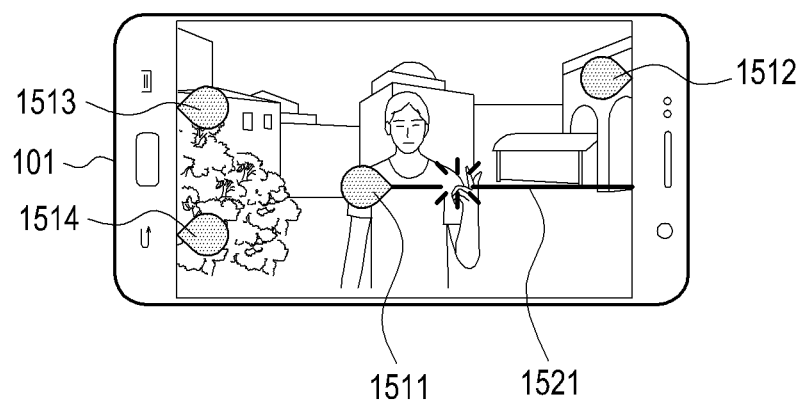

FIGS. 15A and 15B are views illustrating methods for releasing the designation of an operation or a partial image by an electronic device according to various embodiments of the present disclosure.

Referring to FIG. 15A, the electronic device 101 may display a plurality of graphical objects 1511, 1512, 1513, and 1514 associated with their respective designated objects or partial images.

Upon receiving an input 1501 to release the designation of the first object or first partial image associated with the first graphical object 1511, the electronic device 101 may release the designation of the first object or the first partial image. For example, as shown in FIG. 15A, the user may enter an input 1501 for dragging the first graphical object 1511 to the left to release the designation of the first partial image or the first object.

Referring to FIG. 15B, the electronic device 101 may move the first graphical object 1511 to the left according to the input 1501, display a graphical object 1521 that presents such an effect as if the line between the first graphical object 1511 and the edge of the display is disconnected, and release the designation of the first partial image or first object associated with the first graphical object 1511. Thus, the user may release the designation of an object or partial image by a simple input.

Figure 16A:
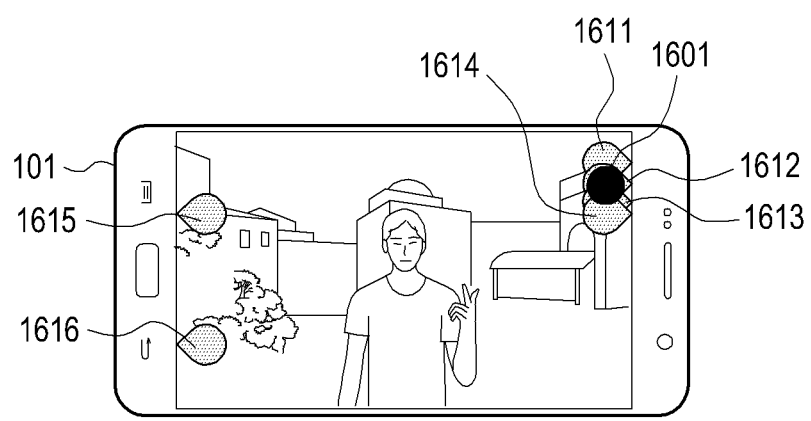
FIGS. 16A and 16B are views illustrating methods for displaying a plurality of graphical objects by an electronic device according to various embodiments of the present disclosure.
Figure 16B:
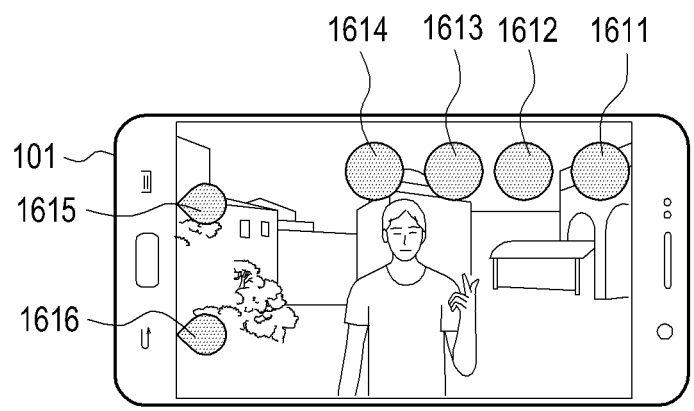

FIGS. 16A and 16B are views illustrating methods for displaying a plurality of graphical objects by an electronic device according to various embodiments of the present disclosure.

Referring to FIG. 16A, the electronic device 101 may display a plurality of graphical objects 1611, 1612, 1613, 1614, 1615, and 1616 associated with their respective designated objects or partial images. The electronic device 101 may determine the position of display of the graphical objects according to the respective relative positions of the plurality of designated objects or the designated partial images with respect to the partial image being currently displayed. Accordingly, the plurality of graphical objects 1611, 1612, 1613, and 1614 may be displayed overlapping each other as shown in FIG. 16A.

An input 1601 for distinctively displaying the plurality of graphical objects 1611, 1612, 1613, and 1614 may be received where the plurality of graphical objects 1611, 1612, 1613, and 1614 overlap each other. According to the input 1601, the electronic device 101 may display, on an upper portion of the display, the plurality of graphical objects 1611, 1612, 1613, and 1614, which used to overlap each other, to be separated from each other not to overlap each other as shown in FIG. 16B. Thus, the user may easily identify the plurality of graphical objects 1611, 1612, 1613, and 1614 which used to overlap each other.

Figure 17A:
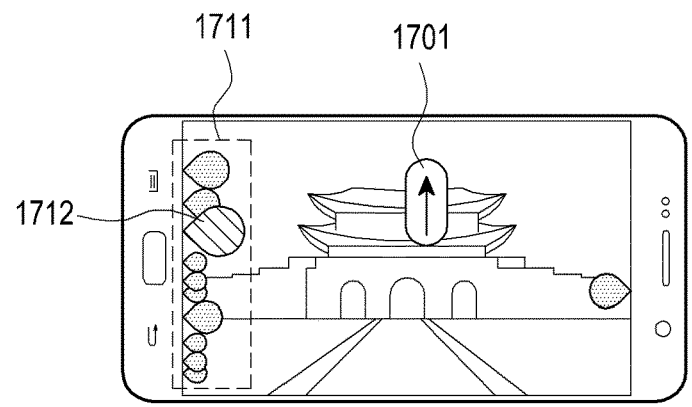
FIGS. 17A, 17B, and 17C are views illustrating methods for displaying a plurality of graphical objects by an electronic device according to various embodiments of the present disclosure.
Figure 17B:
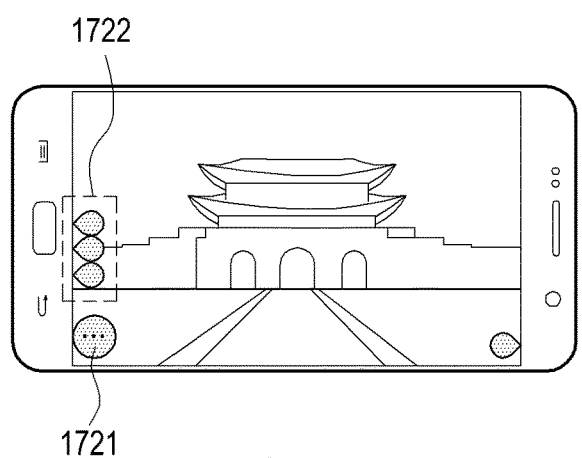
Figure 17C:
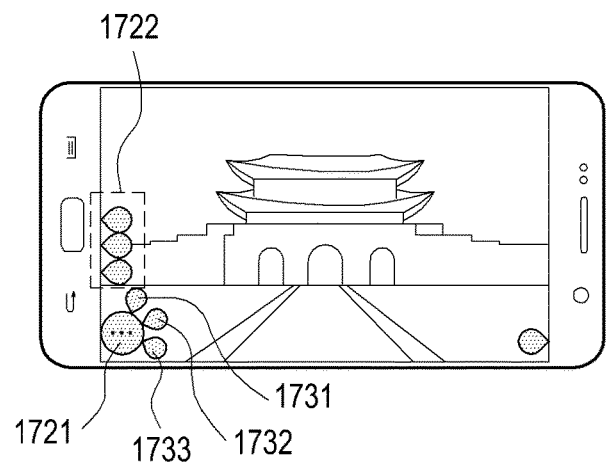

FIGS. 17A, 17B, and 17C are views illustrating methods for displaying a plurality of graphical objects by an electronic device according to various embodiments of the present disclosure.

Referring to FIG. 17A, the electronic device 101 may display a plurality of graphical objects associated with their respective designated objects or partial images. When the plurality of graphical objects overlap in a particular area 1711, the electronic device 101 may adjust the size of each of the plurality of graphical objects in proportion to the number of the graphical objects. For example, where the number of the graphical objects displayed in the particular area is a preset number or more, the electronic device 101 may shrink each of the graphical objects displayed in the particular area in the same ratio.

Where the plurality of graphical objects are displayed overlapping each other in the particular area 1711, the electronic device 101 may change at least one of the size or color of the first graphical object 1712 corresponding to the input 1701 received from the user, allowing the user easier selection. For example, the electronic device 101 may select the first graphical object 1712 corresponding to the position or direction of the input 1701 among the plurality of graphical objects displayed overlapping each other in the particular area 1711 and change at least one of the size or color of the first graphical object 1712. As the electronic device 101 moves with the input 1701 maintained, the electronic device 101 may change the first graphical object 1712 at least one of the size or color of which is to be changed.

When the size of the plurality of graphical objects is reduced to a preset size or less as the number of the plurality of graphical objects displayed in the particular area 1711 increases, the electronic device 101 may display an integrated graphical object 1721 to integrate and display some of the plurality of graphical objects. As shown in FIG. 17B, the electronic device 101 may display the integrated graphical object 1721 to integrate and display the other graphical objects than some, e.g., graphical object 1722, of the plurality of graphical objects. As shown in FIG. 17C, upon receiving an input to select the integrated graphical object 1721, the electronic device 101 may display the graphical objects 1731, 1732, and 1733 included in the integrated graphical object in an area around the integrated graphical object 1721.

FIGS. 18A, 18B, 18C, 18D, 18E, 18F, 18G, 18H, and 18I are views illustrating methods for switching images by an electronic device according to various embodiments of the present disclosure.

Figure 18A:
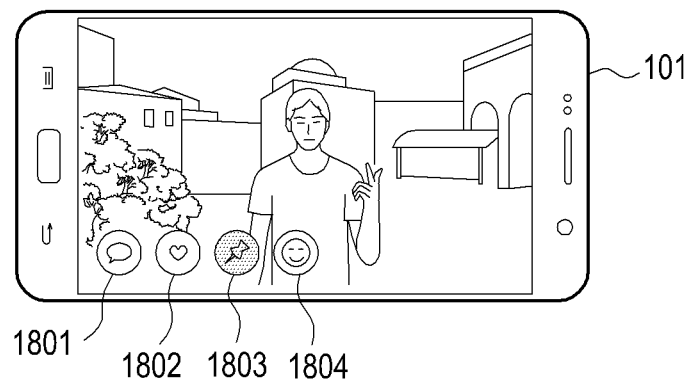
FIGS. 18A, 18B, 18C, 18D, 18E, 18F, 18G, 18H, and 18I are views illustrating methods for switching images by an electronic device according to various embodiments of the present disclosure.

Referring to FIG. 18A, the electronic device 101 may display a first partial image of an image. The electronic device 101 may display icons for executing various functions, along with the first partial image. For example, the electronic device 101 may display a first icon 1801 for executing the function of inputting a message for an object or partial image, a second icon 1802 for executing the function of inputting a degree of preference for an object or partial image, a third icon 1803 for executing the function of designating an image, and a fourth icon 1804 for executing the function of designating an object. Although in the example of FIG. 18A the third icon 1803 and the fourth icon 1804 are separately shown, various embodiments of the present disclosure are not limited thereto, and the third icon 1803 and the fourth icon 1804 may be integrated into a single icon. In this case, selection of the integrated icon enables simultaneous designation of both a partial image and an object.

Figure 18B:
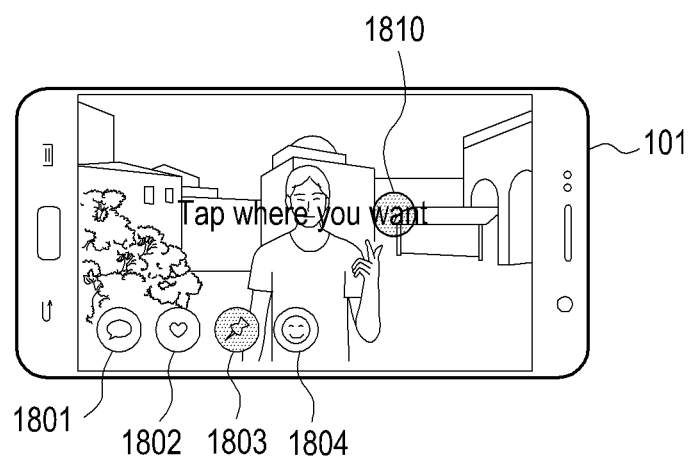

Referring to FIG. 18B, the electronic device 101 may receive an input for selecting the third icon 1803. The electronic device 101 may output a message to induce the user to designate the first partial image being displayed according to the receipt of the input for selecting the third icon 1803.

Figure 18C:
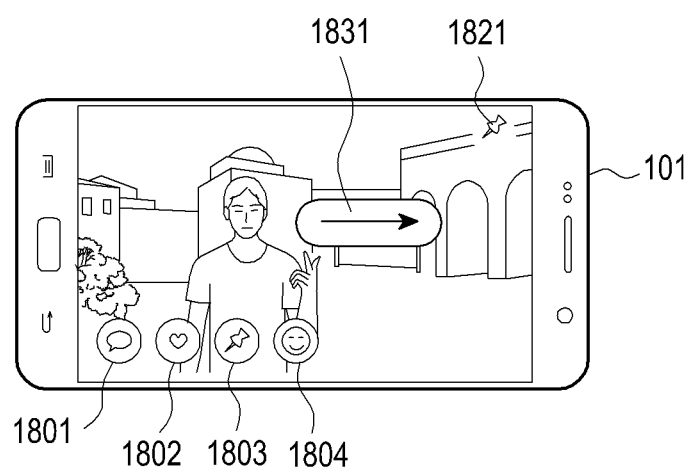

Referring to FIG. 18C, upon receipt of an input 1810 for designating the first partial image from the user after the message is outputted, the electronic device 101 may display a graphical object 1821 to indicate that the first partial image has been designated.

The operation of receiving the input 1810 for designating the first partial image to designate the first partial image may be omitted. For example, the electronic device 101 may designate the first partial image immediately when receiving an input for selecting the third icon 1803.

Figure 18D:
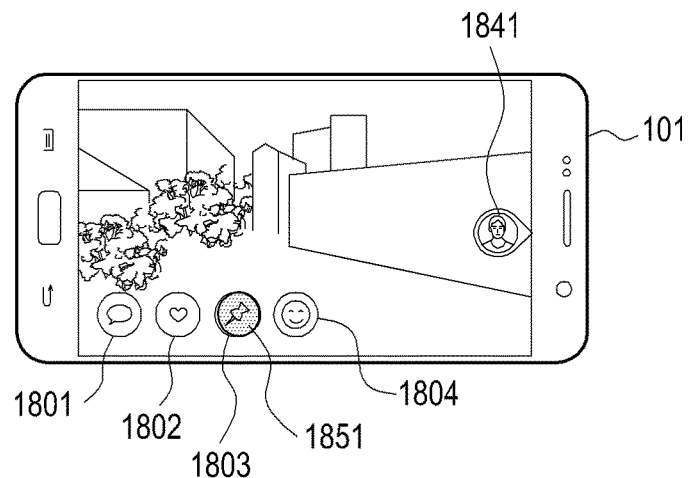

Referring to FIG. 18D, upon receiving an input 1831 for switching the image displayed on the electronic device 101 after the graphical object 1821 is displayed, the electronic device 101 may switch the displayed image to a second partial image of the image according to the input 1831. The electronic device 101 may also display a first graphical object 1841 associated with the designated first partial image.

Figure 18E:
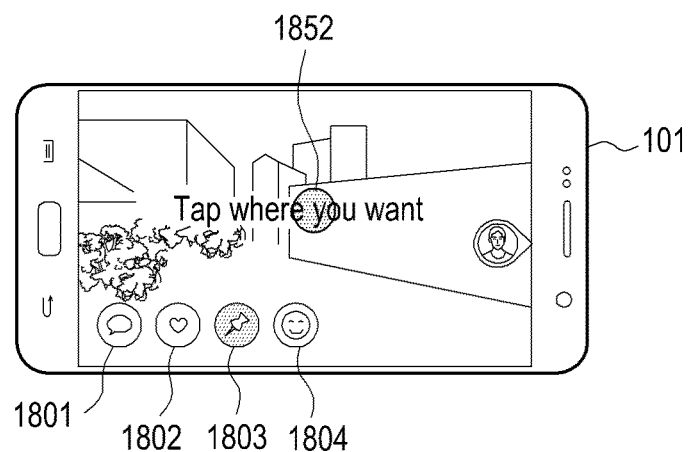

Referring to FIG. 18E, upon receiving an input 1851 for selecting the third icon 1803 from the user, the electronic device 101 may output a message to induce the designation of the second partial image displayed.

Figure 18F:
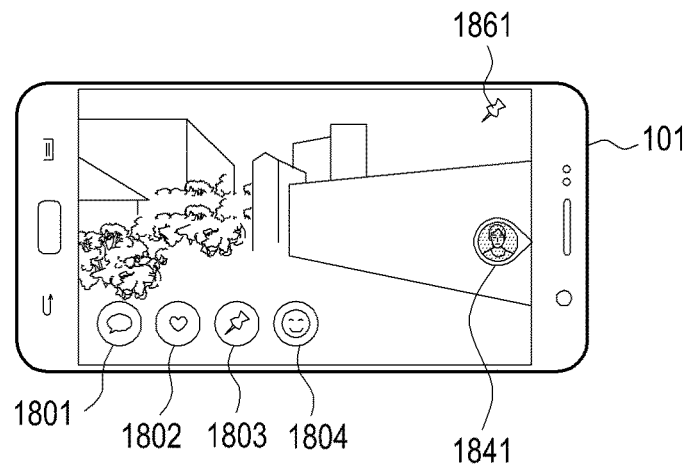

Referring to FIG. 18F, upon receipt of an input 1852 for designating the second partial image from the user after the message is outputted, the electronic device 101 may display a graphical object 1861 to indicate that the second partial image has been designated.

Figure 18G:
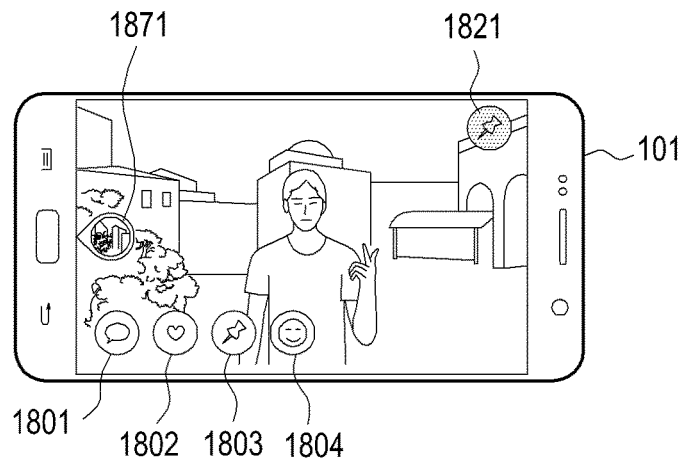

Referring to FIG. 18G, upon receiving an input for selecting the first graphical object 1841 from the user, the electronic device 101 may immediately switch the displayed image to the first partial image. The electronic device 101 may also display the second graphical object 1871 associated with the designated second partial image.

Figure 18H:
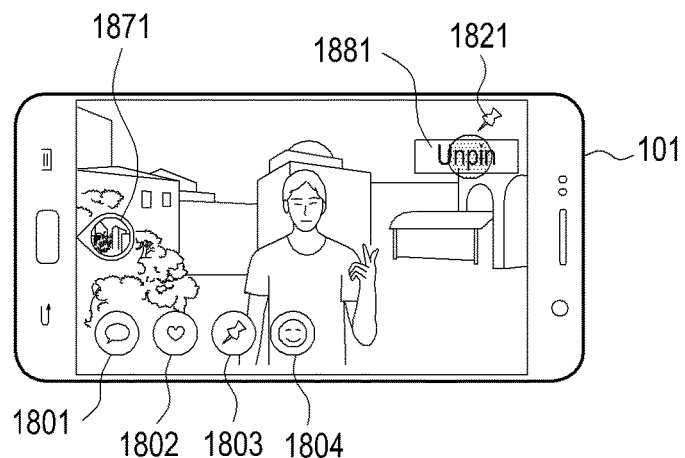

Referring to FIG. 18H, when the user selects the graphical object 1821 to indicate that the first partial image has been designated, the electronic device 101 may display a graphical object 1881 to release the designation of the first partial image.

Figure 18I:
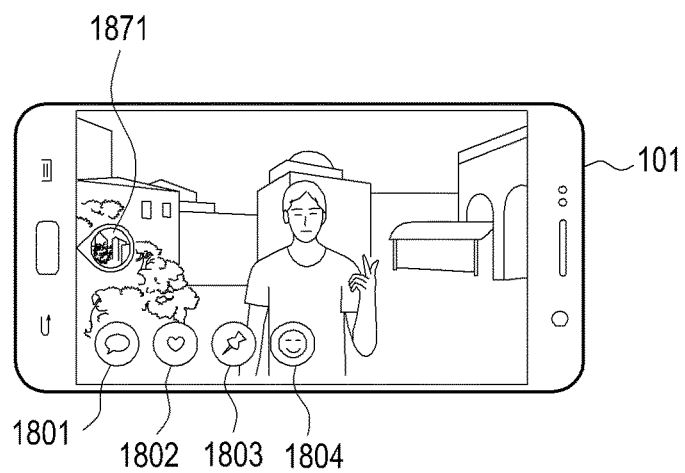

Referring to FIG. 18I, when the user selects the graphical object 1881 to release the designation of the first partial image, the electronic device 101 may release the designation of the first partial image and prevent the display, on the display, of the graphical object 1821 for indicating that the first partial image has been designated and the graphical object 1881 for releasing the designation of the first partial image.

FIGS. 19A, 19B, 19C, 19D, 19E, and 19F are views illustrating methods for switching images by an electronic device according to an embodiment of the present disclosure.

Figure 19A:
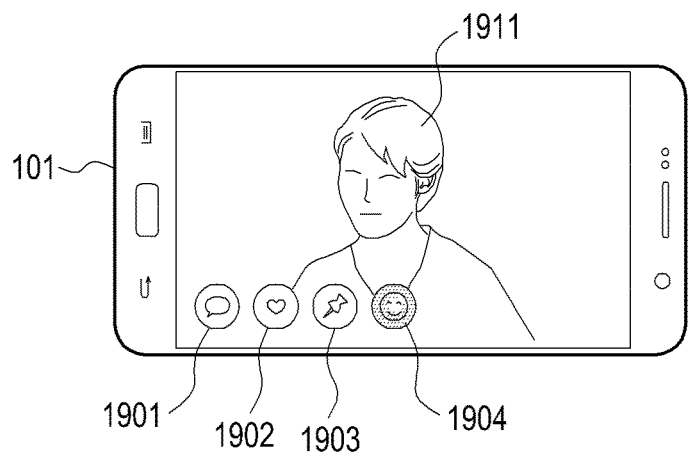
FIGS. 19A, 19B, 19C, 19D, 19E, and 19F are views illustrating methods for switching images by an electronic device according to various embodiments of the present disclosure.

Referring to FIG. 19A, the electronic device 101 may display a first partial image of an image. The electronic device 101 may display icons for executing various functions, along with the first partial image. For example, the electronic device 101 may display a first icon 1901 for executing the function of inputting a message for an object or partial image, a second icon 1902 for executing the function of inputting a degree of preference for an object or partial image, a third icon 1903 for executing the function of designating an image, and a fourth icon 1904 for executing the function of designating an object. Although in the example of FIG. 19A the third icon 1903 and the fourth icon 1904 are separately shown, various embodiments of the present disclosure are not limited thereto, and the third icon 1903 and the fourth icon 1904 may be integrated into a single icon. In this case, selection of the integrated icon enables simultaneous designation of both a partial image and an object.

Figure 19B:
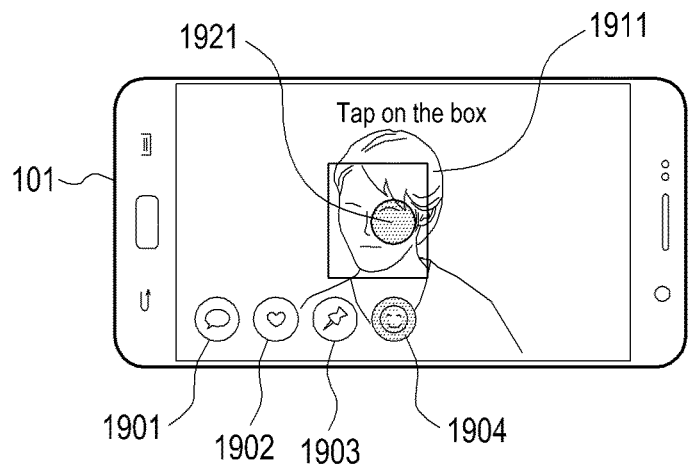

Referring to FIG. 19B, the electronic device 101 may receive an input for selecting the fourth icon 1904. The electronic device 101 may output a message to induce the user to designate the first object included in the first partial image according to the receipt of the input for selecting the fourth icon 1904.

Figure 19C:
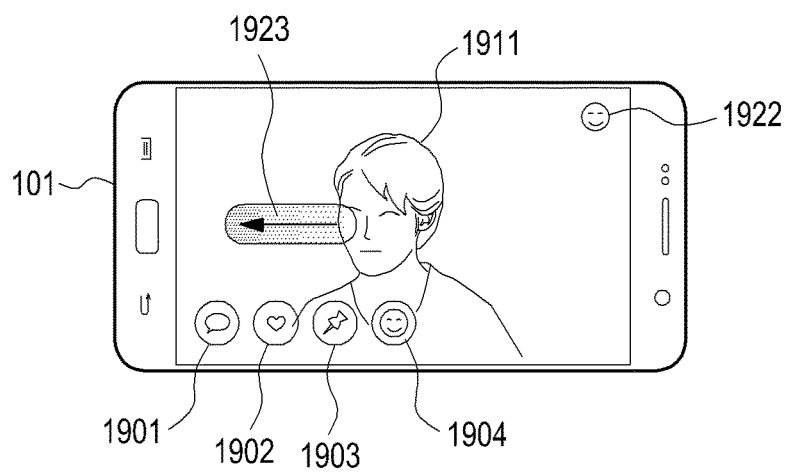

Referring to FIG. 19C, upon receiving an input 1921 for designating the first object 1911 from the user after the message is outputted, the electronic device 101 may designate the first object 1911 and display a graphical object 1922 to indicate that the first object 1911 has been designated.

The operation of receiving the input 1921 for designating the first object to designate the first object 1911 may be omitted. For example, the electronic device 101 may designate the first object 1911 immediately when receiving an input for selecting the fourth icon 1904.

Figure 19D:
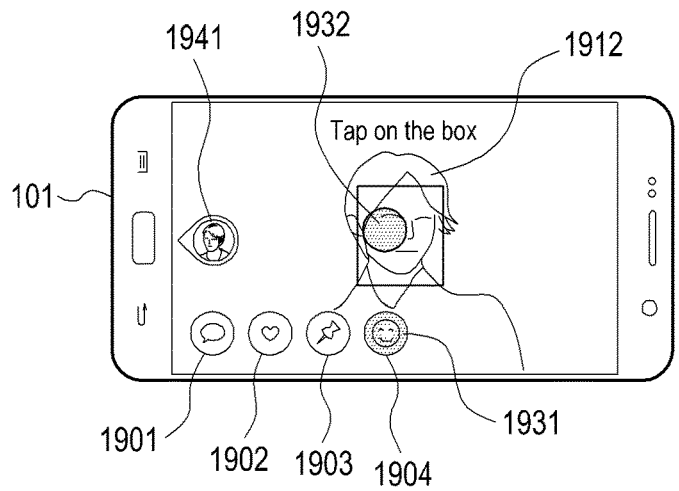

Referring to FIG. 19D, upon receiving an input 1923 for switching the image displayed on the electronic device 101 after the graphical object 1922 is displayed, the electronic device 101 may switch the displayed image to a second partial image according to the input 1923. The electronic device 101 may display a first graphical object 1941 associated with the designated first object 1911.

Referring to FIG. 19D, upon receiving an input 1931 for selecting the fourth icon 1904 from the user, the electronic device 101 may output a message to induce the designation of a second object 1912 included in the second partial image.

Figure 19E:
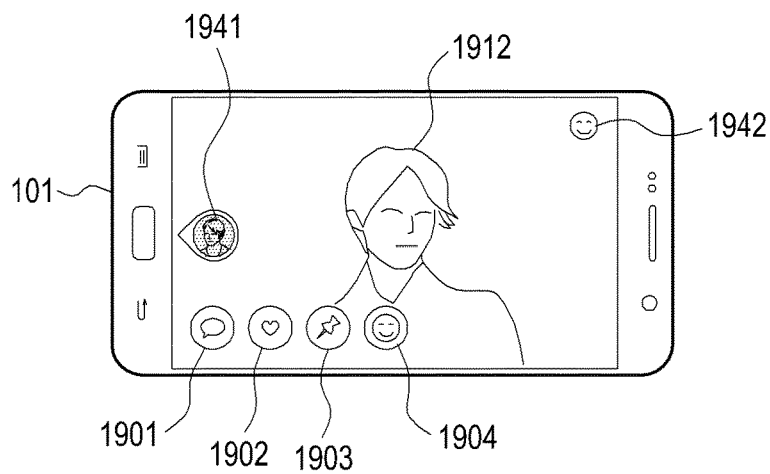

Referring to FIG. 19E, upon receiving an input 1932 for designating the second object 1912 from the user after the message is outputted, the electronic device 101 may designate the second object 1912 and display a graphical object 1942 to indicate that the second object 1912 has been designated.

Figure 19F:
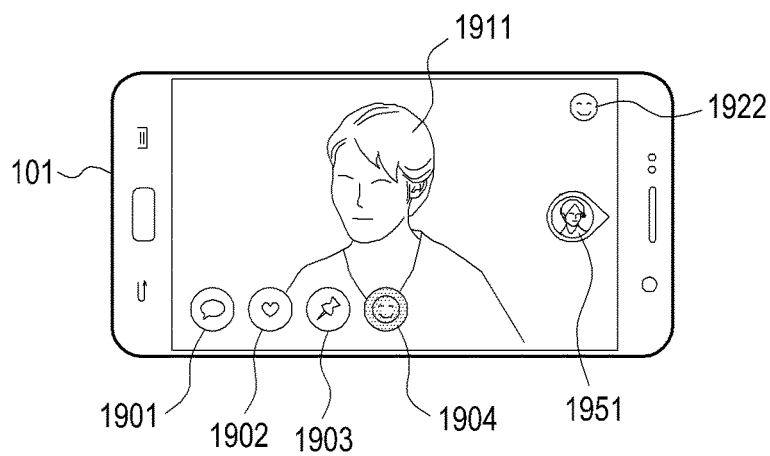

Referring to FIG. 19F, upon receiving an input for selecting the first graphical object 1941 from the user, the electronic device 101 may immediately switch the image displayed on the electronic device 101 to a third partial image including the first object 1911. The electronic device 101 may also display a second graphical object 1951 associated with the designated second object 1912.

FIGS. 20A, 20B, 20C, 20D, 20E, 20F, and 20G are views illustrating methods for switching images by an electronic device according to various embodiments of the present disclosure.

Figure 20A:
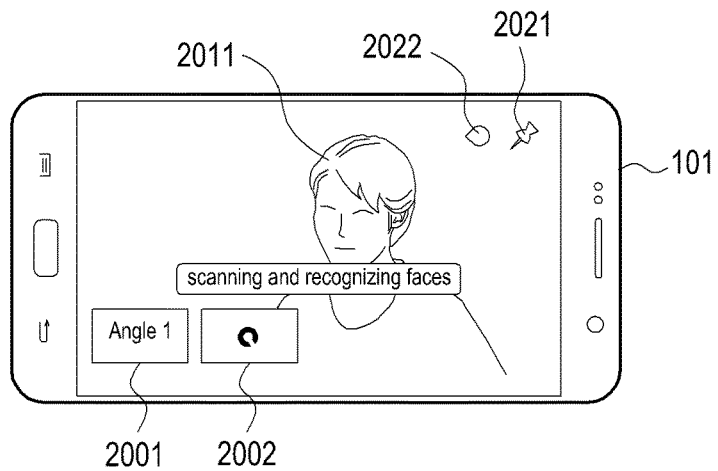
FIGS. 20A, 20B, 20C, 20D, 20E, 20F, and 20G are views illustrating methods for switching images by an electronic device according to various embodiments of the present disclosure.

Referring to FIG. 20A, the electronic device 101 may display a partial image of an image. The electronic device 101 may also display a first thumbnail image 2001 associated with a designated first object.

Referring to FIG. 20A, when no separate icon for executing the function of designating an object is displayed, the user may designate an object by entering an input corresponding to a preset gesture.

The electronic device 101 may also designate a second object 2011 included in the partial image. The electronic device 101 may display a graphical object 2002 and a message indicating that the second object 2011 is being designated while designating the second object 2011 and storing information associated with the second object 2011.

When the designation of the second object 2011 is complete, the electronic device 101 may display a graphical object 2021 to indicate the designation of the second object 2011.

Figure 20B:
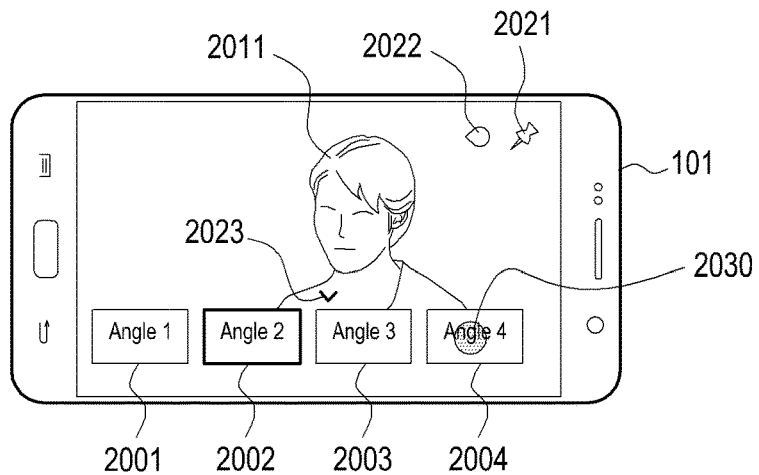

Referring to FIG. 20B, the electronic device 101 may display a plurality of thumbnail images 2001, 2002, 2003, and 2004 associated with a plurality of designated objects while displaying the partial image. The electronic device 101 may also display a second icon 2023 to execute the function of hiding the plurality of thumbnail images 2001, 2002, 2003, and 2004. The electronic device 101 may also display a first icon 2022 for executing the function of converting the plurality of thumbnail images 2001, 2002, 2003, and 2004 into icons and display the icons.

Figure 20C:
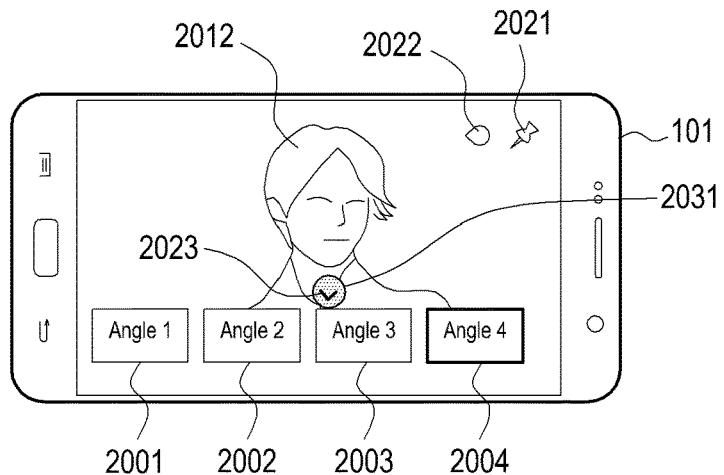

Referring to FIG. 20C, upon receiving an input 2030 to select the fourth thumbnail image 2004 from the user, the electronic device 101 may immediately switch the image displayed on the electronic device 101 to an image including the fourth object 2012 corresponding to the fourth thumbnail image 2004.

Figure 20D:
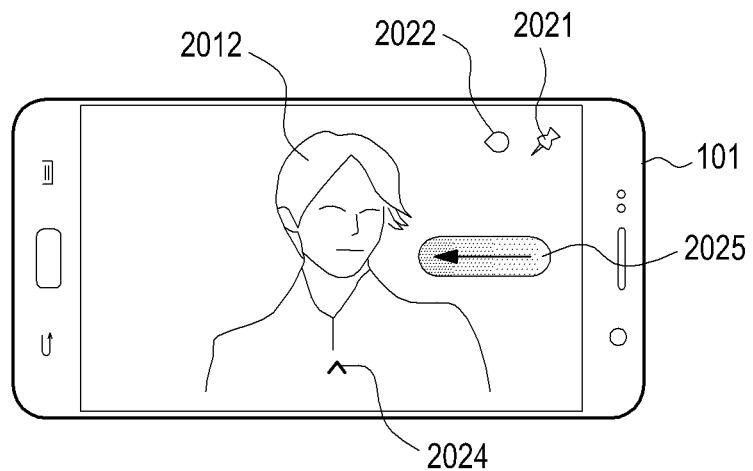

Referring to FIG. 20D, upon receiving an input 2031 for selecting the second icon 2023 from the user, the electronic device 101 may hide the plurality of thumbnail images 2001, 2002, 2003, and 2004. The electronic device 101 may also display a third icon 2024 to execute the function of showing the plurality of thumbnail images 2001, 2002, 2003, and 2004, instead of the second icon 2023.

Figure 20E:
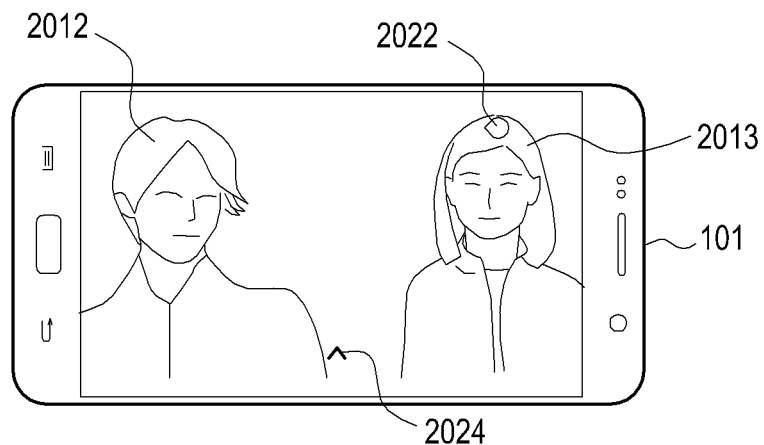

Referring to FIG. 20E, upon receiving an input 2025 for switching the displayed image, the electronic device 101 may switch the image displayed on the electronic device 101 according to the input 2025.

Figure 20F:
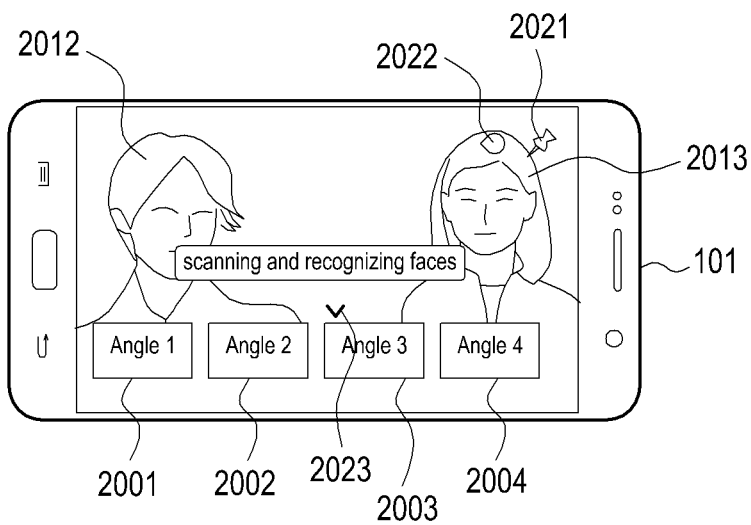

Referring to FIG. 20F, upon receiving an input for selecting the third icon 2024, the electronic device 101 may display the plurality of thumbnail images 2001, 2002, 2003, and 2004 back.

Upon receipt of an input for designating the fifth object 2013 included in the partial image, the electronic device 101 may designate the fifth object 2013 and store information associated with the fifth object 2013. The electronic device 101 may also display a message indicating that the fifth object 2013 is being designated while designating the fifth object 2013. The electronic device 101 may also display a graphical object 2021 to indicate the designation of the fifth object 2013.

Figure 20G:
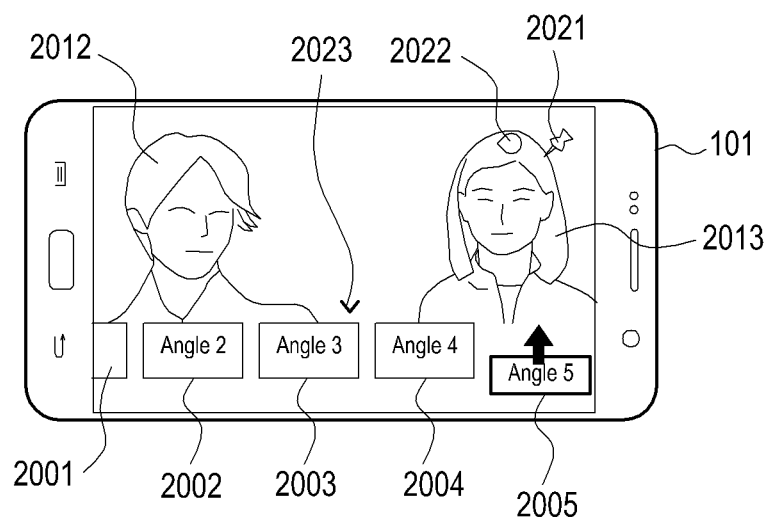

Referring to FIG. 20G, when the designation of the fifth object 2013 is complete, the electronic device 101 may further display a fifth thumbnail image 2005 associated with the fifth object 2013.

FIGS. 21A, 21B, 21C, 21D, 21E, 21F, 21G, 21H, and 21I are views illustrating methods for switching images by an electronic device according to an embodiment of the present disclosure.

Figure 21A:
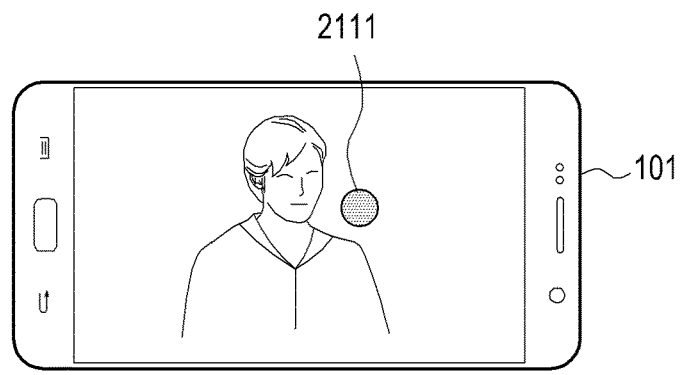
FIGS. 21A, 21B, 21C, 21D, 21E, 21F, 21G, 21H, and 21I are views illustrating methods for switching images by an electronic device according to various embodiments of the present disclosure.

Referring to FIG. 21A, the electronic device 101 may display a first partial image of an image. Upon failure to receive an input for a preset time from the user, the electronic device 101 may display only the first partial image while hiding the plurality of icons for executing various functions.

Figure 21B:
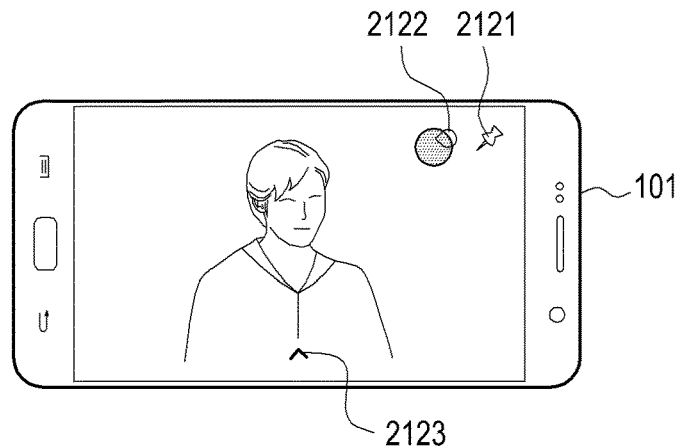

Referring to FIG. 21B, upon receiving an input 2111 from the user, the electronic device 101 may display the plurality of icons for executing various functions. For example, the electronic device 101 may display a first icon 2121 for executing the function of designating an object, a second icon 2122 for executing the function of converting a plurality of thumbnail images 2101, 2102, 2103, 2104, and 2105 associated with a plurality of designated objects and displaying the icons, and a third icon 2123 for executing the function of showing the plurality of thumbnail images 2101, 2102, 2103, 2104, and 2105.

Figure 21C:
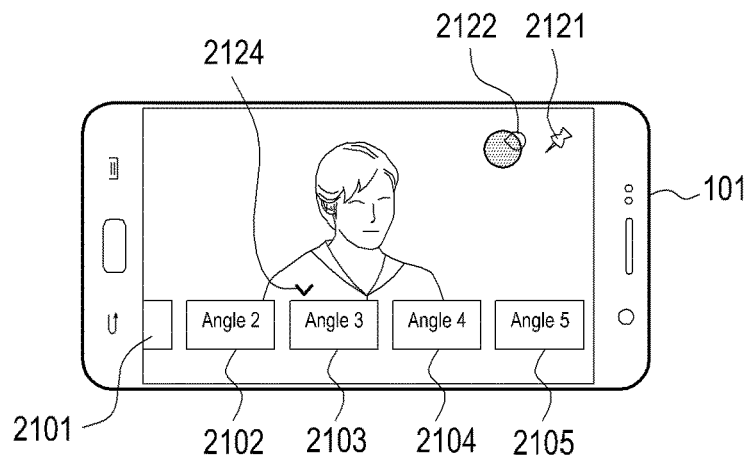

Referring to FIG. 21C, upon receiving an input for selecting the second icon 2122, the electronic device 101 may display the plurality of thumbnail images 2101, 2102, 2103, 2104, and 2105 even when the third icon 2123 is not selected. As the plurality of thumbnail images 2101, 2102, 2103, 2104, and 2105 are displayed, the electronic device 101 may display a fourth icon 2124 for executing the function of hiding the plurality of thumbnail images 2101, 2102, 2103, 2104, and 2105, instead of the third icon 2123.

Figure 21D:
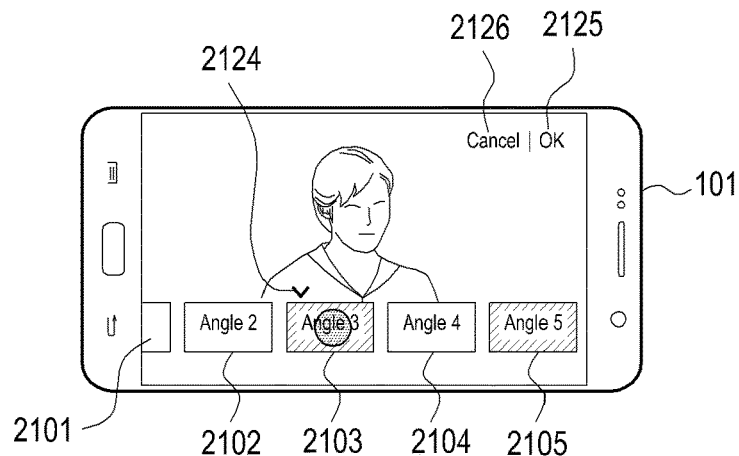

Referring to FIG. 21D, the electronic device 101 may receive an input for selecting at least one thumbnail image, e.g., the third thumbnail image 2103 and the fifth thumbnail image 2105, from among the plurality of thumbnail images 2101, 2102, 2103, 2104, and 2105. The electronic device 101 may also display a fifth icon 2125 and a sixth icon 2126 for executing the functions of completing and canceling selection.

Figure 21E:
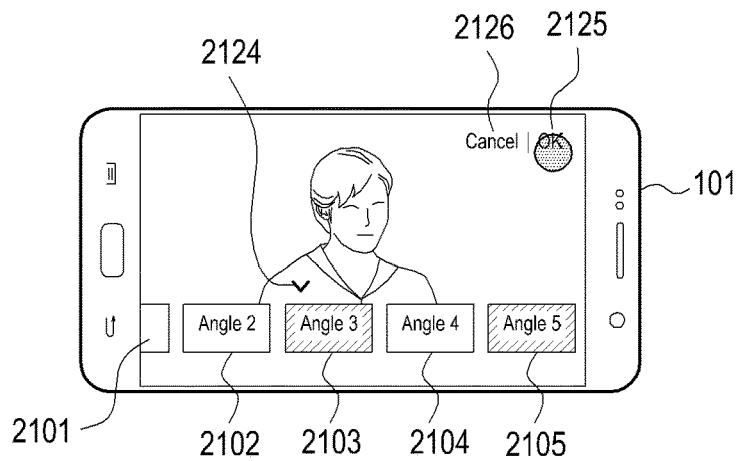

Referring to FIG. 21E, the electronic device 101 may receive an input for selecting the fifth icon 2125 after the third thumbnail image 2103 and the fifth thumbnail image 2105 are selected.

Figure 21F:
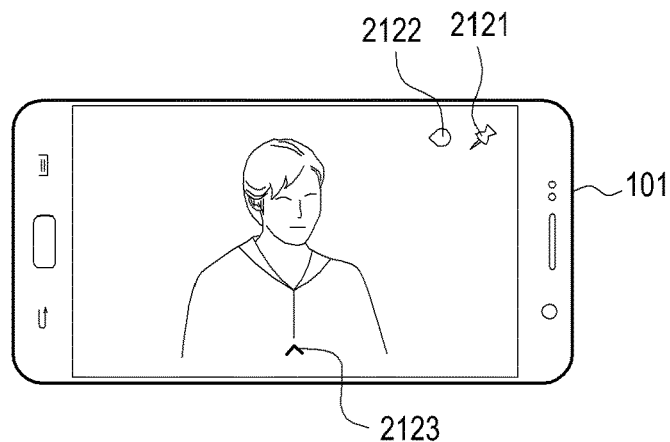

Referring to FIG. 21F, as the input for selecting the fifth icon 2125 is received, the electronic device 101 may hide the plurality of thumbnail images 2101, 2102, 2103, 2104, and 2105 even when no input for selecting the fourth icon 2124 is made.

Figure 21G:
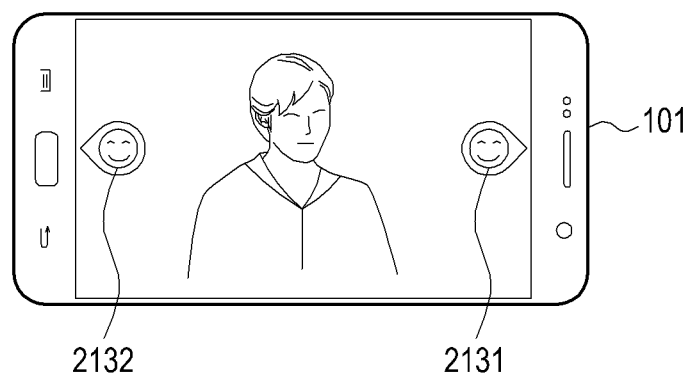

Referring to FIG. 21G, the electronic device 101 may display a seventh icon 2131 associated with a third object corresponding to the selected third thumbnail image 2103 and an eighth icon 2132 associated with a fifth object corresponding to the selected fifth thumbnail image 2105.

Figure 21H:
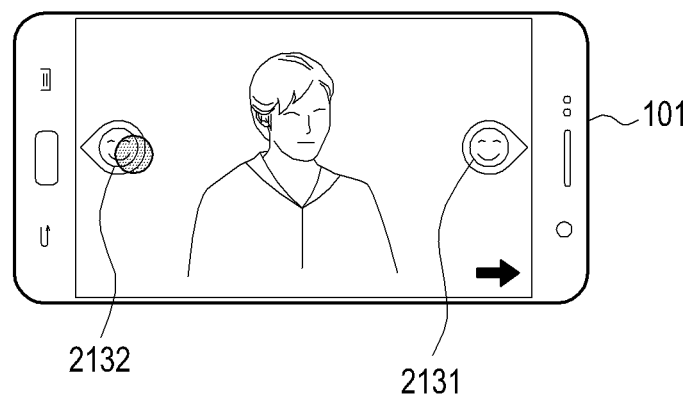
Figure 21I:
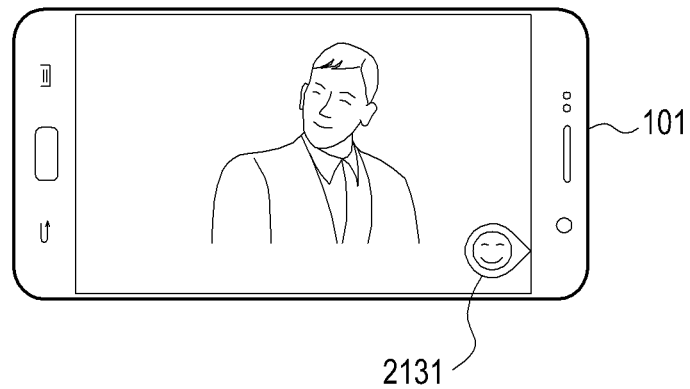

Referring to FIG. 21H, the electronic device 101 may receive an input for selecting the eighth icon 2132. Upon receiving the input for selecting the eighth icon 2132, the electronic device 101 may immediately switch the image displayed on the electronic device 101 to a partial image including the fifth object corresponding to the eighth icon 2132 as shown in FIG. 21I.

Figure 22A:
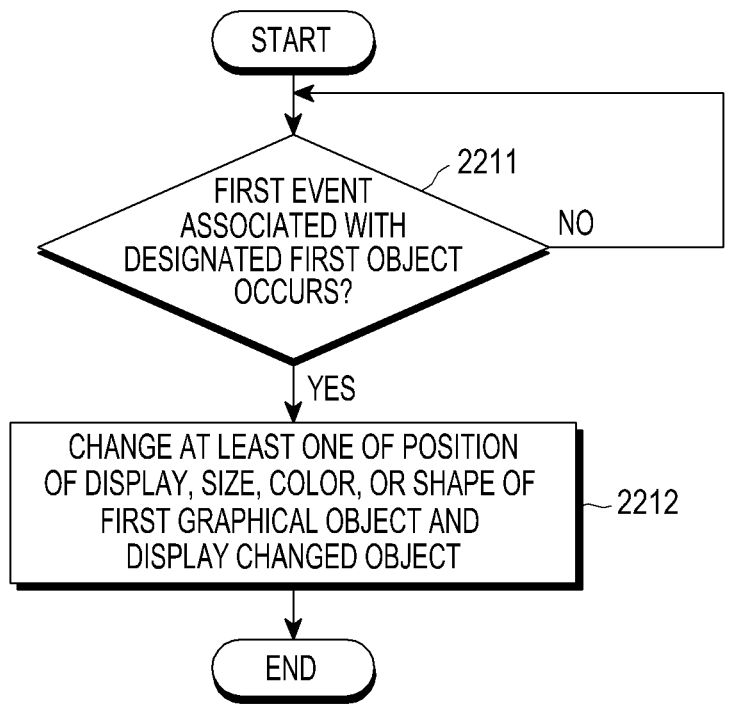
FIGS. 22A and 22B are flowcharts illustrating methods for providing a notification as an event occurs by an electronic device according to various embodiments of the present disclosure.
Figure 22B:
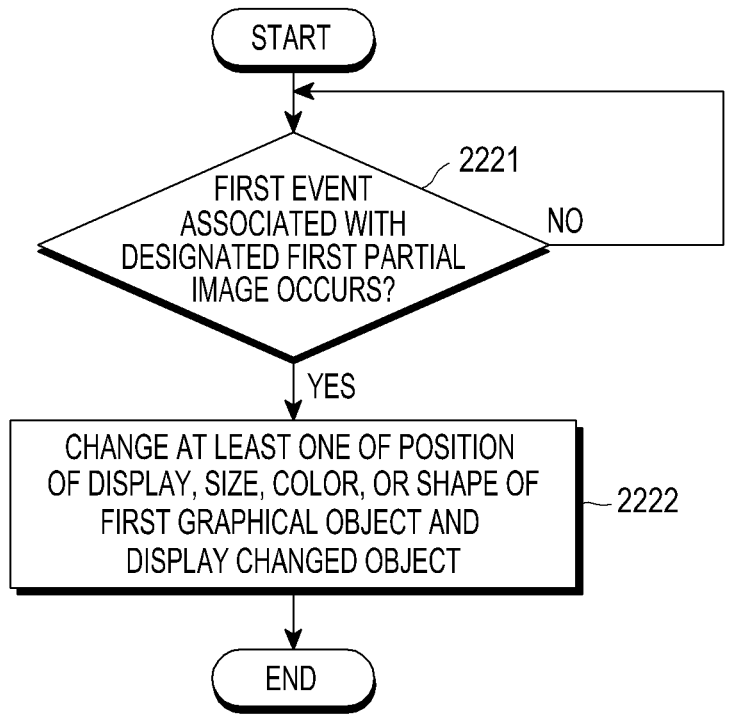

FIGS. 22A and 22B are flowcharts illustrating methods for providing a notification as an event occurs by an electronic device according to various embodiments of the present disclosure.

FIG. 22A is a flowchart illustrating a method for providing a notification as an event occurs by an electronic device 101.

In operation 2211, the electronic device 101 may determine whether a first event associated with a designated first object occurs after a first graphical object associated with the designated first object is displayed. For example, when the designated first object moves or a message or emoticon associated with the designated first object is searched from the memory 130 of the electronic device 101 or external server, the electronic device 101 may determine that the first event occurs.

Figure 23A:
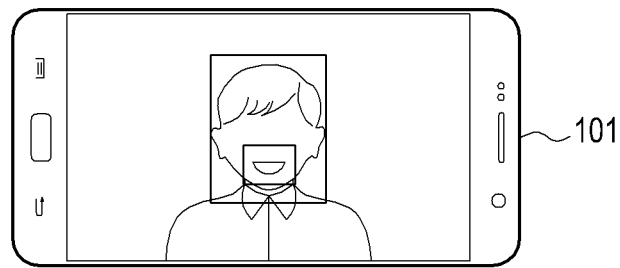
FIGS. 23A, 23B, and 23C are views illustrating methods for determining the occurrence of an event by an electronic device according to various embodiments of the present disclosure.
Figure 23B:
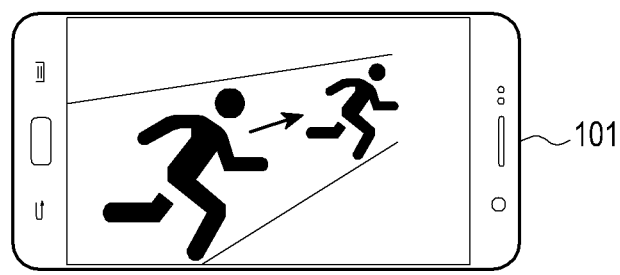
Figure 23C:
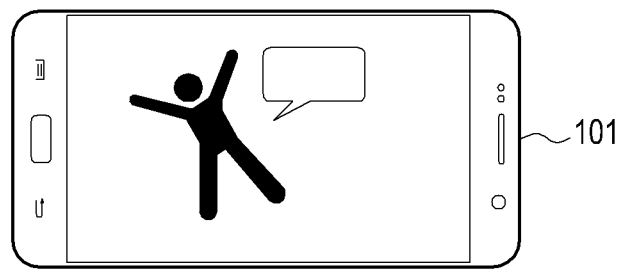

FIGS. 23A, 23B, and 23C are views illustrating methods for determining the occurrence of an event by an electronic device according to various embodiments of the present disclosure.

For example, as shown in FIG. 23A, the electronic device 101 may recognize the face of the designated first object and the shape of the mouth of the first object, and when determining that the recognized mouth shape of the first object moves, the electronic device 101 may determine that the first event associated with the first object occurs.

The electronic device 101 may also determine whether the first event occurs using voice information associated with the image. For example, the electronic device 101 may determine whether the first event occurs according to first voice information associated with the first object. Upon determining that a voice associated with the first object occurs through the first voice information, e.g., upon determining that the object speaks out, the electronic device 101 may determine that the first event occurs.

Upon determining that the mouth shape of the first object moves and a voice associated with the first object is generated using the move of the first object and the first voice information, the electronic device 101 may determine that the first event occurs.

Referring to FIG. 23B, the electronic device 101 may recognize the size of the designated first object, and when the first object is resized, the electronic device 101 may determine that the first object moves.

For example, when a message or emoticon associated with the designated first object is searched from the memory 130 of the electronic device 101 or external server, the electronic device 101 may determine that the first event occurs as shown in FIG. 23C. Here, the emoticon may include an emoticon to express the user's preference or emotion associated with the first object.

For example, where the electronic device 101 receives an image from the external server, stores in the memory, and plays, the message or emoticon associated with the first object included in the image may also be received from the external server and stored in the memory in association with the image. Thus, as the electronic device 101 displays the image, the stored message or emoticon associated with the first object may be searched from the memory and displayed on the display.

When the electronic device 101 receives an image broadcast in real-time from the external server and displays on the display, a message or emoticon entered in relation to the first object by another user viewing the image may also be received along with the image. Accordingly, the electronic device 101 may display the first object along with the message or emoticon received together with the image.

Thus, when a message or emoticon associated with the first object is searched from the memory 130 or external server, the electronic device 101 may determine that the first event occurs.

In operation 2212, upon determining that the first event occurs, the electronic device 101 may change at least one of the position of display, size, color, or shape of the first graphical object associated with the first object and display to notify the user of the occurrence of the first event.

Upon determining that the first event occurs, the electronic device 101 may output at least one of a vibration or sound to notify the user of the occurrence of the first event.

Figure 25A:
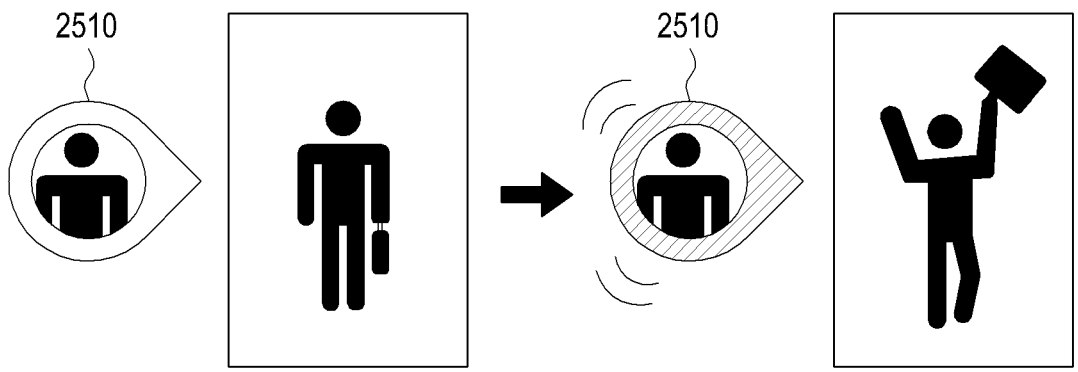
FIGS. 25A, 25B, and 25C are views illustrating methods for displaying a graphical object when an event occurs by an electronic device according to various embodiments of the present disclosure.
Figure 25B:
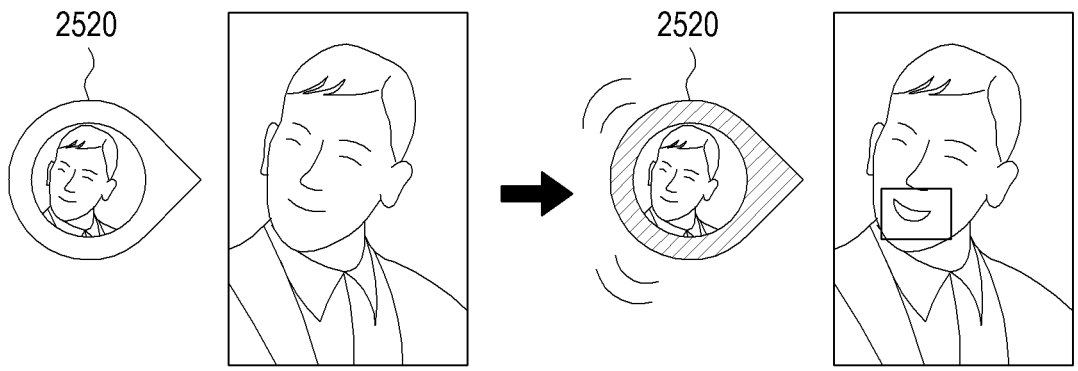
Figure 25C:
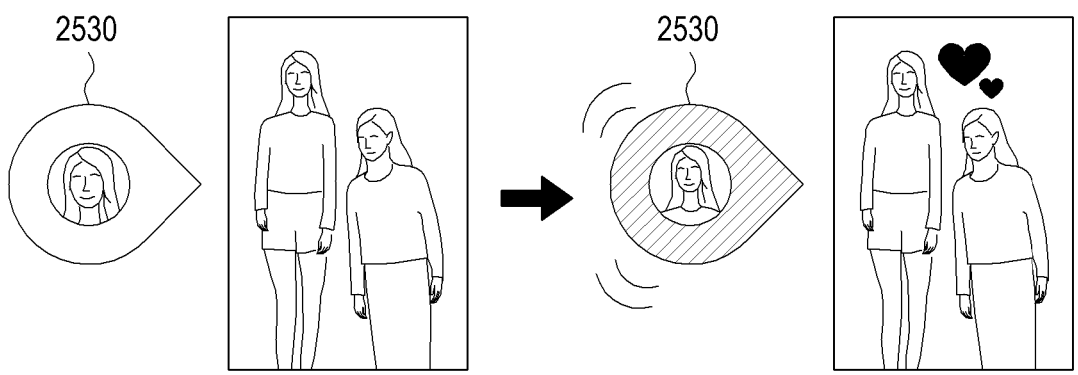

FIGS. 25A, 25B, and 25C are views illustrating methods for displaying a graphical object when an event occurs by an electronic device according to various embodiments of the present disclosure.

For example, the electronic device 101 may display a first graphical object 2510 associated with the designated first object as shown in FIG. 25A. Upon determining that the first object moves, the electronic device 101 may determine that an event occurs in the first partial image. Accordingly, the electronic device 101 may highlight and display the first graphical object 2510 or move up and down the first graphical object 2510.

Referring to FIG. 25B, the electronic device 101 may also display a second graphical object 2520 associated with the designated second object. Upon determining that the mouth shape of the second object moves, the electronic device 101 may determine that a second event associated with the second object occurs. Accordingly, the electronic device 101 may highlight and display the second graphical object 2520 or move up and down the second graphical object 2520.

Referring to FIG. 25C, the electronic device 101 may also display a third graphical object 2530 associated with the designated third object. When a message or emoticon associated with the third object is searched from the memory of the electronic device 101 or external server, the electronic device 101 may determine that a third event associated with the third object occurs. Accordingly, the electronic device 101 may highlight and display the third graphical object 2530 or move up and down the third graphical object 2530.

Highlighting and displaying or moving up and down the graphical object as described above is merely an example for description purposes, and various embodiments of the present disclosure are not limited thereto. The first graphical object 2510 may be changed and displayed in various manners to notify the user of the occurrence of an event in the first partial image.

FIG. 22B is a flowchart illustrating a method for changing the degree of transparency of a graphical object by the electronic device 101 when a partial image is designated.

In operation 2221, the electronic device 101 may determine whether a first event associated with a designated first partial image occurs after a first graphical object associated with the designated first partial image is displayed.

For example, when at least one object included in the first partial image moves or a message or emoticon associated with the first partial image or at least one object included in the first partial image is searched from the memory 130 or the external server, the electronic device 101 may determine that the first event occurs.

Figure 24A:
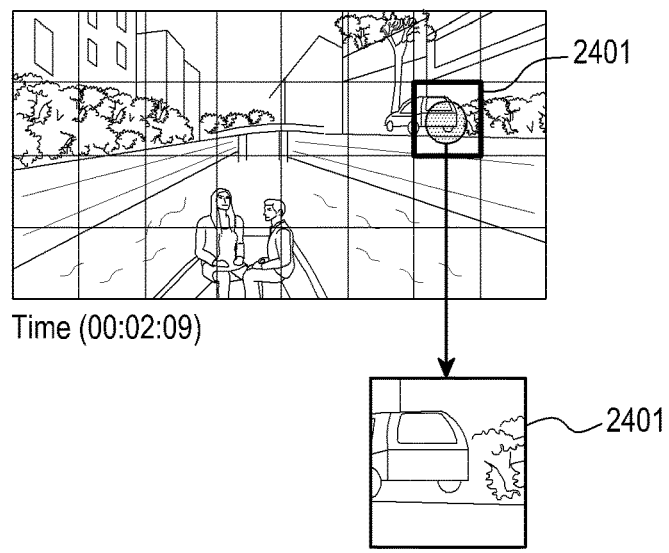
FIGS. 24A, 24B, and 24C are views illustrating methods for determining the occurrence of a move of an object by an electronic device according to various embodiments of the present disclosure.
Figure 24B:
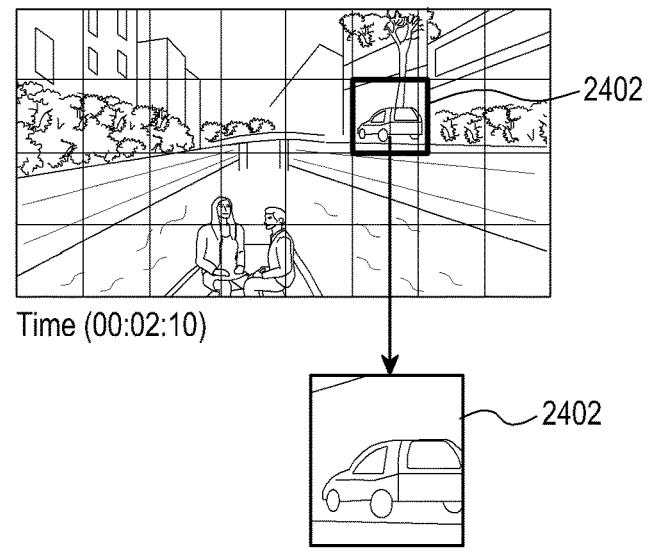
Figure 24C:
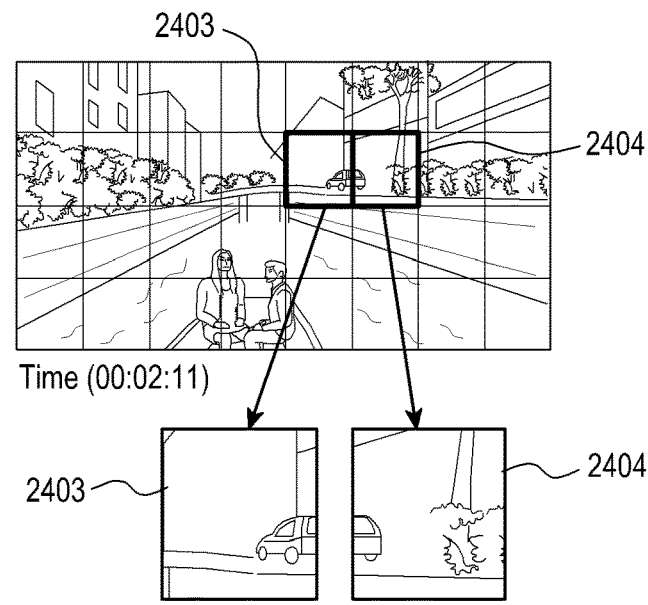

FIGS. 24A, 24B, and 24C are views illustrating methods for determining the occurrence of a move of an object by an electronic device according to various embodiments of the present disclosure.

Referring to FIG. 24A, the electronic device 101 may designate the first partial image at 2 minutes 9 seconds after the image starts to play while setting a representative image 2401 for the first partial image including at least one object. The representative image 2401 may be set based on the position of a user input for designating the first partial image. The electronic device 101 may arbitrarily set the representative image 2401 to include at least one object in the first partial image.

The electronic device 101 may find a portion that most closely matches the representative image 2401 to determine a move of at least one object included in the first partial image as the image is played. For example, the electronic device 101 may find a first image 2402 as the portion that most closely matches the representative image 2401 in the first partial image at 2 min. 10 sec. after the image starts to play as shown in FIG. 24B. For example, the electronic device 101 may find a second image 2403 and a third image 2404 as the portion that most closely matches the representative image 2401 in the first partial image at 2 min. 11 sec. after the image starts to play as shown in FIG. 24C.

The electronic device 101 may determine whether at least one object included in the first partial image moves by comparing the representative image 2401 with each of the first image 2402, the second image 2403, and the third image 2404. For example, upon determining that a difference between the representative image 2401 and the first image 2402 is a preset difference or more, the electronic device 101 may determine that at least one object included in the first partial image moves at 2 min. 10 sec. after the image starts to play. In contrast, upon determining that a difference between the representative image 2401 and the first image 2402 is less than the preset difference, the electronic device 101 may determine that at least one object included in the first partial image does not move at 2 min. 10 sec. after the image starts to play. In a similar manner, the electronic device 101 may determine whether at least one object included in the first partial image moves at 2 min. 11 sec. after the image starts to play.

However, the method for determining a move of at least one object in the first partial image as described above is merely an example for description purposes, and is not limited thereto. Other various methods may apply to determine whether at least one object in an image moves or not.

The electronic device 101 may also determine whether the first event occurs using voice information associated with the image. For example, the electronic device 101 may determine whether the first event occurs according to first voice information associated with the first partial image. Upon determining that a voice associated with at least one object included in the first partial image is generated through the first voice information while displaying the second partial image, the electronic device 101 may determine that the first event occurs.

The electronic device 101 may also determine whether the first event occurs using the first voice information and a move of the at least one object included in the first partial image.

For example, when a message or emoticon associated with the first information or at least one object included in the first partial image is searched from the memory 130 or external server, the electronic device 101 may determine that the first event occurs.

In operation 2222, upon determining that the first event occurs, the electronic device 101 may change at least one of the position of display, size, color, or shape of the first graphical object associated with the first partial image and display to notify the user of the occurrence of the first event.

FIGS. 26A, 26B, 26C, 26D, 26E, and 26F are views illustrating methods for switching images by an electronic device according to various embodiments of the present disclosure.

Figure 26A:
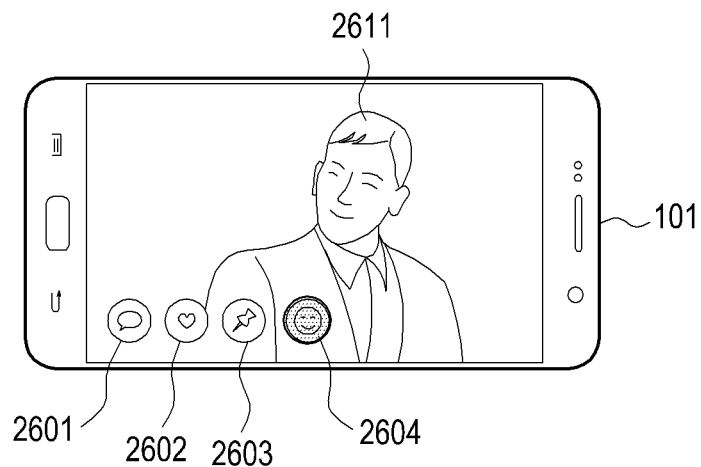
FIGS. 26A, 26B, 26C, 26D, 26E, and 26F are views illustrating methods for switching images by an electronic device according to various embodiments of the present disclosure.

Referring to FIG. 26A, the electronic device 101 may display a first partial image of an image. The electronic device 101 may display icons for executing various functions, along with the first partial image. For example, the electronic device 101 may display a first icon 2601 for executing the function of inputting a message for an object or partial image, a second icon 2602 for executing the function of inputting a degree of preference for an object or partial image, a third icon 2603 for executing the function of designating an image, and a fourth icon 2604 for executing the function of designating an object.

Figure 26B:
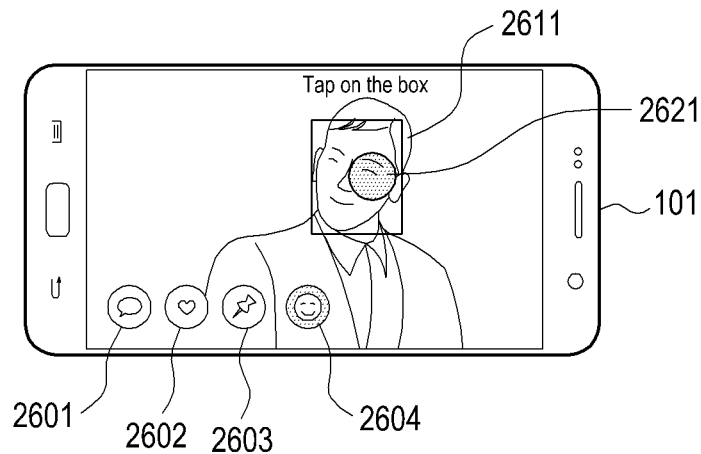

Referring to FIG. 26B, the electronic device 101 may output a message to induce the user to designate the first object 2611 included in the first partial image according to the receipt of the input for selecting the fourth icon 2604.

Figure 26C:
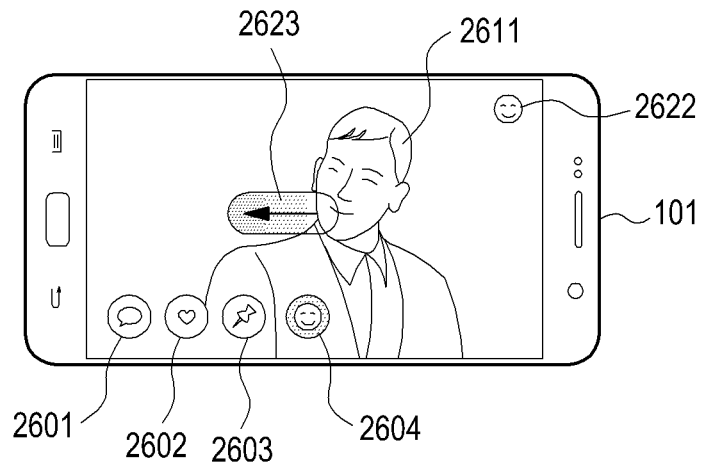

Referring to FIG. 26C, upon receiving an input 2621 for recognizing the first object 2611 from the user after the message is outputted, the electronic device 101 may designate the first object 2611 and display a graphical object 2622 to indicate that the first object 2611 has been designated.

Figure 26D:
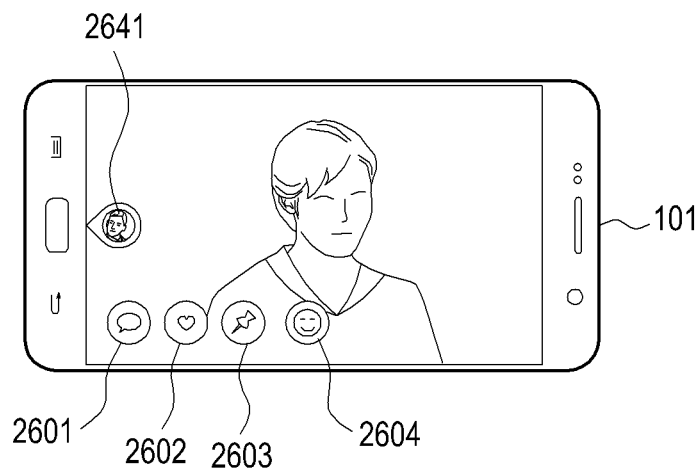

Referring to FIG. 26D, upon receiving an input 2623 for switching the image displayed on the electronic device 101 after the graphical object 2622 is displayed, the electronic device 101 may switch the displayed image to a second partial image of the image according to the input 2623. The electronic device 101 may display a first graphical object 2641 associated with the designated first object 2611.

Figure 26E:
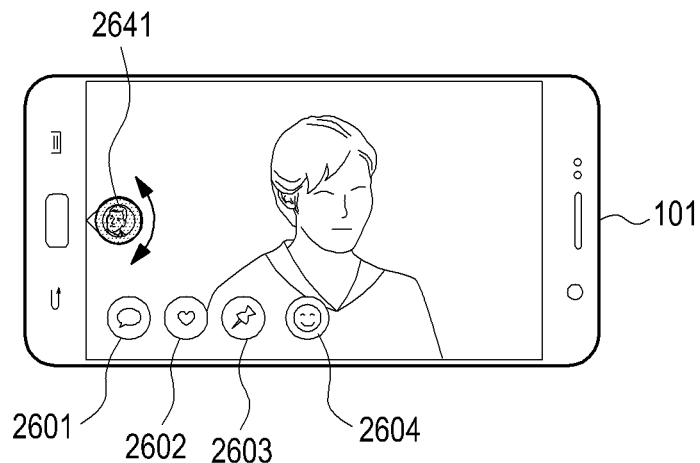

The electronic device 101 may also determine whether the first event associated with the first object occurs while displaying the second partial image. Referring to FIG. 26E, upon determining that the first event occurs, the electronic device 101 may highlight and display the first graphical object 2641 or move up and down the first graphical object 2641. Thus, the user may intuitively recognize the occurrence of the first event associated with the first object.

Figure 26F:
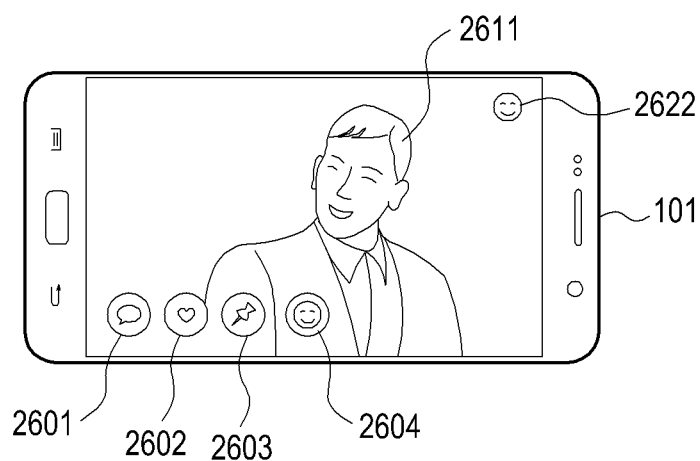

Referring to FIG. 26F, upon receiving an input for selecting the first graphical object 2641 from the user, the electronic device 101 may immediately switch the image displayed on the electronic device 101 to a partial image including the first object 2611.

FIGS. 27A, 27B, 27C, 27D, 27E, and 27F are views illustrating methods for switching images by an electronic device according to various embodiments of the present disclosure.

Figure 27A:
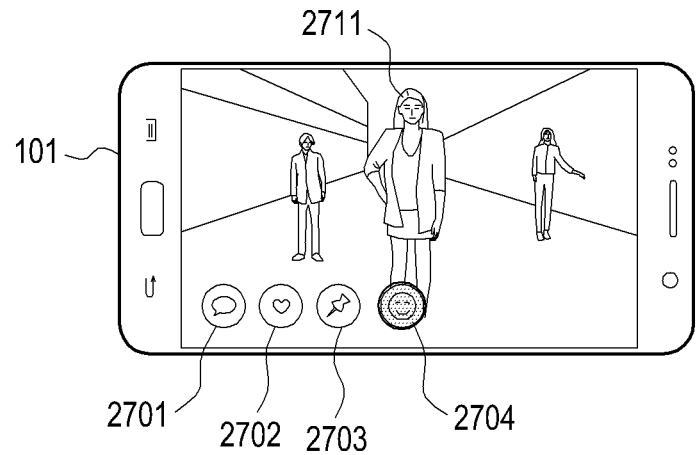
FIGS. 27A, 27B, 27C, 27D, 27E, and 27F are views illustrating methods for switching images by an electronic device according to various embodiments of the present disclosure.

Referring to FIG. 27A, the electronic device 101 may display a first partial image of an image. The electronic device 101 may display icons for executing various functions, along with the first partial image. For example, the electronic device 101 may display a first icon 2701 for executing the function of inputting a message for an object or partial image, a second icon 2702 for executing the function of inputting a degree of preference for an object or partial image, a third icon 2703 for executing the function of designating an image, and a fourth icon 2704 for executing the function of designating an object.

Figure 27B:
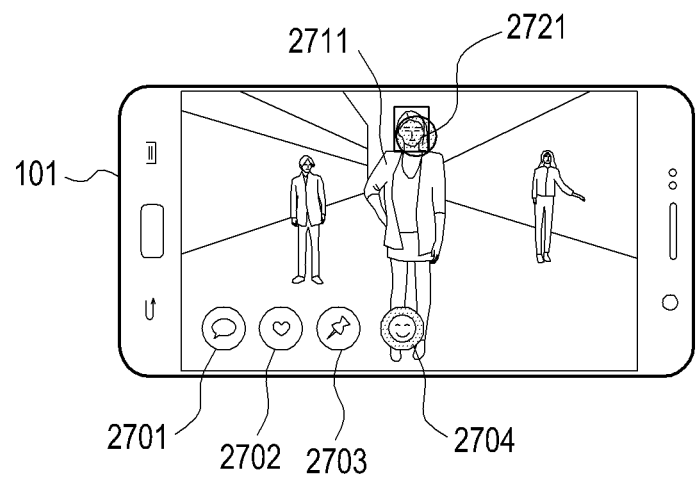

Referring to FIG. 27B, the electronic device 101 may receive an input for selecting the fourth icon 2604 and receive an input 2721 for designating the first object 2711 from the user. The electronic device 101 may also store first information associated with the first object 2711.

Figure 27C:
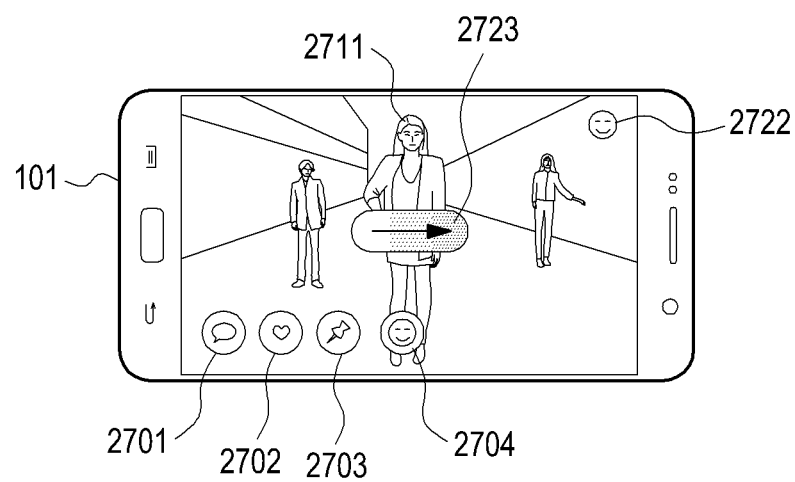

Referring to FIG. 27C, when the first object 2711 is designated according to the input 2721, the electronic device 101 may display a graphical object 2722 to indicate that the first object 2711 has been designated.

Figure 27D:
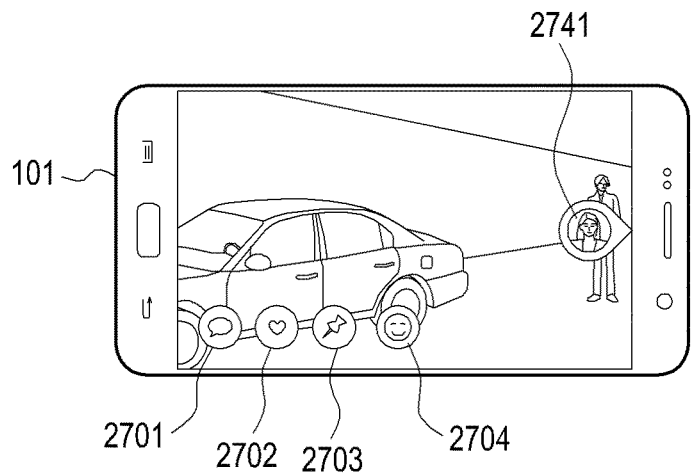

Referring to FIG. 27D, upon receiving an input 2723 for switching the image displayed on the electronic device 101 after the graphical object 2722 is displayed, the electronic device 101 may switch the displayed image to a second partial image of the image according to the input 2723. The electronic device 101 may display a first graphical object 2741 associated with the designated first object 2711.

Figure 27E:
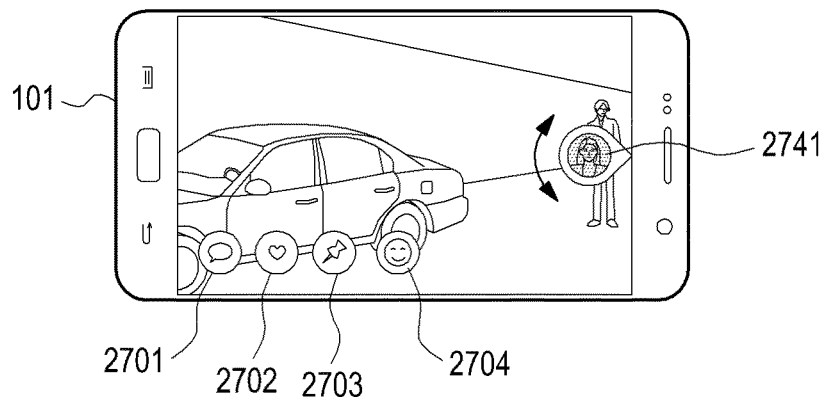

The electronic device 101 may also determine whether the first event associated with the first object occurs while displaying the second partial image. Referring to FIG. 27E, upon determining that the first event occurs, the electronic device 101 may highlight and display the first graphical object 2741 or move up and down the first graphical object 2741. Thus, the user may intuitively recognize the occurrence of the first event associated with the first object.

Figure 27F:
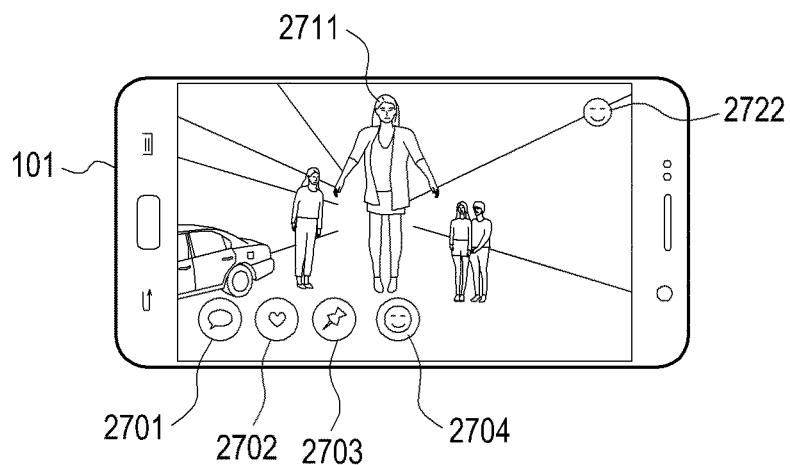

Referring to FIG. 27F, upon receiving an input for selecting the first graphical object 2741 from the user, the electronic device 101 may immediately switch the image displayed on the electronic device 101 to a partial image including the first object 2711 using the information associated with the first object 2711.

FIGS. 28A, 28B, 28C, 28D, 28E, to 28F are views illustrating methods for inputting a preference for a partial image by an electronic device according to various embodiments of the present disclosure.

Figure 28A:
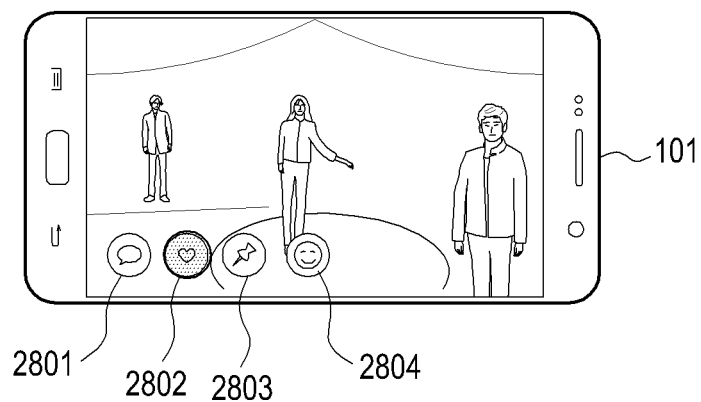
FIGS. 28A, 28B, 28C, 28D, 28E, and 28F are views illustrating methods for inputting a preference for a partial image by an electronic device according to various embodiments of the present disclosure.

Referring to FIG. 28A, the electronic device 101 may display a first partial image of an image. The electronic device 101 may display icons for executing various functions, along with the first partial image. For example, the electronic device 101 may display a first icon 2801 for executing the function of inputting a message for an object or partial image, a second icon 2802 for executing the function of inputting a degree of preference for an object or partial image, a third icon 2803 for executing the function of designating an image, and a fourth icon 2804 for executing the function of designating an object.

Figure 28B:
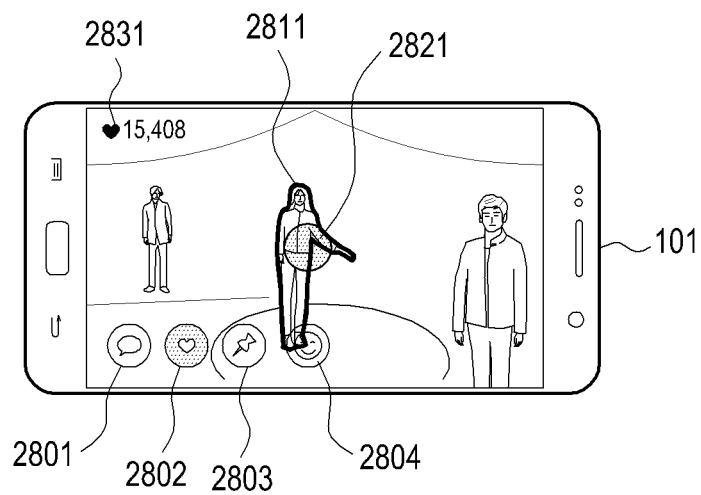

Referring to FIG. 28B, upon receiving an input for selecting the second icon 2802, the electronic device 101 may recognize the first object 2811 from the first partial image. The electronic device 101 may also display a graphical object 2831 indicating the number of degrees of preference entered for the first object 2811.

Figure 28C:
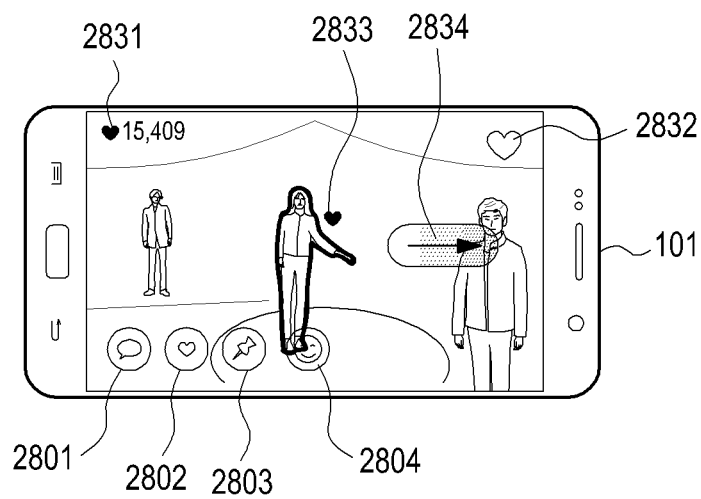

Referring to FIG. 28C, upon receiving an input 2821 for increasing the degree of preference for the first object 2811, the electronic device 101 may display a heart-shaped graphical object 2833 around the first object 2811 and display, on an upper and right portion of the display, a graphical object 2832 indicating that the degree of preference has been entered.

Figure 28D:
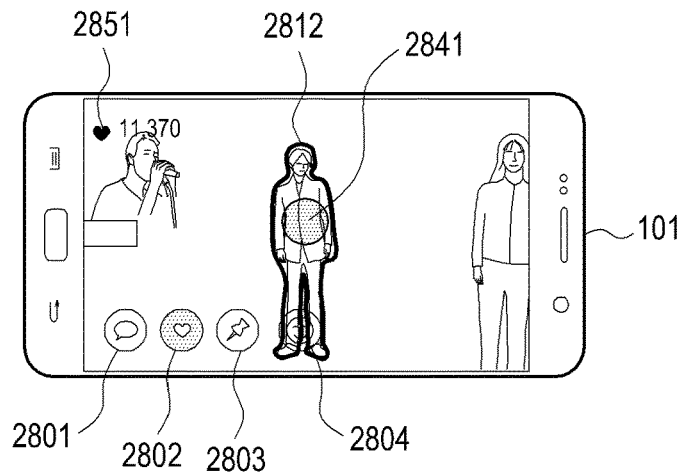

Referring to FIG. 28D, upon receiving an input 2834 for switching the image, the electronic device 101 may switch the displayed image to a second partial image of the image according to the input 2834.

Referring to FIG. 28D, upon receiving an input for selecting the second icon 2802, the electronic device 202 may recognize the second object 2812 from the second partial image. The electronic device 101 may also display a graphical object 2851 indicating the number of degrees of preference entered for the second object 2812.

Figure 28E:
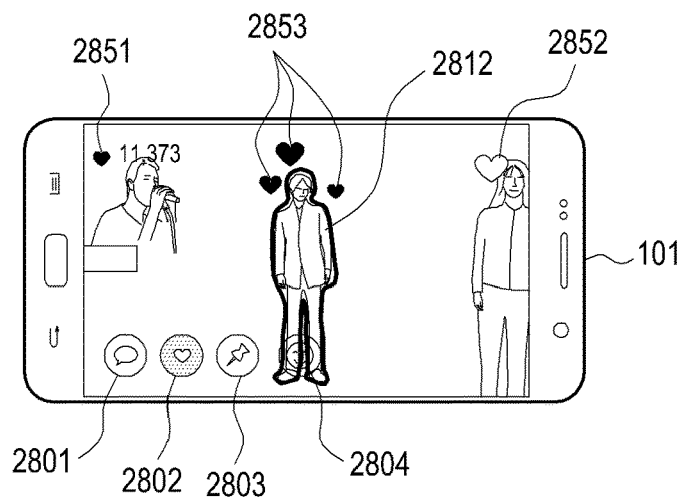
Figure 28F:
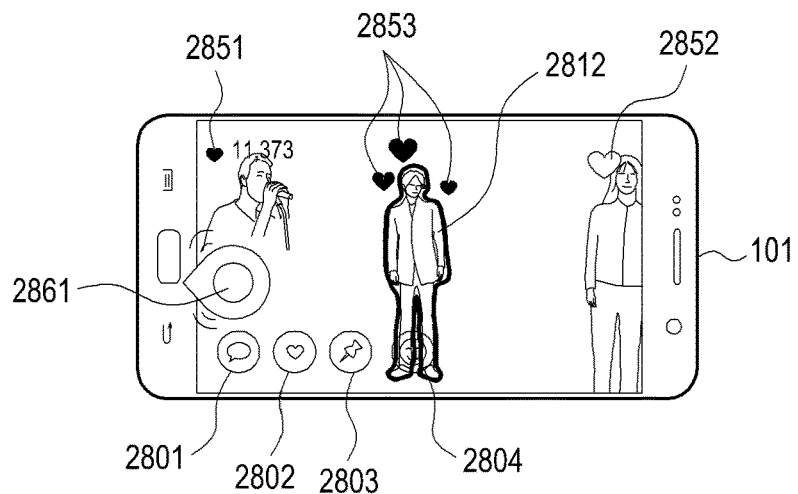

Referring to FIG. 28E, upon receiving an input 2841 for increasing the degree of preference for the second object 2812, the electronic device 101 may display heart-shaped graphical objects 2853 around the second object 2812 and display, on an upper and right portion of the display, a graphical object 2852 indicating that the degree of preference has been entered.

Even after displaying the second partial image, the electronic device 101 may identify a variation in the number of the degrees of preference entered for the first object 2811. When the number of the degrees of preference entered for the first object 2811 is varied, the electronic device 101 may highlight and display the first graphical object 2861 associated with the first object 2811 or move up and down the first graphical object 2861. Accordingly, the user may intuitively recognize that the number of degrees of preference has been varied in relation to the first object 2811.

FIGS. 29A, 29B, 29C, 29D, and 29E are views illustrating methods for displaying a message or emoticon associated with a partial image of an image by an electronic device according to various embodiments of the present disclosure.

Figure 29A:
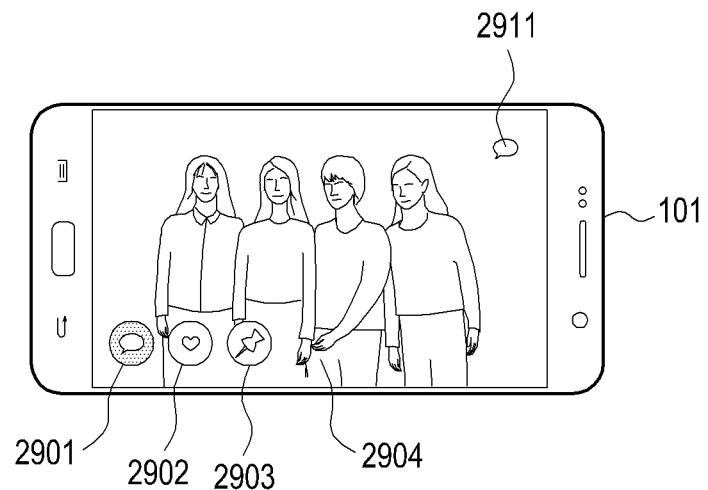
FIGS. 29A, 29B, 29C, 29D, and 29E are views illustrating methods for displaying a message or emoticon associated with a partial image of an image by an electronic device according to various embodiments of the present disclosure.

Referring to FIG. 29A, the electronic device 101 may display a first partial image of an image. The electronic device 101 may display icons for executing various functions, along with the first partial image. For example, the electronic device 101 may display a first icon 2901 for executing the function of inputting a message related to an object or partial image, a second icon 2902 for executing the function of inputting a degree of preference for an object or partial image, and a third icon 2903 for executing the function of designating an image.

Figure 29B:
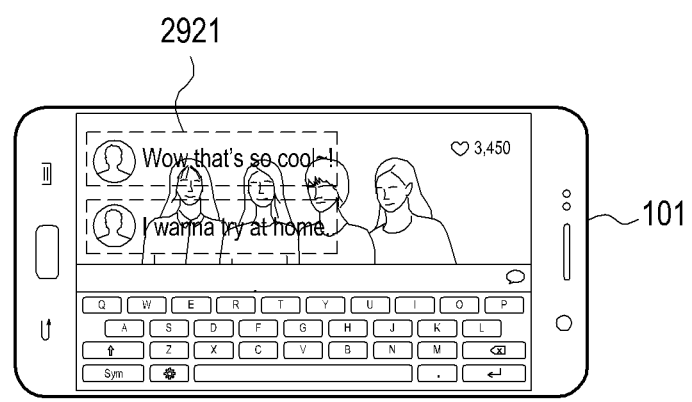

Referring to FIG. 29B, upon receiving an input for selecting the first icon 2901 from the user, the electronic device 101 may display a keypad for entering the message. When a message related to the first partial image is searched from the memory or external server, the electronic device 101 may display a graphical object 2911 for indicating the presence of the message related to the first partial image.

Referring to FIG. 29B, the electronic device 101 may display the message 2921 related to the first partial image as the first icon 2901 is selected. As such, the electronic device 101 may display the message 2921 related to the partial image.

Figure 29C:
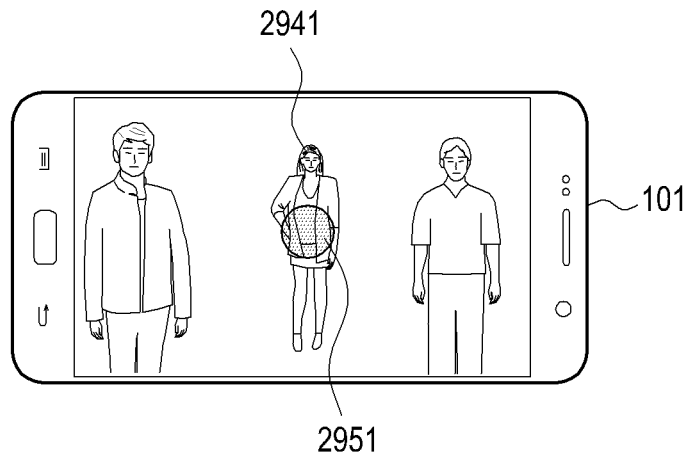
Figure 29D:
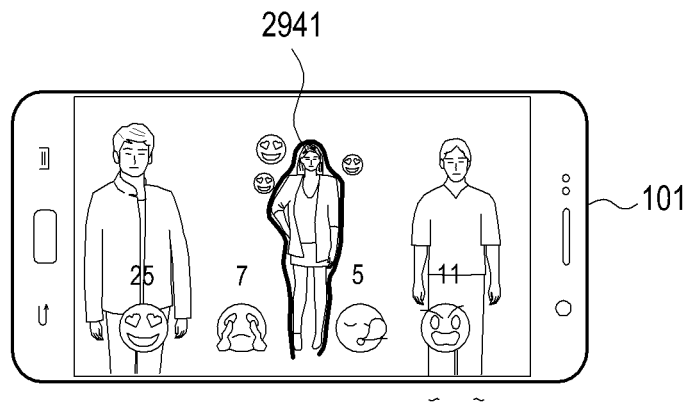

Referring to FIG. 29C, the electronic device 101 may recognize and designate the first object 2941 included in the first partial image of the image displayed according to a user input 2951. Referring to FIG. 29D, the electronic device 101 may also display an emoticon associated with the designated first object 2941 around the first object 2941.

Figure 29E:
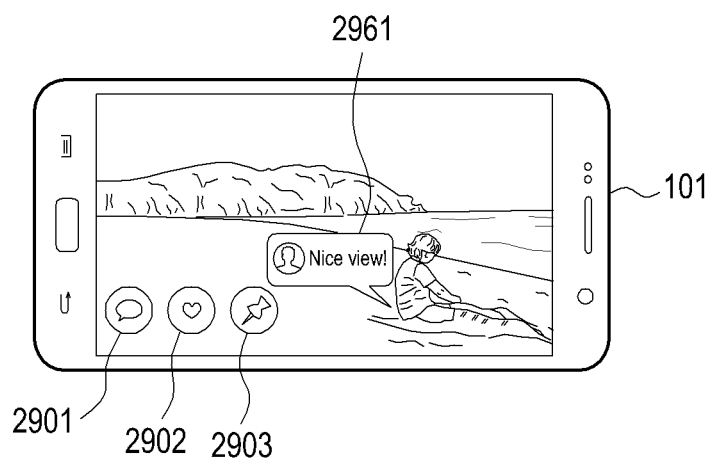

Referring to FIG. 29E, the electronic device 101 may also display a message or emoticon 2961 entered by another user to correspond to the object associated with the message or emoticon 2961. As such, the electronic device 101 may display, in association with an object in various manners, not only the message or emoticon entered by the user but also a message or emoticon 2961 entered by another user.

FIGS. 30A, 30B, 30C, 30D, 30E, 30F, 30G, 30H, 30I, and 30J are views illustrating methods for inputting a message by an electronic device according to various embodiments of the present disclosure.

Figure 30A:
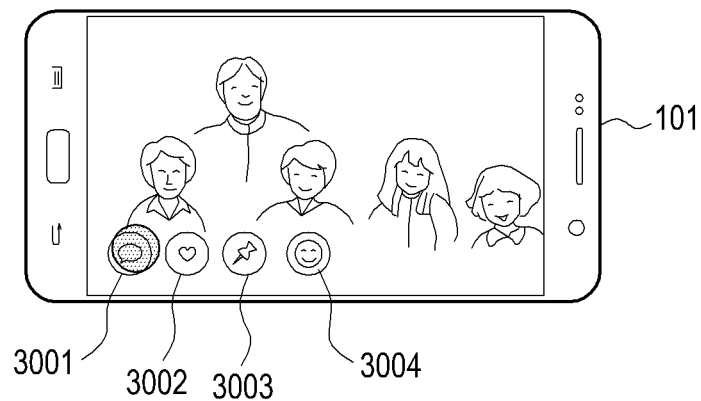
FIGS. 30A, 30B, 30C, 30D, 30E, 30F, 30G, 30H, 30I, and 30J are views illustrating methods for inputting a message by an electronic device according to various embodiments of the present disclosure.

Referring to FIG. 30A, the electronic device 101 may display a first partial image of an image. The electronic device 101 may display icons for executing various functions, along with the first partial image. For example, the electronic device 101 may display a first icon 3001 for executing the function of inputting a message for an object or partial image, a second icon 3002 for executing the function of inputting a degree of preference for an object or partial image, a third icon 3003 for executing the function of designating an image, and a fourth icon 3004 for executing the function of designating an object.

Figure 30B:
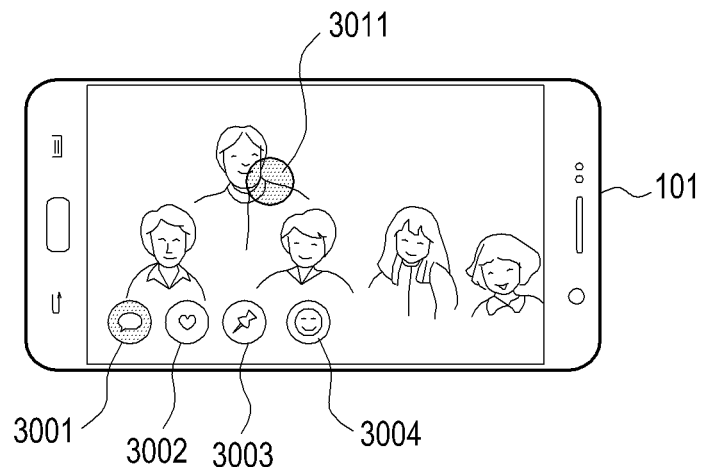

Referring to FIG. 30B, upon receiving an input for selecting the first icon 3001, the electronic device 101 may receive an input 3011 for selecting an object for which a message is to be entered among a plurality of objects included in the first partial image.

Figure 30C:
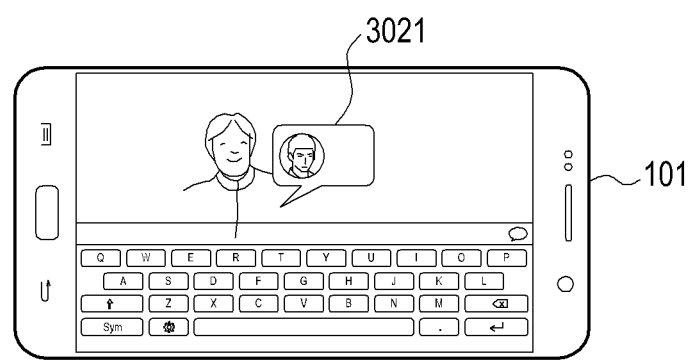

Referring to FIG. 30C, when a first object is selected from among the plurality of objects according to the input 3011, the electronic device 101 may display a popup 3021 for displaying a message for the first object and a keypad for entering a message. The position of the popup 3021 may be flexibly determined depending on the position of the object selected by the input 3011.

Figure 30D:
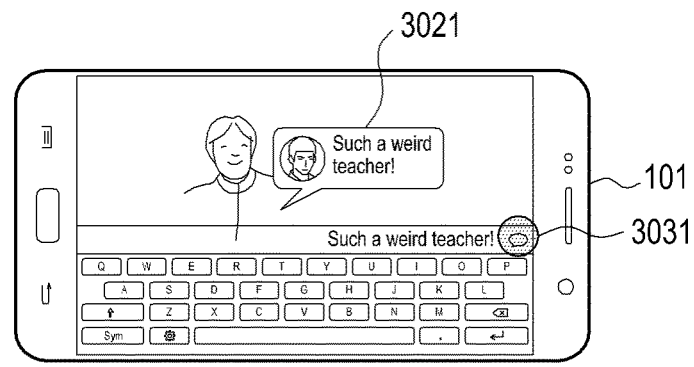

Referring to FIG. 30D, when the user enters a message through the keypad, and a fifth icon 3031 for executing the function of transmitting an entered message is selected, the electronic device 101 displays the user-entered message in the popup 3021.

Figure 30E:
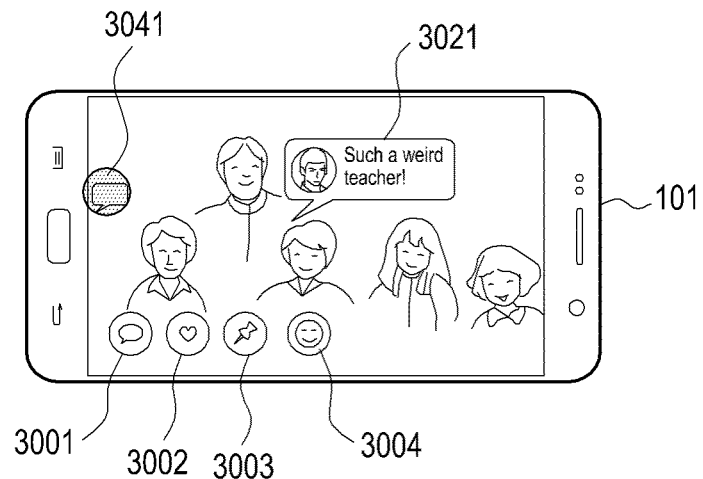

Referring to FIG. 30E, when the entry of message is done, the electronic device 101 may remove the keypad. When a message associated with the second object included in the image is searched, the electronic device 101 may display the first graphical object 3041 associated with the second object. Also, the electronic device 101 may determine that the event associated with the second object occurs and highlight-and-display or move up and down the first graphical object 3041 to notify the user of the occurrence of the event.

Figure 30F:
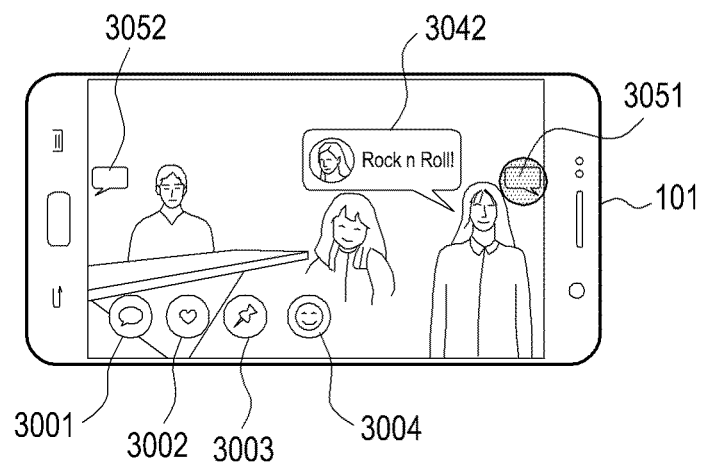

Referring to FIG. 30F, upon receiving an input for selecting the first graphical object 3041, the electronic device 101 may switch the image displayed through the display to the second partial image including the second object and display the second partial image. The electronic device 101 may display the second partial image, along with the message for the second object included in the second partial image through a popup 3042. When a message associated with a third object included in the image which is entered by another user is searched, the electronic device 101 may display the second graphical object 3051 associated with the third object, and when a message associated with a fourth object included in the image is searched, the electronic device 101 may display the third graphical object 3052 associated with the fourth object.

Figure 30G:
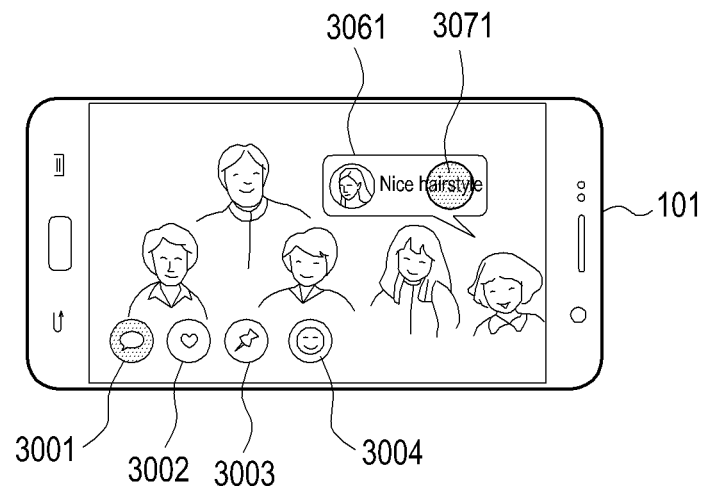

Referring to FIG. 30G, upon receiving an input for selecting the second graphical object 3051, the electronic device 101 may switch the image displayed through the display to a partial image including the third object and display the partial image. The electronic device 101 may display the first partial image along with a message associated with the third object entered by the other user through a popup 3061. The electronic device 101 may enable the popup 3021 displaying the message associated with the first object to disappear after a predetermined time elapses.

Figure 30H:
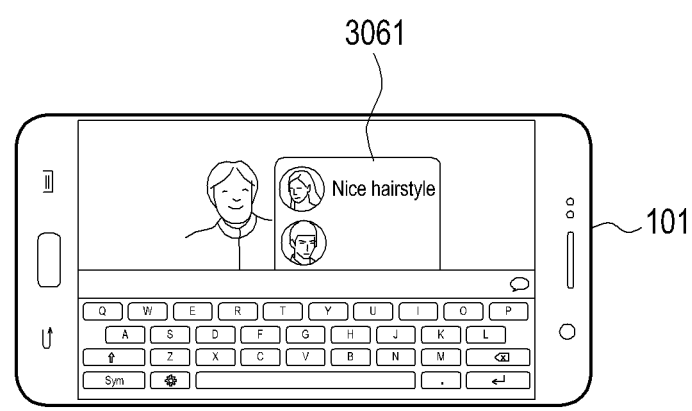

Referring to FIG. 30H, upon receiving an input 3071 for selecting the popup 3061, the electronic device 101 may enlarge the popup 3061 and display a keypad for entering a message.

Figure 30I:
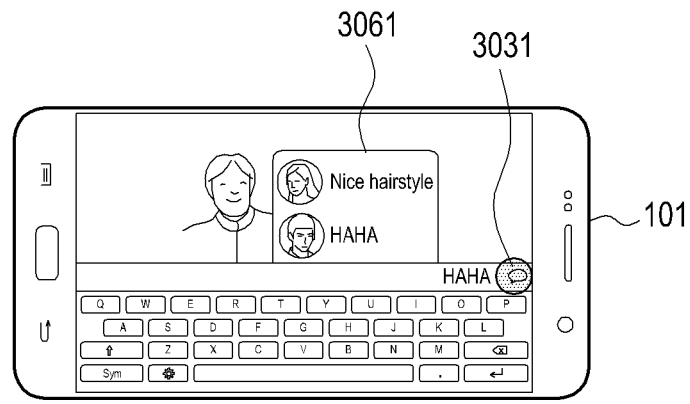

Referring to FIG. 30I, when the user enters a message through the keypad, and a fifth icon 3031 for executing the function of transmitting an entered message is selected, the electronic device 101 displays the user-entered message in the popup 3061.

Figure 30J:
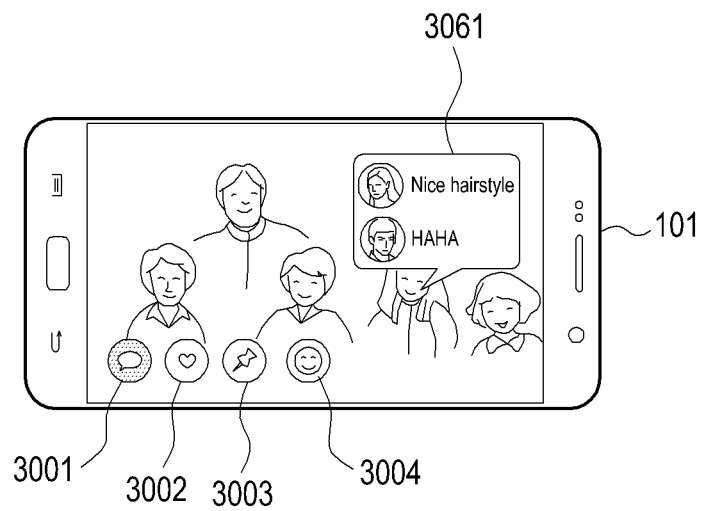

When the entry of message is complete, the electronic device 101 may remove the keypad as shown in FIG. 30J. As such, the electronic device 101 may subsequently display the message entered by the user in the popup 3061 displaying the message entered by the other user.

FIGS. 31A, 31B, 31C, 31D, and 31E are views illustrating methods for displaying a message by an electronic device according to various embodiments of the present disclosure.

Figure 31A:
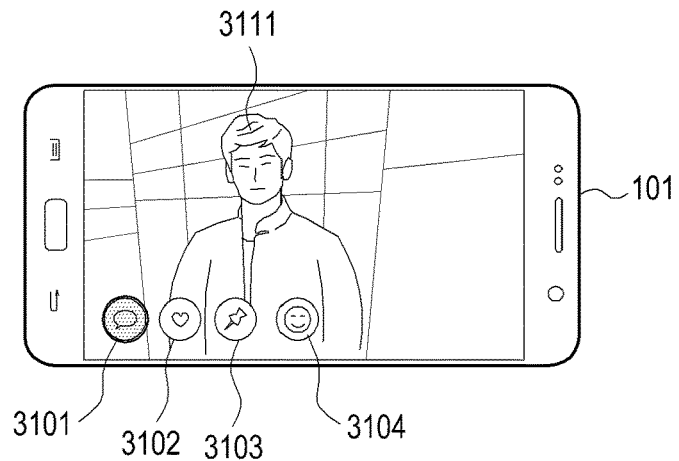
FIGS. 31A, 31B, 31C, 31D, and 31E are views illustrating methods for displaying a message by an electronic device according to various embodiments of the present disclosure.

Referring to FIG. 31A, the electronic device 101 may display a first partial image of an image. The electronic device 101 may display icons for executing various functions, along with the first partial image. For example, the electronic device 101 may display a first icon 3101 for executing the function of inputting a message for an object or partial image, a second icon 3102 for executing the function of inputting a degree of preference for an object or partial image, a third icon 3103 for executing the function of designating an image, and a fourth icon 3104 for executing the function of designating an object.

Figure 31B:
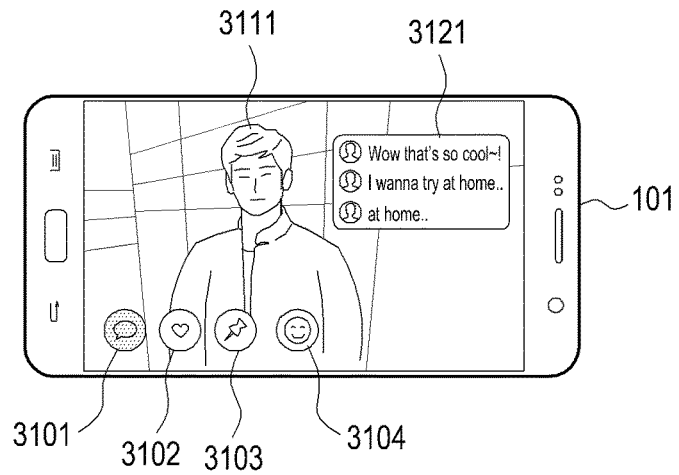

Referring to FIG. 31B, upon receiving an input for selecting the first icon 3101, the electronic device 101 may display a popup 3121 for displaying a message associated with the first object 3111, which is entered by another user, around the first object 3111 included in the first partial image.

Figure 31C:
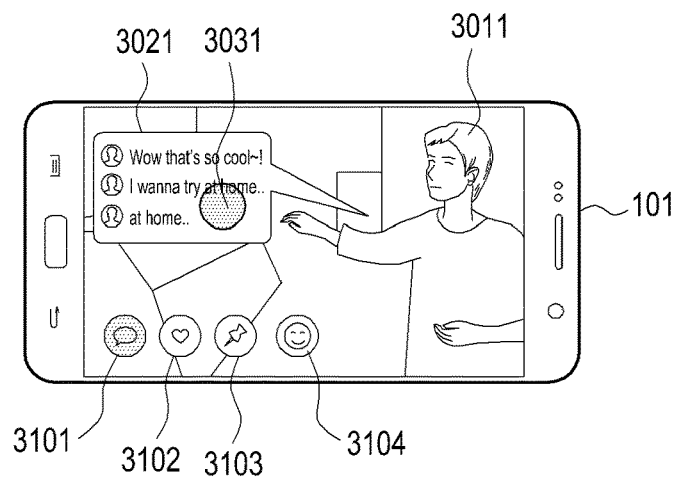

Referring to FIG. 31C, the electronic device 101 may flexibly change the position or shape of the popup 3121 as the first object 3111 moves.

Figure 31D:
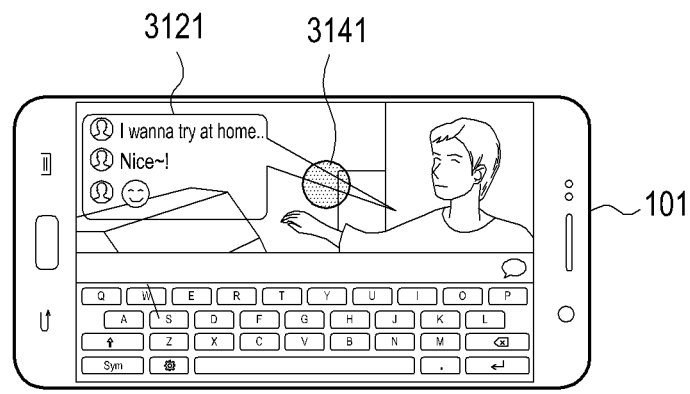
Figure 31E:
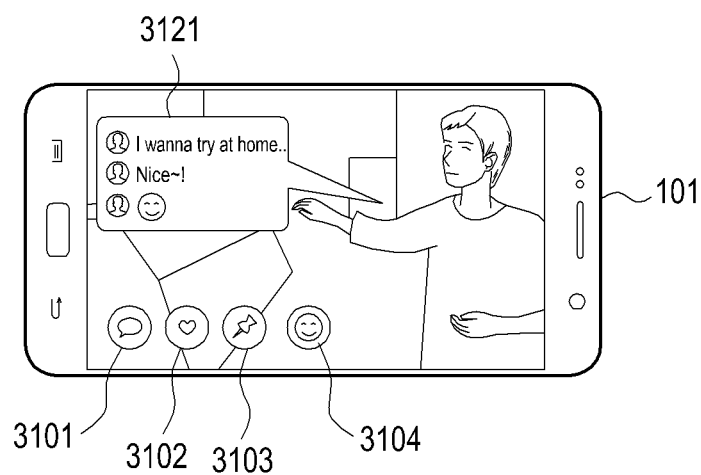

Referring to FIG. 31D, upon receiving an input 3131 for selecting the popup 3121, the electronic device 101 may display a keypad for entering a message. Referring to FIG. 31E, upon receiving an input 3141 for selecting a portion other than the keypad, the electronic device 101 may remove the keypad.

Figure 32:
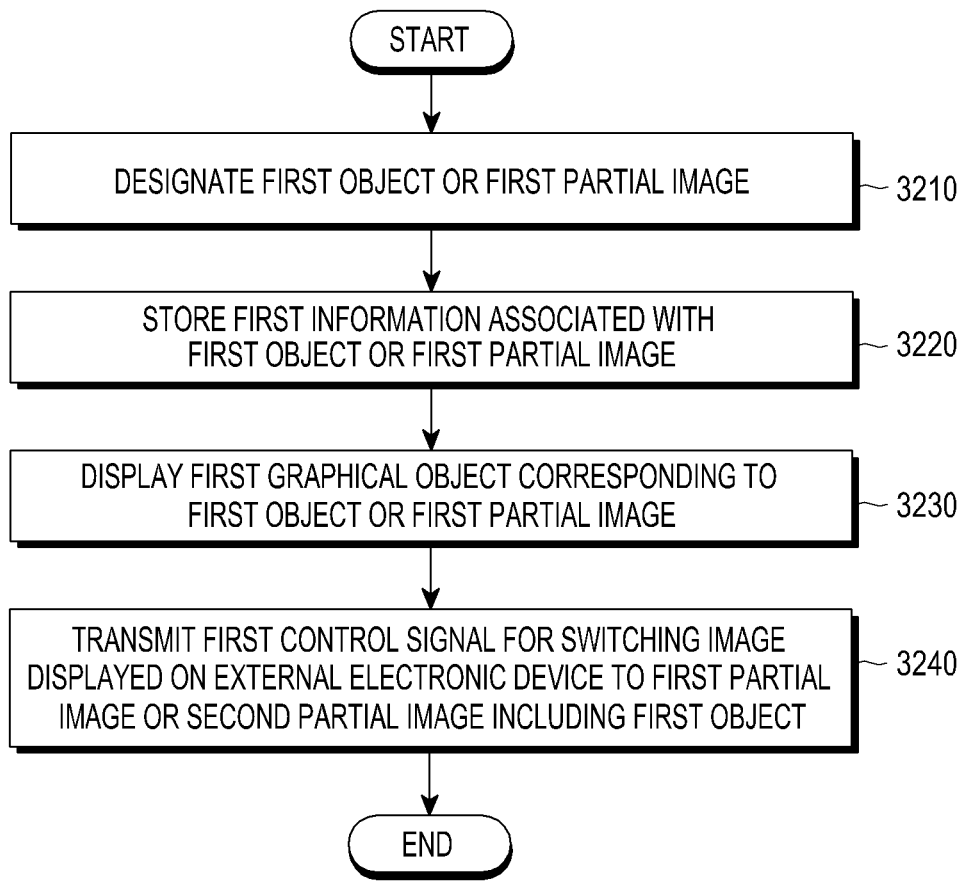
FIG. 32 is a flowchart illustrating a method for controlling an external electronic device displaying an image by an electronic device according to an embodiment of the present disclosure.

FIG. 32 is a flowchart illustrating a method for controlling an external electronic device displaying an image by an electronic device according to an embodiment of the present disclosure.

In operation 3210, upon receiving a first input for designating a first partial image or a first object included in the first partial image displayed on an external electronic device, the electronic device 101 may designate the first object or the first partial image. The external electronic device may display the first partial image of the image. The external electronic device may display the first partial image of the image according to a user input or setting or under the control of the electronic device 101.

In operation 3220, the electronic device 101 may store first information associated with the first partial image or the first object. The first information associated with the first partial image or the first object may include various pieces of information available to specify or identify the first partial image or the first object.

The electronic device 101 may also transmit a control signal for storing the first information associated with the first partial image or the first object to the external electronic device. In this case, the external electronic device may store the first information associated with the first partial image or the first object according to the control signal.

In operation 3230, the electronic device 101 may display a first graphical object corresponding to the first partial image or the first object through a user interface based on the first information. The electronic device 101 may display a user interface for controlling the external electronic device and display the first graphical object through the user interface.

In operation 3240, upon receiving a second input for selecting the first graphical object, the electronic device 101 may transmit a first control signal for switching the image displayed on the external electronic device to the first partial image or a second partial image including the first object according to the first information to the external electronic device through the communication circuit of the electronic device 101. The external electronic device may immediately switch the displayed image to the first partial image or the second partial image including the first object according to the first control signal. The second partial image may be the same as the first partial image or at least a portion thereof may be different from the first partial image.

For example, where the first object does not move, the second partial image may be the same as the first partial image. In contrast, where the first object move, the second partial image may, at least partially, be different from the first partial image.

FIGS. 33A, 33B, 33C, 33D, to 33E are views illustrating methods for operating an electronic device that controls an external electronic device according to various embodiments of the present disclosure.

Figure 33A:
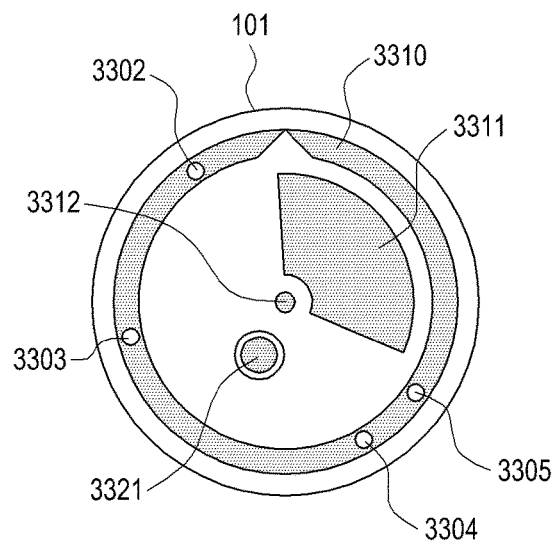
FIGS. 33A, 33B, 33C, 33D, and 33E are views illustrating methods for operating an electronic device that controls an external electronic device according to various embodiments of the present disclosure.

Referring to FIG. 33A, the electronic device 101 may display a user interface for controlling an external electronic device that displays an image. The user interface may include a first graphical object 3310 corresponding to the whole image. The user interface may also include a second graphical object 3311 for indicating a view range corresponding to the first partial image displayed on the external electronic device with respect to the central point 3312. The user interface may display a plurality of graphical objects 3302, 3303, 3304, and 3305 associated with their respective objects or partial images currently designated. Thus, the user may intuitively recognize where each of the plurality of designated objects or partial images is positioned in the image.

Figure 33B:
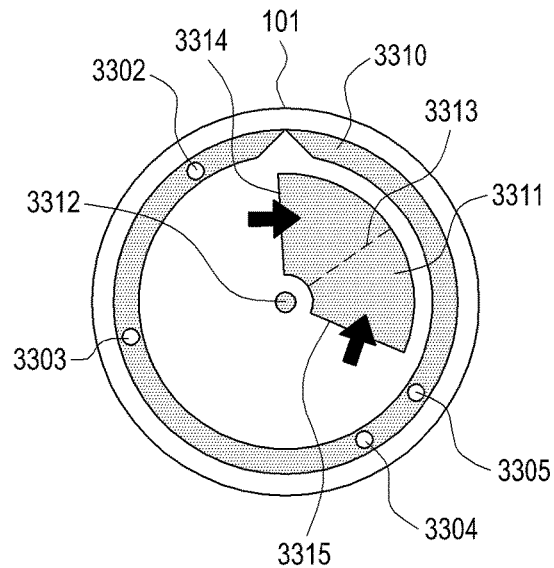

Referring to FIG. 33B, upon receiving an input 3321 for designating the first partial image displayed on the external electronic device or the first object included in the first partial image, the electronic device 101 may move a first border line 3314 and second border line 3315 of the second graphical object 3311 to a virtual reference line 3313. The process of moving the first border line 3314 and the second border line 3315 of the second graphical object 3311 may be displayed through the display of the electronic device 101. The reference line 3313 may be set to correspond to the position of the first object, a central line of the second graphical object 3311, or a line in the second graphical object 3311.

Figure 33C:
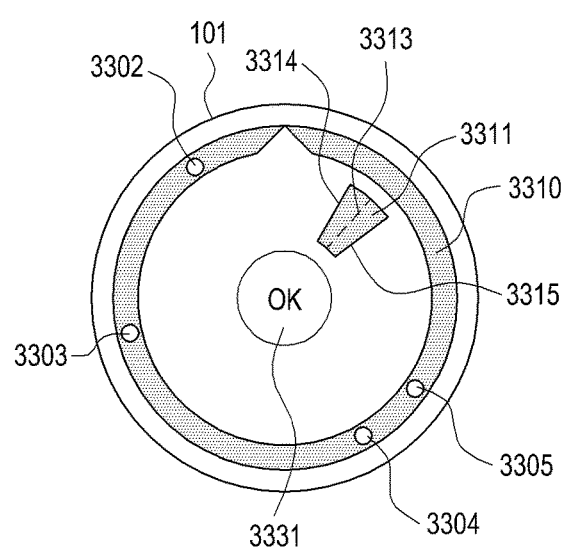

Referring to FIG. 33C, when the distance between the first border line 3314 and the second border line 3315 and the reference line 3313 corresponds to a preset value, the electronic device 101 may display a first icon 3331 for executing the function of designating the first partial image or the first object.

Figure 33D:
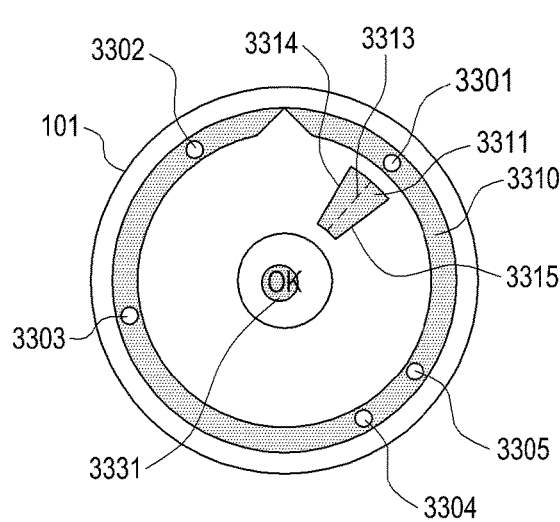

Referring to FIG. 33D, upon receiving an input for selecting the first icon 3331, the electronic device 101 may display a graphical object 3301 corresponding to the first partial image or the first object to indicate that the first object or the first partial image has been designated in the position of the first graphical object 3310 corresponding to the reference line 3313. Thus, the user may recognize that the first object or first partial image has been designated.

Figure 33E:
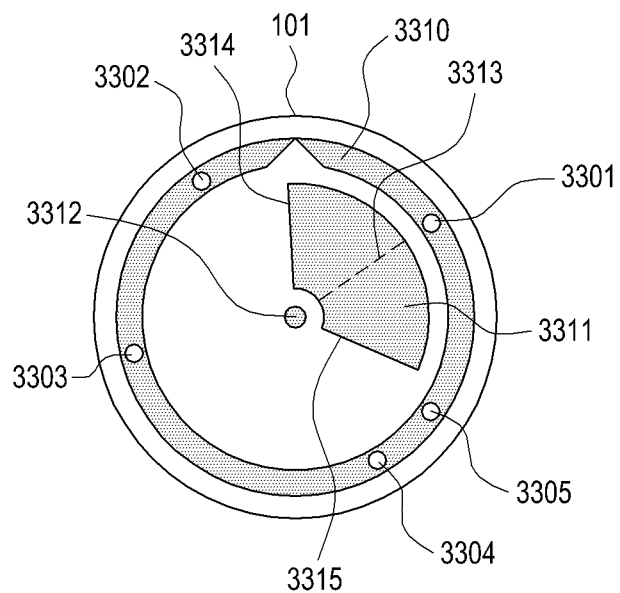

Referring to FIG. 33E, when the designation of the first object or first partial image is complete, the electronic device 101 may resize the second graphical object 3311 back to its original size.

FIGS. 34A, 34B, 34C, and 34D are views illustrating methods for operating an electronic device that controls an external electronic device according to various embodiments of the present disclosure.

Figure 34A:
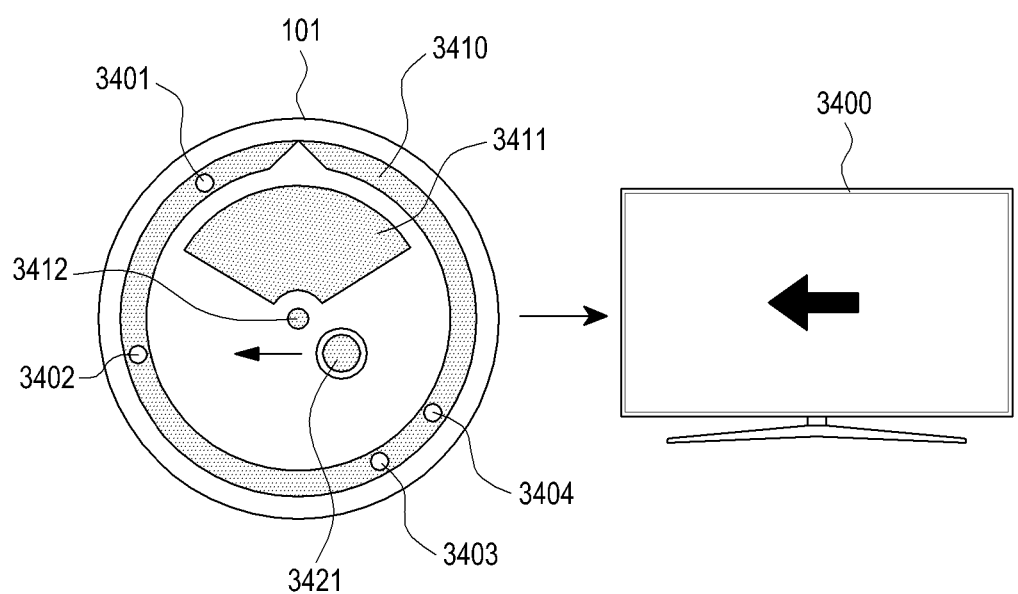
FIGS. 34A, 34B, 34C, and 34D are views illustrating methods for operating an electronic device that controls an external electronic device according to various embodiments of the present disclosure.

Referring to FIG. 34A, the electronic device 101 may display a user interface for controlling an external electronic device 3400 that displays an image. The user interface may include a first graphical object 3410 corresponding to the whole image. The user interface may also include a second graphical object 3411 for indicating a view range corresponding to the first partial image displayed on the external electronic device 3400 with respect to the central point 3412. The user interface may display a plurality of graphical objects 3401, 3402, 3403, and 3404 to indicate a plurality of objects or partial images currently designated. Thus, the user may intuitively recognize where each of the plurality of designated objects or partial images is positioned in the image.

Upon receiving an input 3421 in a left direction for switching the image displayed on the external electronic device 3400, the electronic device 101 may transmit a control signal for switching the image displayed on the external electronic device 3400 in the left direction according to the input 3421 to the external electronic device 3400.

The external electronic device 3400 may switch the displayed image in the left direction which is the direction of the input according to the control signal.

Figure 34B:
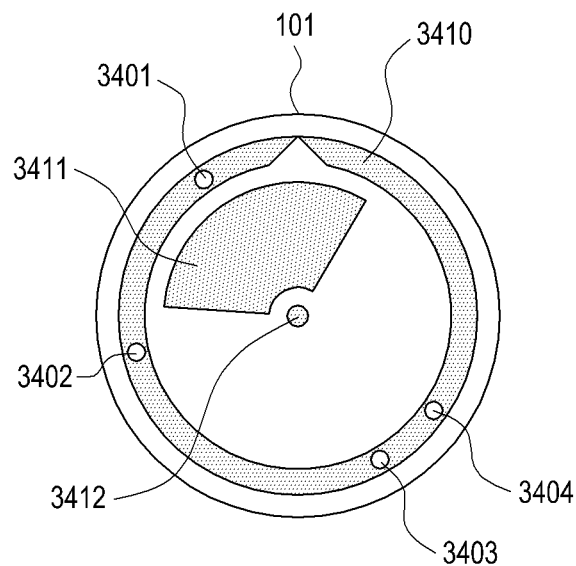

Referring to FIG. 34B, the electronic device 101 may also move the position of the second graphical object 3411 according to the input 3421. Thus, the user may identify the position of the partial image being currently displayed on the external electronic device 3400 in the overall image.

Figure 34C:
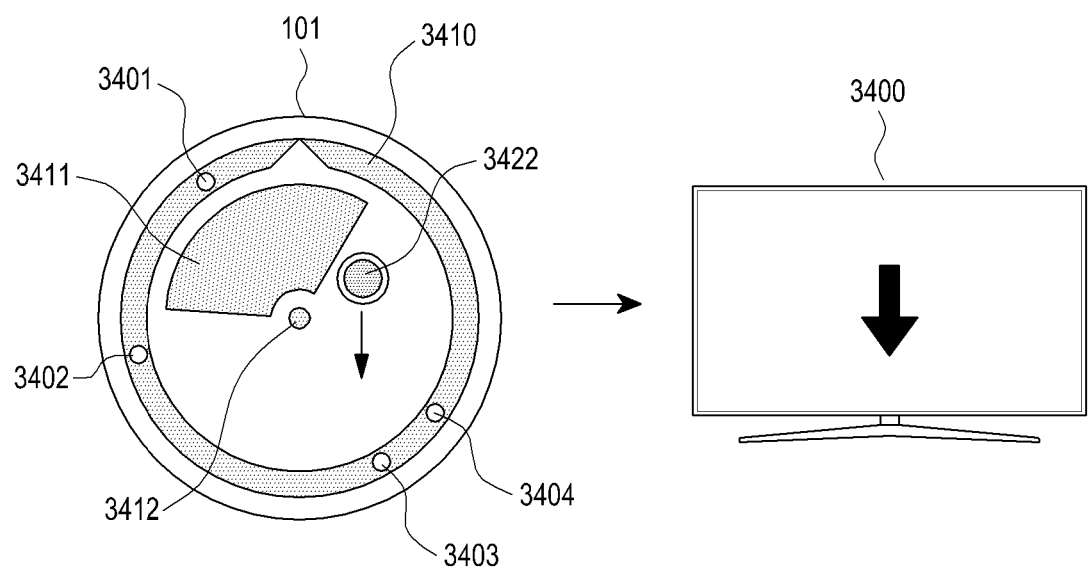

Referring to FIG. 34C, upon receiving an input 3422 in a lower direction for switching the image displayed on the external electronic device 3400, the electronic device 101 may transmit a control signal for switching the image displayed on the external electronic device 3400 in the lower direction according to the input 3421 to the external electronic device 3400.

The external electronic device 3400 may switch the displayed image in the lower direction which is the direction of the input according to the control signal.

Figure 34D:
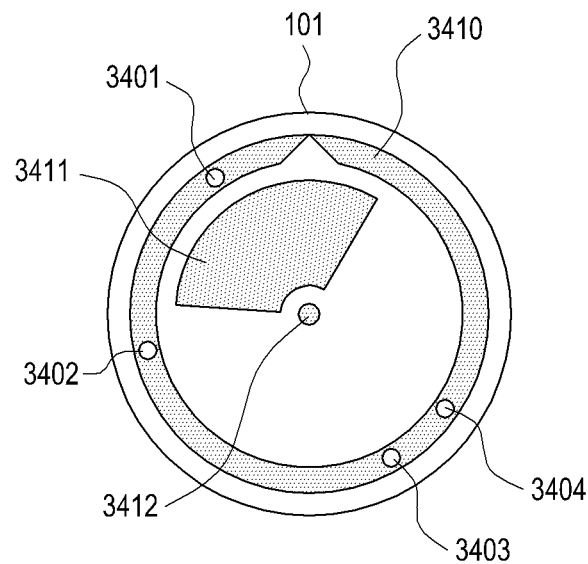

When the image being displayed on the external electronic device 3400 is switched only in the lower direction according to the input 3421, the electronic device 101 may abstain from moving the position of the second graphical object 3411 as shown in FIG. 34D.

FIGS. 35A, 35B, 35C, and 35D are views illustrating methods for operating an electronic device that controls an external electronic device according to various embodiments of the present disclosure.

Figure 35A:
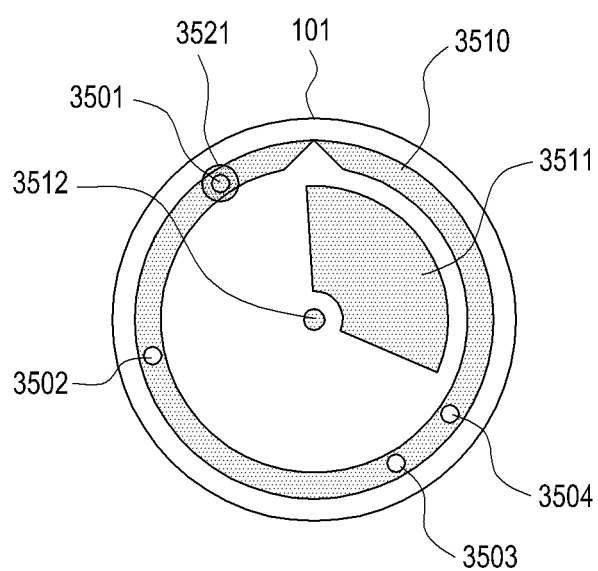
FIGS. 35A, 35B, 35C, and 35D are views illustrating methods for operating an electronic device that controls an external electronic device according to various embodiments of the present disclosure.

Referring to FIG. 35A, the electronic device 101 may display a user interface for controlling an external electronic device 3500 that displays an image. The user interface may include a first graphical object 3510 corresponding to the whole image. The user interface may also include a second graphical object 3511 for indicating a view range corresponding to the first partial image displayed on the external electronic device 3500 with respect to the central point 3512. The user interface may display a plurality of graphical objects 3501, 3502, 3503, and 3504 to indicate a plurality of objects or partial images currently designated. Thus, the user may intuitively recognize where each of the plurality of designated objects or partial images is positioned in the image.

Figure 35B:
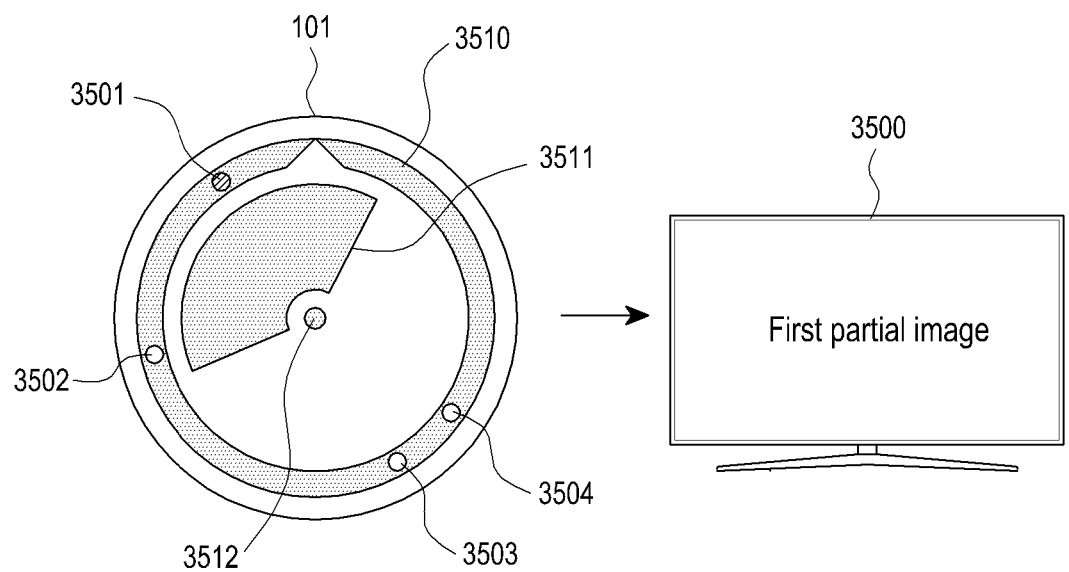

Referring to FIG. 35A, the electronic device 101 may receive an input 3521 for selecting a graphical object 3501 corresponding to the first partial image. In this case, the electronic device 101 may move the second graphical object 3511 to correspond to the graphical object 3501 corresponding to the first partial image, corresponding to the input 3521 as shown in FIG. 35B.

As the second graphical object 3511 is moved to correspond to the graphical object 3501 corresponding to the first partial image, the electronic device 101 may transmit a control signal for displaying the first partial image to the external electronic device 3500 through the communication circuit of the electronic device 101. The external electronic device 3500 may switch the image displayed through the display of the external electronic device 3500 to the first partial image according to the control signal.

Figure 35C:
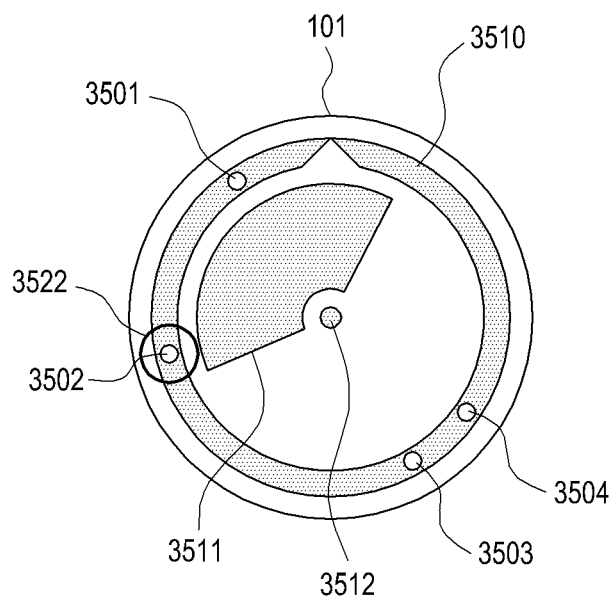
Figure 35D:
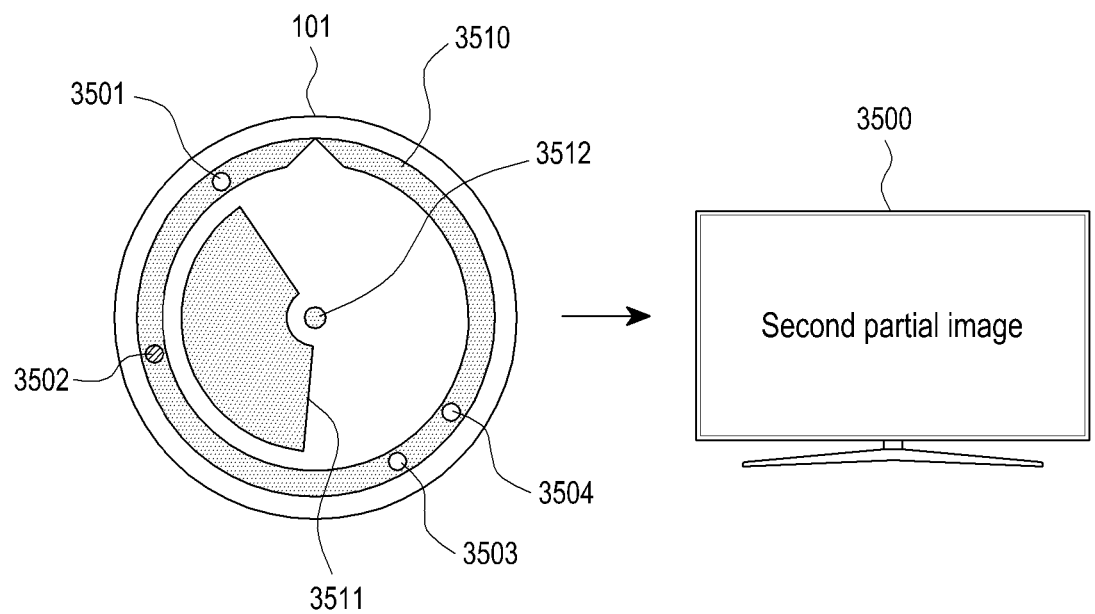

Referring to FIG. 35C, the electronic device 101 may receive an input 3522 for selecting a graphical object 3502 corresponding to the second partial image. In this case, the electronic device 101 may move the second graphical object 3511 to correspond to the graphical object 3502 corresponding to the second partial image, corresponding to the input 3522 as shown in FIG. 35D.

As the second graphical object 3511 is moved to correspond to the graphical object 3502 corresponding to the second partial image, the electronic device 101 may transmit a control signal for displaying the second partial image to the external electronic device 3500 through the communication circuit of the electronic device 101. The external electronic device 3500 may switch the image displayed through the display of the external electronic device 3500 to the second partial image according to the control signal.

FIGS. 36A, 36B, 36C, and 36D are views illustrating methods for operating an electronic device that controls an external electronic device according to various embodiments of the present disclosure.

Figure 36A:
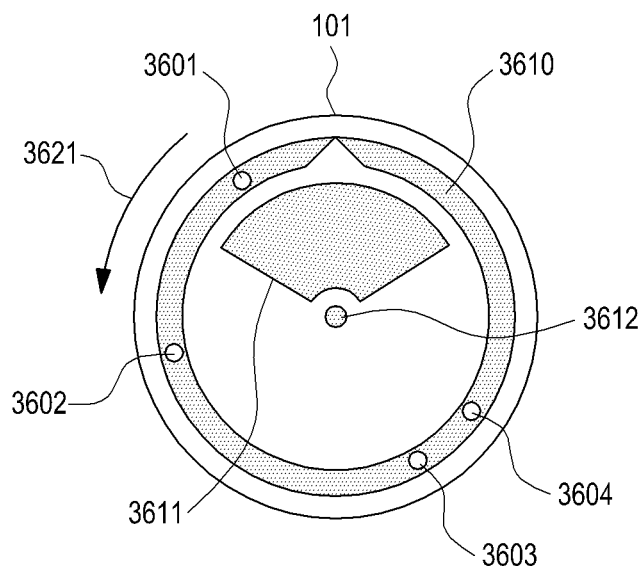
FIGS. 36A, 36B, 36C, and 36D are views illustrating methods for operating an electronic device that controls an external electronic device according to various embodiments of the present disclosure.

Referring to FIG. 36A, the electronic device 101 may display a user interface for controlling an external electronic device 3600 that displays an image. The user interface may include a first graphical object 3610 corresponding to the whole image. The user interface may also include a second graphical object 3611 for indicating a view range corresponding to the first partial image with respect to the central point 3612. The user interface may display a plurality of graphical objects 3601, 3602, 3603, and 3604 to indicate a plurality of objects or partial images currently designated.

Thus, the user may intuitively recognize where each of the plurality of designated objects or partial images is positioned in the image.

According to an embodiment of the present disclosure, the electronic device 101 may include a rotating body (e.g., a bezel) formed in a surface thereof. The display of the electronic device 101 may be formed on a side surface of the rotating body. The electronic device 101 may recognize the rotation of the rotating body as an input and perform an operation corresponding to the input.

Figure 36B:
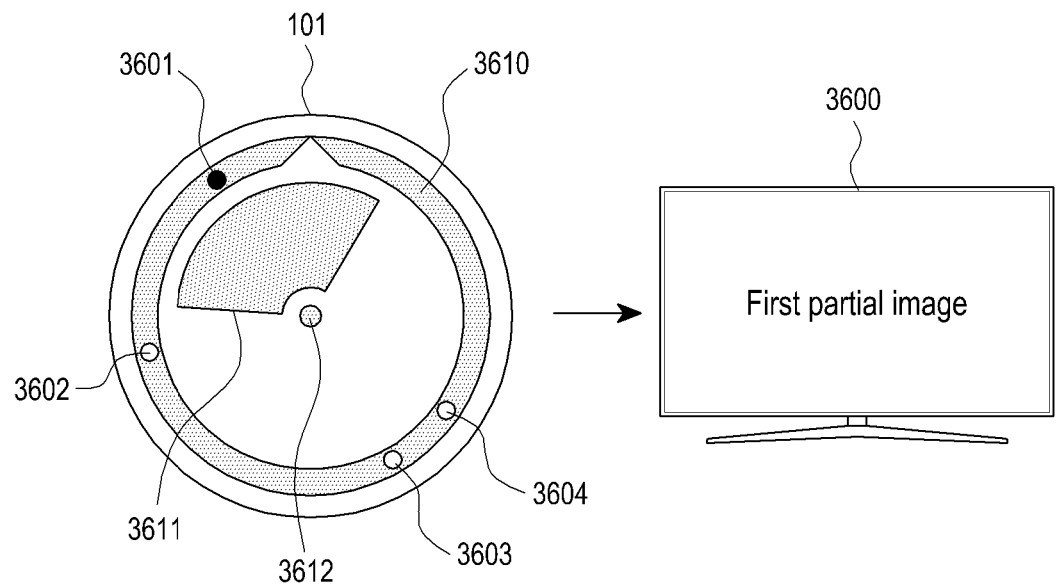

For example, referring to FIG. 36A, the electronic device 101 may receive an input 3621 of the counterclockwise rotation of the rotating body. Referring to FIG. 36B, the electronic device 101 may, in this case, move the second graphical object 3611 counterclockwise with respect to the central point 3612 corresponding to the input 3621 until the second graphical object 3611 corresponds to the graphical object 3601 corresponding to the first partial image.

As the second graphical object 3611 is moved until it corresponds to the graphical object 3601 corresponding to the first partial image, the electronic device 101 may transmit a control signal for displaying the first partial image to the external electronic device 3600 through the communication circuit of the electronic device 101. The external electronic device 3600 may switch the image displayed through the display of the external electronic device 3600 to the first partial image according to the control signal.

Figure 36C:
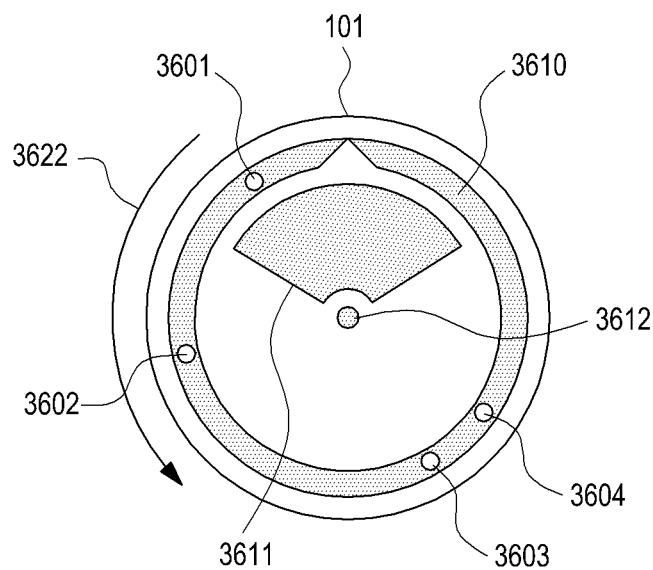
Figure 36D:
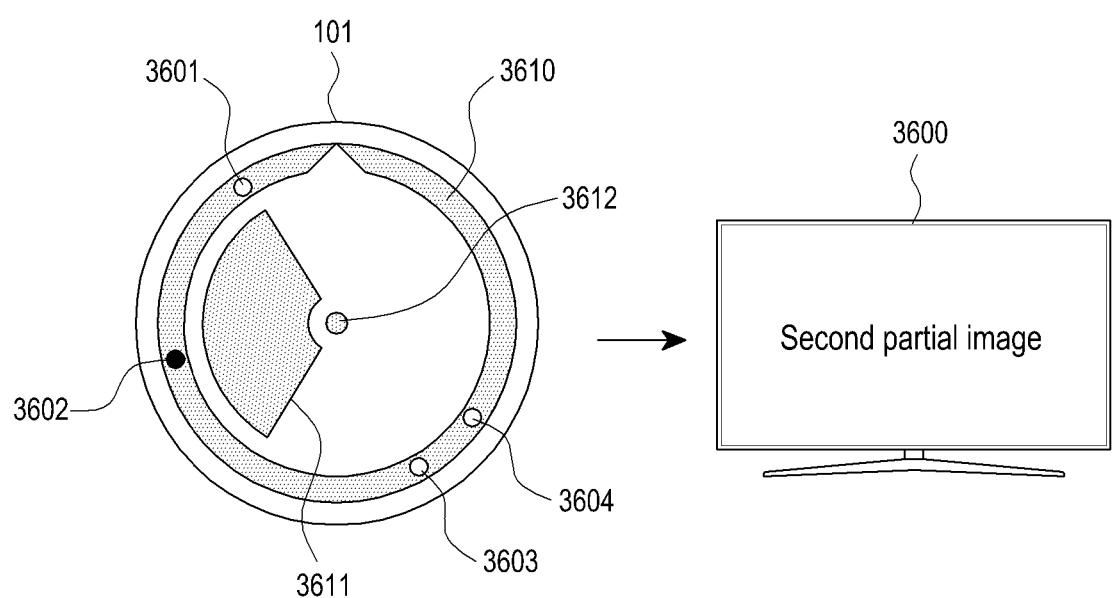

Referring to FIG. 36C, the electronic device 101 may receive an input 3622 of the counterclockwise rotation of the rotating body. Referring to FIG. 36D, the electronic device 101 may, in this case, move the second graphical object 3611 counterclockwise with respect to the central point 3612 corresponding to the input 3622 until the second graphical object 3611 corresponds to the graphical object 3602 corresponding to the second partial image.

As the second graphical object 3611 is moved until it corresponds to the graphical object 3602 corresponding to the second partial image, the electronic device 101 may transmit a control signal for displaying the second partial image to the external electronic device 3600 through the communication circuit of the electronic device 101. The external electronic device 3600 may switch the image displayed through the display of the external electronic device 3600 to the second partial image according to the control signal.

Figure 37A:
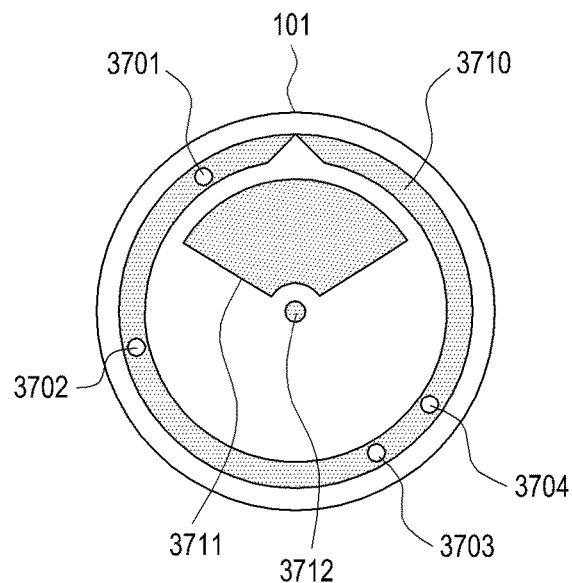
FIGS. 37A, 37B, and 37C are views illustrating methods for operating an electronic device that controls an external electronic device according to various embodiments of the present disclosure.
Figure 37B:
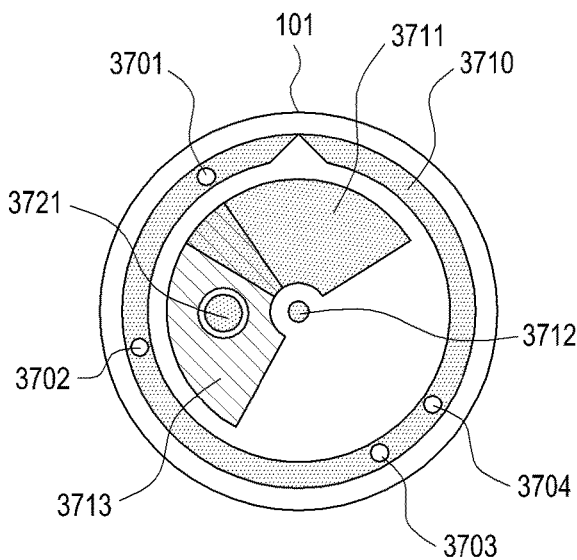
Figure 37C:
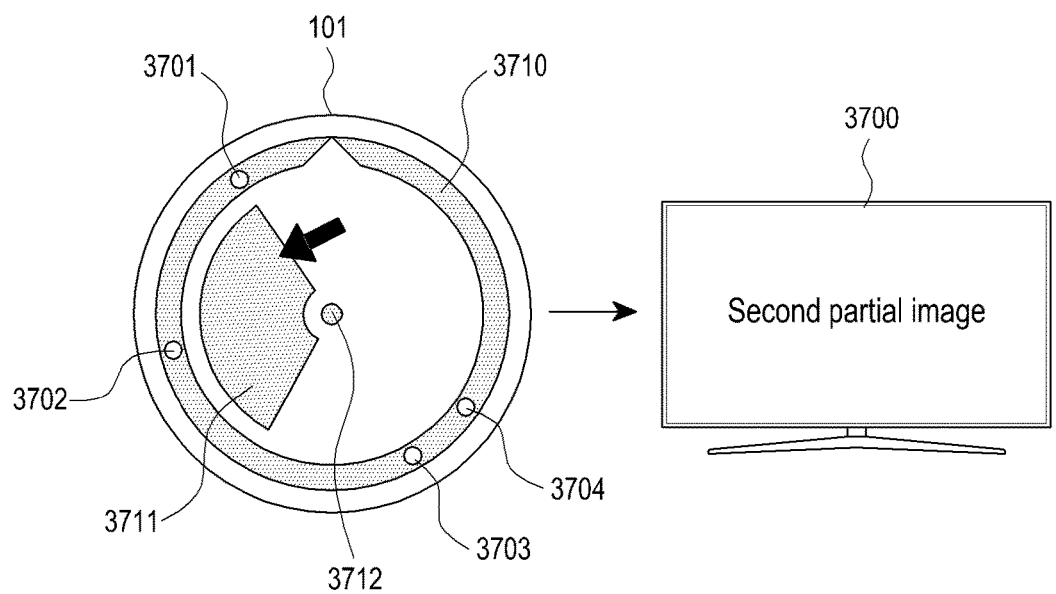

FIGS. 37A, 37B, and 37C are views illustrating methods for operating an electronic device that controls an external electronic device according to various embodiments of the present disclosure.

Referring to FIG. 37A, the electronic device 101 may display a user interface for controlling an external electronic device 3700 that displays an image. The user interface may include a first graphical object 3710 corresponding to the whole image. The user interface may also include a second graphical object 3711 for indicating a view range corresponding to the first partial image with respect to the central point 3712. The user interface may display a plurality of graphical objects 3701, 3702, 3703, and 3704 to indicate a plurality of objects or partial images currently designated. Thus, the user may intuitively recognize what portion in the image each of the plurality of designated objects or partial images corresponds to.

The electronic device 101 may determine whether an event occurs in each of the plurality of designated objects or designated partial images. A specific method for determining whether an event occurs is the same as what has been described above, and no further description thereof is given.

For example, referring to FIG. 37B, upon determining that an event occurs in the designated second object or designated second partial image, the electronic device 101 may display a third graphical object 3713 for indicating the occurrence of the event to correspond to the graphical object 3702 corresponding to the second partial image. Thus, the user may recognize that an event has occurred in the second object or second partial image.

Referring to FIG. 37C, upon receiving an input 3721 for selecting the third graphical object 3713 from the user, the electronic device 101 may move the second graphical object 3711 to correspond to the graphical object 3702 corresponding to the second partial image, corresponding to the input 3721.

As the second graphical object 3711 is moved to correspond to the graphical object 3702 corresponding to the second partial image, the electronic device 101 may transmit a control signal for displaying the second partial image to the external electronic device 3700 through the communication circuit of the electronic device 101. The external electronic device 3700 may switch the image displayed through the display of the external electronic device 3700 to the second partial image according to the control signal.

FIGS. 38A, 38B, 38C, 38D, 38E, 38F, and 38G are views illustrating operations of an external electronic device according to various embodiments of the present disclosure.

Figure 38A:
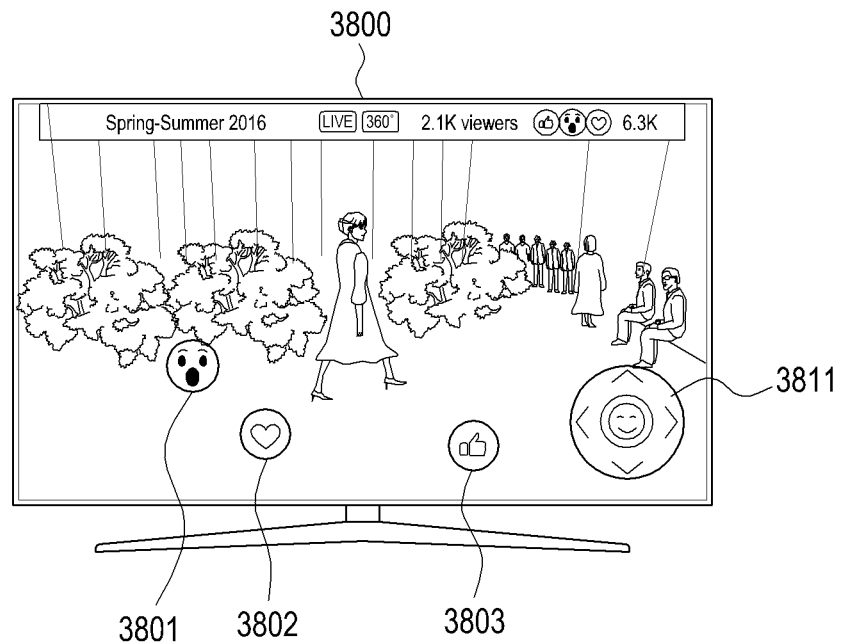
FIGS. 38A, 38B, 38C, 38D, 38E, 38F, and 38G are views illustrating operations of an external electronic device according to various embodiments of the present disclosure.

Referring to FIG. 38A, the external electronic device 3800 may receive an image transmitted in real-time from the external server and display the first partial image of the image through the display. The external electronic device 3800 may display a plurality of emoticons 3801, 3802, and 3803 associated with the first partial image displayed. Here, the emoticons may include an emoticon for expressing the user's emotion, feeling, or preference.

The external electronic device 3800 may also display a first graphical object 3811 including a plurality of icons for executing a plurality of functions for controlling the displayed image. The user may control the image displayed on the external electronic device 3800 by making an input corresponding to the first graphical object 3811.

Figure 38B:
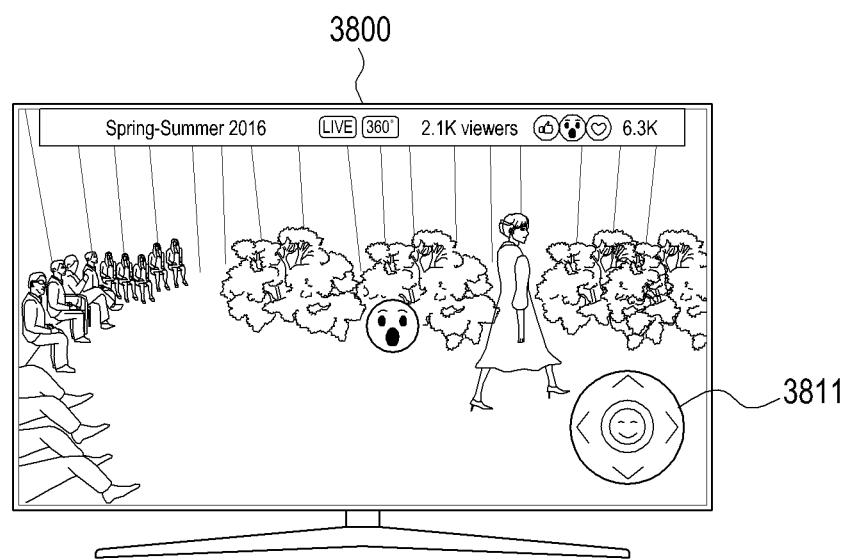

For example, referring to FIG. 38B, when the external electronic device 3800 receives an input for selecting a first icon for executing the function of moving the image in a first direction among the plurality of icons for executing the function of moving the image in different directions, which are included in the graphical object 3811, the external electronic device 3800 may switch the image displayed through the display in the first direction.

Figure 38C:
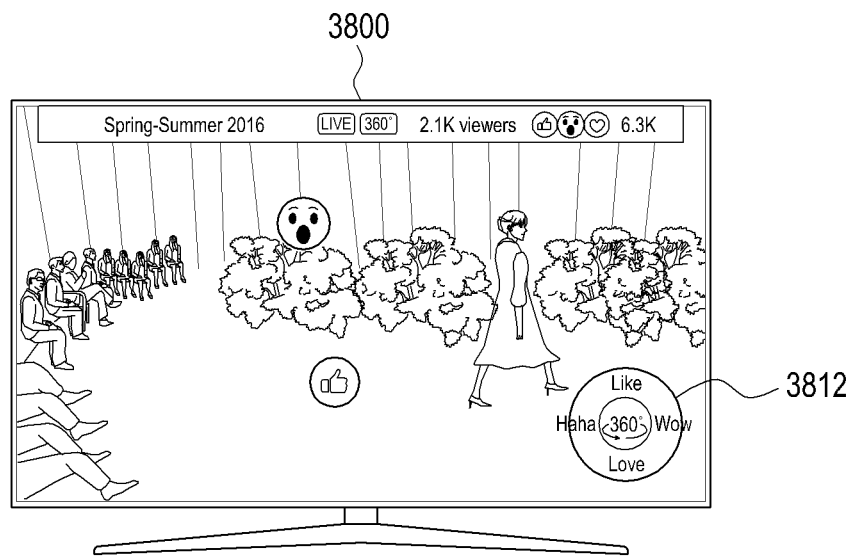

Referring to FIG. 38C, upon receiving an input for switching to an emoticon input mode, the external electronic device 3800 may display a second graphical object 3812 for entering an emoticon instead of the first graphical object 3811.

Figure 38D:
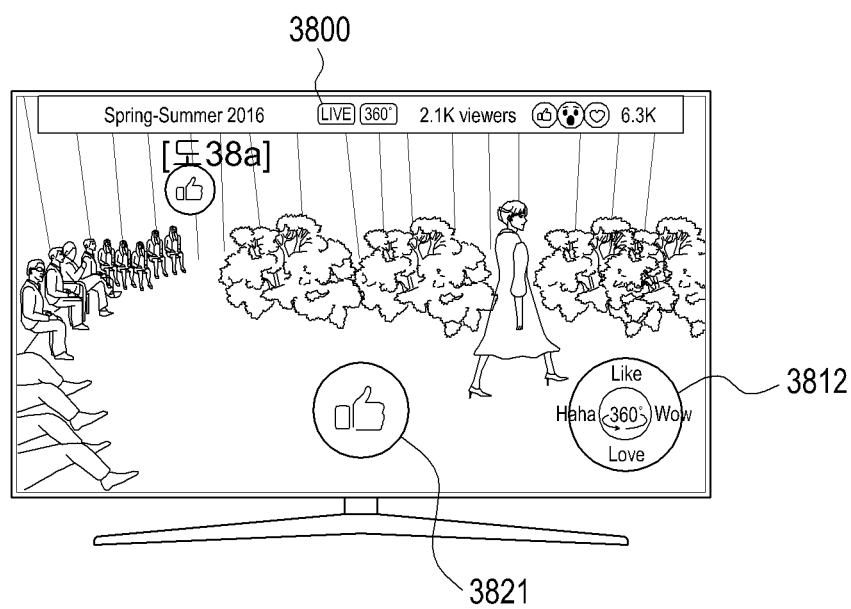

Referring to FIG. 38D, upon receiving an input for selecting one of the plurality of icons for entering an emoticon which are included in the second graphical object 3812, the external electronic device 3800 may display an emoticon 3821 set for the selected icon.

Figure 38E:
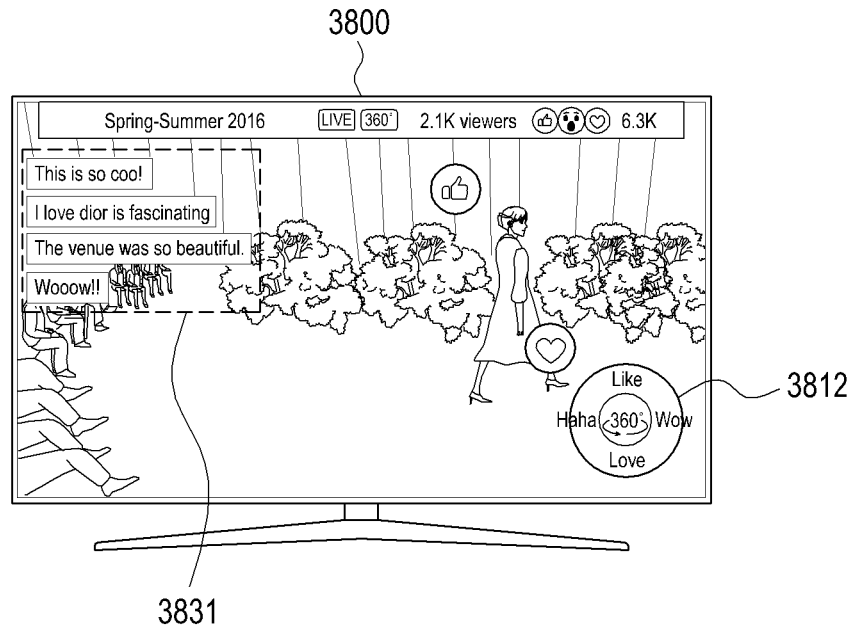

Referring to FIG. 38E, upon receiving an input for displaying a message related to a partial image or object being displayed through the display, the external electronic device 3800 may search for the message related to the object or partial image and display the same in a preset area 3831. The message may be received from the external server which transmits the image, in relation to the object or partial image.

The external electronic device 3800 may determine whether an event occurs in the object or partial image being not displayed. The external electronic device 3800 may receive, from the electronic device 101, information about whether an event occurs in the object or partial image being not displayed.

Figure 38F:
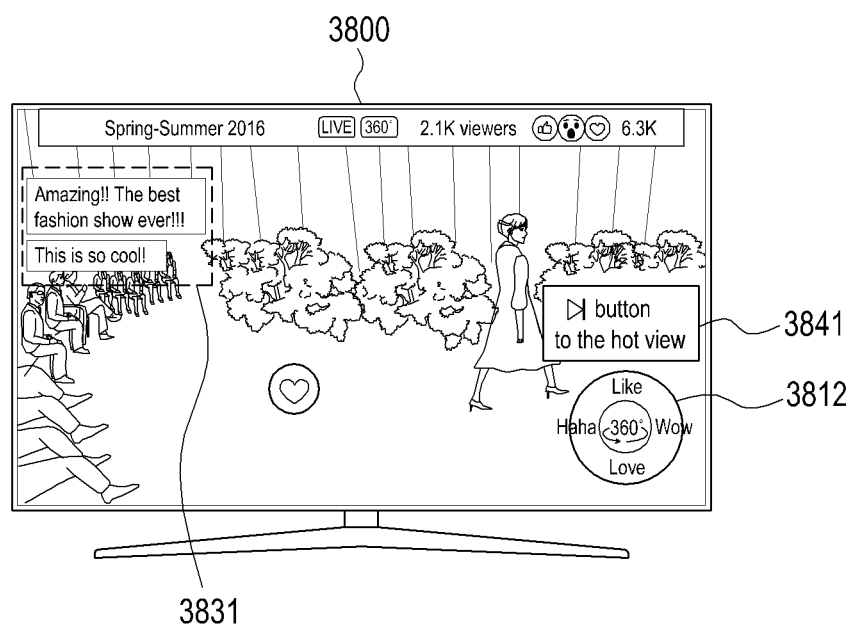

Referring to FIG. 38F, upon determining that an event occurs in the object or partial image being not displayed, the external electronic device 3800 may output a message 3841 to indicate the occurrence of the event and to provide a method for switching to the partial image where the event occurs or partial image including the object where the event occurs.

Figure 38G:
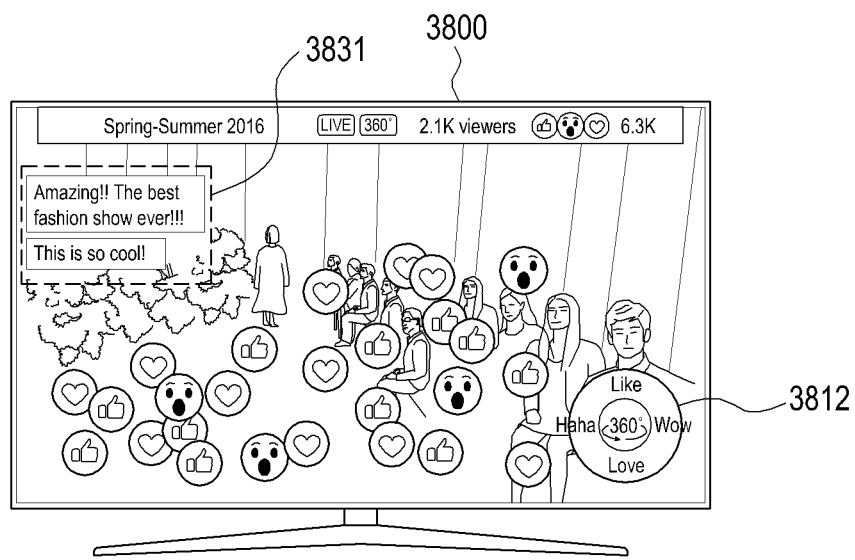

Referring to FIG. 38G, upon receiving an input for switching to the partial image where the event occurs or partial image including the object where the event occurs, the external electronic device 3800 may switch the image displayed on the external electronic device 3800 to the partial image where the event occurs or the partial image including the object where the event occurs.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific IC (ASIC) chip, field-programmable gate arrays (FPGAs), or programmable logic device, that has been known or to be developed in the future as performing some operations.

According to an embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function.

The computer-readable medium may include, e.g., a hard disk, a floppy disc, a magnetic medium (e.g., magnetic tape), an optical recording medium (e.g., compact disc-read only memory (CD-ROM), DVD, magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

According to an embodiment of the present disclosure, there is provided a non-transitory computer-readable recording medium retaining a program executed on a computer, wherein the program comprises executable commands that, when executed by a processor, enable the processor to display a first partial image of an image, designate a first object included in the first partial image when receiving a first input for designating the first object, store first information associated with the designated first object, display a first graphical object associated with the first object when the image displayed on the display is switched from the first partial image to a second partial image of the image, and switch the image displayed on the display from the second partial image to a third partial image of the image including the designated first object using the first information when receiving a second input for selecting the first graphical object.

As is apparent from the foregoing description, according to the embodiments of the present disclosure, the electronic device may designate an object included in a 360-degree omni-directional image according to a user input and enable the image displayed on the display to switch to a partial image including the designated object according to an input for selecting a graphical object associated with the object. Further, when an event associated with the designated object occurs, the electronic device may provide a notification indicating the occurrence of the event to the user. Therefore, the user may recognize the occurrence of the event associated with the designated object and switch the image displayed on the display to the partial image where the event has occurred.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a display;
   a memory; and
   at least one processor configured to:
      control the display to display a first partial image of a multi-directional video,
      receive a first input for designating a first object among a plurality of objects included in the first partial image, display, on the display, a second partial image of the multi-directional video,
      if the first object is not included in the second partial image, display a first graphical object associated with the first object in the second partial image, and
      in response to receiving a second input selecting the first graphical object associated with the first object specified by the first input, determine a location of a third partial image of the multi-directional video that includes the first object, and display, on the display, the third partial image of the multi-directional video that includes the first object.

2. The electronic device of claim 1,
   wherein the at least one processor is further configured to store first information associated with the first object in the memory in response to the first input, and
   wherein the first information includes at least one of color information, shape information, or coordinate information corresponding to the first object.

3. The electronic device of claim 2, wherein the at least one processor is further configured to identify at least one of a position of display or size of the first graphical object based on at least one of the first information or information associated with the second partial image.

4. The electronic device of claim 1, wherein the first graphical object includes at least one of an icon or a thumbnail image associated with the first object.

5. The electronic device of claim 1, wherein the at least one processor is further configured to identify the first object from the first partial image in response to identifying the first input based on a result of a recognition of the first object from the first partial image.

6. The electronic device of claim 1, wherein the at least one processor is further configured to:
   identify a first event related to the first object after the first graphical object is displayed on the display, and
   in response to identifying the first event, display, on the display, a changed first graphical object of which at least one of a position of display, size, color, or shape is different from that of the first graphical object.

7. The electronic device of claim 1, wherein the at least one processor is further configured to:
   identify a first event related to the first object after the first graphical object is displayed on the display, and
   in response to identifying the first event, control an output interface of the electronic device to output at least one of a vibration or a sound.

8. The electronic device of claim 1, wherein the at least one processor is further configured to:
   in response to identifying a third input corresponding to a second object included in the second partial image, store second information associated with the second object in the memory and display, on the display, a fourth partial image of the multi-directional video, the first graphical object, and a second graphical object associated with the second object while removing the second partial image from the display.

9. An electronic device, comprising:
a display;
a memory; and
at least one processor configured to:
   control the display to display a first partial image of a multi-directional video,
   receive a first input for designating the first partial image,
   display, on the display, a second partial image of the multi-directional video,
   display, on the display, a first graphical object associated with a portion of the first partial image specified by the first input, in the second partial image, and
   in response to receiving a second input for selecting the first graphical object, display the first partial image.

10. The electronic device of claim 9,
wherein the at least one processor is further configured to store first information associated with the first graphical object in the memory in response to the first input, and
wherein the first information includes at least one of coordinate information corresponding to the first partial image or information for specifying at least one object included in the first partial image.

11. The electronic device of claim 9, wherein the at least one processor is further configured to:
   identify a first event related to the first partial image after the first graphical object is displayed on the display, and
   in response to identifying the first event, display, on the display, a changed first graphical object of which at least one of a position of display, size, color, or shape is different from that of the first graphical object.

12. An electronic device, comprising:
a display;
a memory;
a communication circuit; and
at least one processor configured to:
   control the display to display a user interface for controlling an external electronic device,
   receive a first input for designating a first object among a plurality of objects included in a first partial image of a multi-directional video displayed on the external electronic device,
   display a first graphical object corresponding to the first object on the user interface, and
   in response to receiving a second input selecting the first graphical object associated with the first object specified by the first input, transmit, through the communication circuit to the external electronic device, a first control signal for the external electronic device to determine a location of a second partial image of the multi-directional video that includes the first object, and display, on the display the second partial image of the multi-directional video including the first object.

13. The electronic device of claim 12, wherein the at least one processor is further configured to transmit, in response to identifying that the external electronic device is displaying a third partial image of the multi-directional video while removing the first partial image from a display of the external electronic device, a second control signal for displaying a second graphical object associated with the first object through the communication circuit to the external electronic device.

14. The electronic device of claim 13, wherein the at least one processor is further configured to:
   identify a first event associated with the first object after the second graphical object is displayed on the external electronic device, and
   in response to identifying the first event, transmit, through the communication circuit to the external electronic device, a third control signal for displaying a changed second graphical object of which at least one of a position, size, color, or shape is different from that of the second graphical object displayed on the external electronic device.

15. An electronic device, comprising:
a display;
a memory; and
at least one processor configured to:
   control the display to display a first partial image of a multi-directional still image content,
   receive a first input for designating a first object among a plurality of objects included in the first partial image,
   display, on the display, a second partial image of the multi-directional still image content,
   if the first object is not included in the second partial image, display a first graphical object associated with the first object in the second partial image, and
   in response to receiving a second input selecting the first graphical object associated with the first object specified by the first input, determine a location of a third partial image of the multi-directional still image content that includes the first object and display, on the display the third partial image of the multi-directional still image content that includes the first object.

16. An electronic device, comprising:
a display;
a memory; and
at least one processor configured to:
- control the display to display a first partial image of a content,
- receive a first input for designating a first object among a plurality of objects included in the first partial image,
- display, on the display, a second partial image of the content,
- if the first object is not included in the second partial image, display a first graphical object associated with the first object in the second partial image, and
- in response to receiving a second input selecting the first graphical object associated with the first object specified by the first input, determine a location of a third partial image of the content that includes the first object and display, on the display, the third partial image of the content that includes the first object.

17. An electronic device, comprising:
a display;
a memory; and
at least one processor configured to:
- control the display to display a first partial image of a multi-directional still image content,
- receive a first input for designating the first partial image,
- display, on the display, a second partial image of the multi-directional still image content,
- display, on the display, a first graphical object associated with a portion of the first partial image specified by the first input, in the second partial image, and
- in response to receiving a second input for selecting the first graphical object, display the first partial image.

18. An electronic device, comprising:
a display;
a memory; and
at least one processor configured to:
- control the display to display a first partial image of a content,
- receive a first input for designating the first partial image,
- display, on the display, a second partial image of the content,
- display, on the display, a first graphical object associated with a portion of the first partial image specified by the first input, in the second partial image, and
- in response to receiving a second input for selecting the first graphical object, display the first partial image.

19. An electronic device, comprising:
a display;
a memory;
a communication circuit; and
at least one processor configured to:
- control the display to display a user interface for controlling an external electronic device,
- receive a first input for designating a first object among a plurality of objects included in a first partial image of a multi-directional still image content displayed on the external electronic device,
- display a first graphical object corresponding to the first object on the user interface, and
- in response to receiving a second input selecting the first graphical object associated with the first object specified by the first input, transmit, through the communication circuit to the external electronic device, a first control signal for the external electronic device to determine a location of a second partial image of the multi-directional still image content that includes the first object, and display, on the display the second partial image of the multi-directional still image content including the first object.

20. An electronic device, comprising:
a display;
a memory;
a communication circuit; and
at least one processor configured to:
- control the display to display a user interface for controlling an external electronic device,
- receive a first input for designating a first object among a plurality of objects included in a first partial image of a content displayed on the external electronic device,
- display a first graphical object corresponding to the first object on the user interface, and
- in response to receiving a second input selecting the first graphical object associated with the first object specified by the first input, transmit, through the communication circuit to the external electronic device, a first control signal for the external electronic device to determine a location of a second partial image of the content that includes the first object, and display, on the display the second partial image of the content including the first object.

* * * * *